US012572250B2

(12) United States Patent
Hao et al.

(10) Patent No.: US 12,572,250 B2
(45) Date of Patent: Mar. 10, 2026

(54) DISPLAY METHOD, ELECTRONIC DEVICE, STORAGE MEDIUM, AND PROGRAM PRODUCT

(71) Applicant: Huawei Technologies Co., Ltd., Shenzhen (CN)

(72) Inventors: Huaqi Hao, Milan (IT); Tong Yang, Beijing (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 94 days.

(21) Appl. No.: 18/483,248

(22) Filed: Oct. 9, 2023

(65) Prior Publication Data
US 2024/0045559 A1      Feb. 8, 2024

Related U.S. Application Data

(63) Continuation of application No. PCT/CN2022/084999, filed on Apr. 2, 2022.

(30) Foreign Application Priority Data

Apr. 30, 2021    (CN) .......................... 202110481163.6

(51) Int. Cl.
*G06F 3/04883* (2022.01)
*G06F 3/0481* (2022.01)
(52) U.S. Cl.
CPC ........ *G06F 3/0481* (2013.01); *G06F 3/04883* (2013.01)

(58) Field of Classification Search
None
See application file for complete search history.

(56) References Cited

U.S. PATENT DOCUMENTS

| | | | | |
|---|---|---|---|---|
| 2010/0095240 A1* | 4/2010 | Shiplacoff | ............. | G06F 3/0481 |
| | | | | 345/157 |
| 2012/0071208 A1 | 3/2012 | Lee et al. | | |
| 2012/0159386 A1* | 6/2012 | Kang | .................. | G06F 3/04883 |
| | | | | 715/800 |
| 2014/0298254 A1* | 10/2014 | Peng | ..................... | G06F 3/0488 |
| | | | | 715/800 |

(Continued)

FOREIGN PATENT DOCUMENTS

| | | |
|---|---|---|
| CN | 102413229 A | 4/2012 |
| CN | 102609183 A | 7/2012 |

(Continued)

*Primary Examiner* — Tuyetlien T Tran
(74) *Attorney, Agent, or Firm* — Conley Rose, P.C.

(57) ABSTRACT

A display method includes displaying an application on a screen in a first mode and receiving an operation performed on the screen, where the operation is any operation in a plurality of consecutive operations. The consecutive operations include any one or any combination of a same operation mode, a same operation object, and a same region for an operation object, and the same operation mode includes either or both of a same operation gesture and a same operation direction for an operation gesture. Switching, in response to the operation, display of the application from the first mode to a second mode, where each of the first mode and the second mode is any one of a full-screen mode, a window mode, a card mode, or a floating ball mode.

20 Claims, 75 Drawing Sheets

(56)     References Cited

U.S. PATENT DOCUMENTS

| | | | | |
|---|---|---|---|---|
| 2015/0331594 A1* | 11/2015 | Terada | | G06F 3/0488 |
| | | | | 715/801 |
| 2016/0085438 A1* | 3/2016 | Doan | | G06F 3/04883 |
| | | | | 715/863 |
| 2016/0357305 A1* | 12/2016 | Wells | | G06F 3/04842 |
| 2017/0046039 A1* | 2/2017 | Karunamuni | | G06F 3/04855 |
| 2017/0147184 A1* | 5/2017 | Zhang | | G06F 3/0488 |
| 2017/0249070 A1* | 8/2017 | Chen | | G06F 3/0484 |
| 2017/0344192 A1* | 11/2017 | Liu | | G06F 3/04845 |
| 2018/0150208 A1 | 5/2018 | Song et al. | | |
| 2020/0019213 A1* | 1/2020 | Lee | | H04N 7/188 |
| 2020/0057555 A1* | 2/2020 | Walkin | | G06F 3/0483 |
| 2023/0127743 A1* | 4/2023 | Mo | | G06F 3/04886 |
| | | | | 715/788 |
| 2023/0325062 A1* | 10/2023 | Mo | | G06F 3/0482 |
| | | | | 715/800 |
| 2023/0350533 A1* | 11/2023 | Kim | | G06F 3/041 |

FOREIGN PATENT DOCUMENTS

| | | | |
|---|---|---|---|
| CN | 103870128 A | 6/2014 |
| CN | 106155676 A | 11/2016 |
| CN | 112272822 A | 1/2021 |
| CN | 112527165 A | 3/2021 |
| CN | 113672133 A | 11/2021 |
| EP | 3770745 A1 | 1/2021 |
| JP | 2015219378 A | 12/2015 |

* cited by examiner

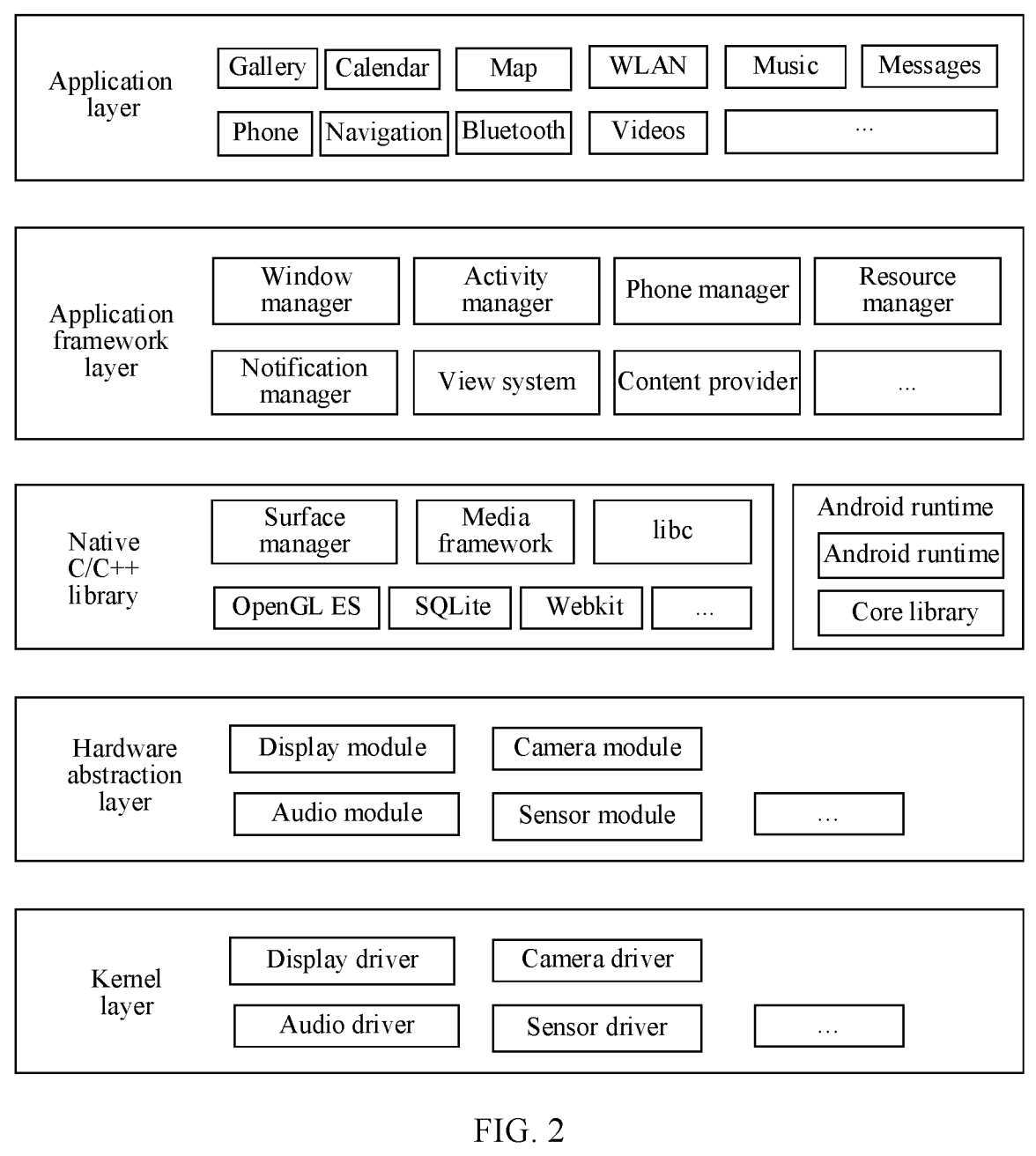

| Application layer | Gallery | Calendar | Map | WLAN | Music | Messages |
| | Phone | Navigation | Bluetooth | Videos | ... | |

| Application framework layer | Window manager | Activity manager | Phone manager | Resource manager |
| | Notification manager | View system | Content provider | ... |

| Native C/C++ library | Surface manager | Media framework | libc | Android runtime |
| | OpenGL ES | SQLite | Webkit | ... | Android runtime |
| | | | | | Core library |

| Hardware abstraction layer | Display module | Camera module | |
| | Audio module | Sensor module | ... |

| Kernel layer | Display driver | Camera driver | |
| | Audio driver | Sensor driver | ... |

FIG. 2

Shenzhen ∨

Express  Taxi  Hitch  Premier  Driver 4.1 kilometers
away from you.
1 minute

End
point

Start
point

YueBFXXXXX

Audi · White

TO FIG. 26D

CONT. FROM FIG. 26C

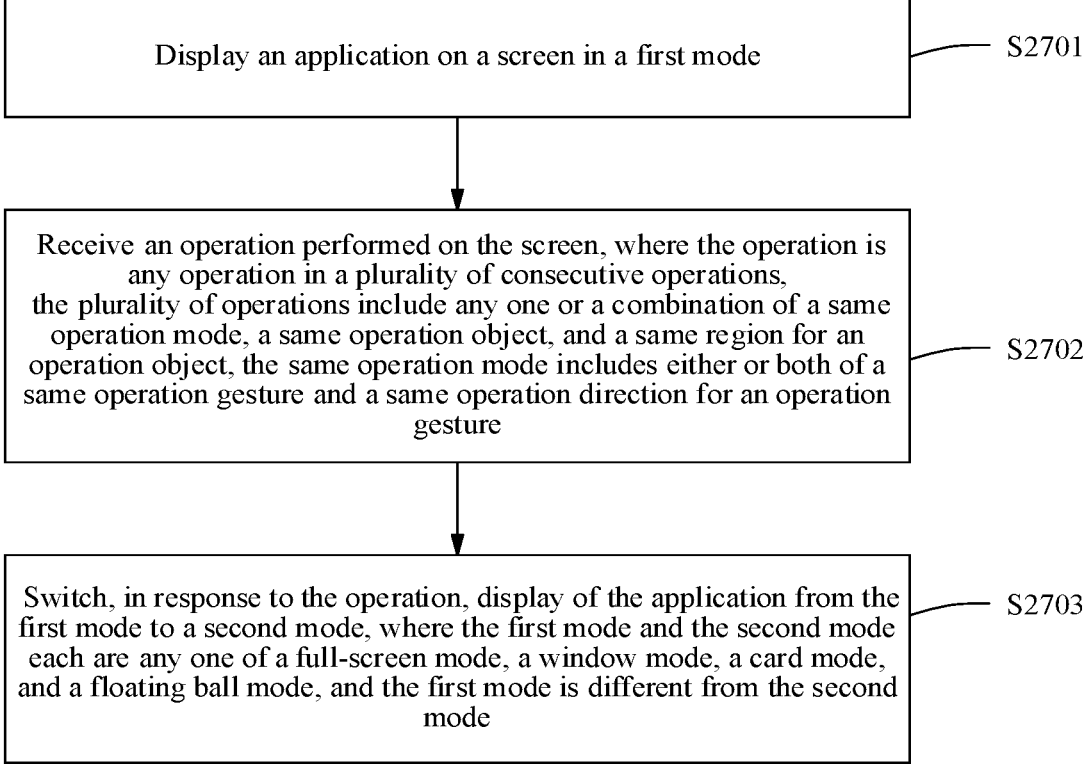

Display an application on a screen in a first mode — S2701

Receive an operation performed on the screen, where the operation is any operation in a plurality of consecutive operations, the plurality of operations include any one or a combination of a same operation mode, a same operation object, and a same region for an operation object, the same operation mode includes either or both of a same operation gesture and a same operation direction for an operation gesture — S2702

Switch, in response to the operation, display of the application from the first mode to a second mode, where the first mode and the second mode each are any one of a full-screen mode, a window mode, a card mode, and a floating ball mode, and the first mode is different from the second mode — S2703

FIG. 27

DISPLAY METHOD, ELECTRONIC DEVICE, STORAGE MEDIUM, AND PROGRAM PRODUCT

CROSS-REFERENCE TO RELATED APPLICATIONS

This is a continuation of International Patent Application No. PCT/CN2022/084999 filed on Apr. 2, 2022, which claims priority to Chinese Patent Application No. 202110481163.6 filed on Apr. 30, 2021. The disclosures of the aforementioned applications are hereby incorporated by reference in their entireties.

TECHNICAL FIELD

This disclosure relates to the field of electronic device technologies, and in particular, to a display method, an electronic device, a storage medium, and a program product.

BACKGROUND

In a process of using an electronic device such as a mobile phone or a tablet computer, a user may need to switch a display mode of a user interface of an application on the electronic device. The display mode of the user interface of the application includes a full-screen mode, a window mode, a mini mode, and a floating ball mode. At present, when the user interface of the application is in the full-screen mode, the user interface of the application may be switched from the full-screen mode to the window mode through a specific path, for example, sliding upward from a bottom edge of a screen to a preset region of the screen (for example, a corner of the screen). Alternatively, on a multi-task interface, a button on a small window of a specific application on the multi-task interface may be tapped, to directly enter a window mode of a user interface of the application. When the user interface of the application is in the window mode, an edge of a floating window of the application may be dragged to adjust a size of the window, so that the user interface of the application enters a mini mode. Alternatively, the user interface of the application may be directly switched from the window mode to a full-screen mode by tapping a first preset button (for example, a maximization button) on the floating window. In addition, when the user interface of the application is in the mini mode, the user interface of the application may be directly switched to a floating ball mode by tapping a first preset button (for example, a minimization button) on the window of the application. Alternatively, the user interface of the application may be switched from the mini mode to the window mode by dragging an edge of the window of the application to adjust a size of the floating window. When the user interface of the application is in the floating ball mode, the user interface of the application may be switched from the floating ball mode to the mini mode by tapping the floating ball of the application. However, different interactive actions are used during switching between different display modes, and the interactive actions are not associated with each other, resulting in increased memory costs of the user and inconvenient operation manners. In addition, in the mini mode, because the size of the window is excessively small, the interface of the application in the window may be excessively small, and consequently, the user cannot clearly see the interface of the application in the floating window.

SUMMARY

In view of the foregoing content, it is necessary to provide a display method, an electronic device, a storage medium, and a program product, to enhance continuity of interactive actions, and avoid unclearness of an interface of an application in a small window.

In the following first aspect to fourth aspect, the term "consecutive operations" may be operations that have a similarity and do not require many changes, for example, consecutive taps, consecutive pinches, or consecutive slide operations. The term "same region for an operation object" may be that an operation object is located in a same region during operation. The term "same operation object" may indicate different forms of a same application. For example, a full-screen window, a window of a floating window, a window of a floating card, and a window of a floating ball of a same application may all have a same operation object.

According to a first aspect, an embodiment of this disclosure provides a display method. The method includes displaying an application on a screen in a first mode, receiving an operation performed on the screen, where the operation is any operation in a plurality of consecutive operations, the plurality of consecutive operations include any one or any combination of a same operation mode, a same operation object, and a same region for an operation object, and the same operation mode includes either or both of a same operation gesture and a same operation direction, and switching, in response to the operation, display of the application from the first mode to a second mode, where the first mode and the second mode each are any one of a full-screen mode, a window mode, a card mode, and a floating ball mode, and the first mode is different from the second mode.

According to the first aspect of this disclosure, when the application is displayed in the first mode, the display may be switched, in response to any operation in consecutive operations, to the second mode different from the first mode. The plurality of consecutive operations includes any one of or a combination of a plurality of a same operation mode, a same operation object, a same operation direction, and a same position for an operation object. The first mode and the second mode each are any one of a full-screen mode, a window mode, a card mode, and a floating ball mode. Therefore, when performing consecutive operations, a user can smoothly switch between different operations without changing many postures. In addition, it is convenient for learning and memorization performed by the user, and the ease of use and practicability are both strong. In addition, the use of a floating card instead of a mini mode can avoid unclearness of an interface of an application in a small window.

According to some embodiments of this disclosure, the plurality of consecutive operations include either or both of the same operation mode or the same operation object, the plurality of consecutive operations are performed on the screen to control a size of a window of the application displayed on the screen to continuously change, and switching, in response to the operation, display of the application from the first mode to a second mode includes switching, in response to the operation when the size of the window changes to a size that meets a preset size, the display of the application from the first mode to the second mode based on that the size of the window meets the preset size.

In this disclosure, the plurality of consecutive operations is performed on the screen. The plurality of consecutive operations includes either or both of the same operation mode or the same operation object, to control the size of the window displayed on the screen to continuously change, and mode switching is implemented when the size of the window changes to a size that meets a preset size. The size of the window may be controlled through the plurality of consecutive operations to continuously change, thereby implementing mode switching.

According to some embodiments of this disclosure, an operation mode of the plurality of consecutive operations is consecutive slide operations performed on the screen, and in response to the consecutive slide operations, the size of the window on the screen continuously increases or decreases until the display of the application is triggered to switch from the first mode to the second mode when the size of the window meets the preset size in response to one of the consecutive slide operations.

In this disclosure, the consecutive slide operations performed on the screen enable the size of the window to continuously increase or decrease until switching is triggered by that the size of the window meets the preset size under a slide operation. The consecutive operations may be implemented by performing consecutive slide operations on the screen, and the consecutive operations do not require many changes.

According to some embodiments of this disclosure, an operation object of the plurality of consecutive operations is the window, and the consecutive slide operations performed on the screen are a slide operation of dragging the window to slide from a first position to a second position on the screen, or consecutive slide operations performed on a first mode switching hotspot on the screen.

In this disclosure, the size of the window is continuously increased or decreased through consecutive slide operations of dragging the window to slide from the first position on the screen to the second position or consecutive slide operations on the first mode switching hotspot on the screen. Basic operations of the consecutive operations are the same without many changes.

According to some embodiments of this disclosure, an operation object of the plurality of consecutive operations is the screen, the consecutive slide operations performed on the screen are slide operations from specified positions of the screen to other positions, and the specified positions of the screen include an edge of the screen and the window of the application.

In this disclosure, the size of the window is continuously changed through a slide operation from the edge of the screen to another position and a slide operation from the window of the application to another position. The consecutive operations do not require many changes.

According to some embodiments of this disclosure, the operation mode is a tap operation, the plurality of consecutive operations are consecutive tap operations performed on a window of the application, and the display of the application is triggered to switch from the first mode to the second mode when a size of the window meets a preset size in response to one of the plurality of consecutive operations.

In this disclosure, all the operations in the plurality of consecutive operations are tap operations corresponding to the window of the application, so that mode switching can be implemented. Mode switching may be implemented through one of the consecutive operations that do not require many changes.

According to some embodiments of this disclosure, an operation mode of the plurality of consecutive operations is a multi-finger pinch or a multi-finger scale-in operation, and the display of the application is triggered to switch from the first mode to the second mode when a size of a window meets a preset size in response to one of the consecutive operations.

In this disclosure, all the operations in the plurality of consecutive operations are multi-finger pinch operations or multi-finger scale-in operation operations, so that mode switching can be implemented through one of the consecutive operations that do not require many changes.

According to some embodiments of this disclosure, the plurality of consecutive operations have the same operation gesture, in response to the plurality of consecutive operations performed on the screen, a position of a window displayed on the screen is controlled to continuously change, and switching, in response to the operation, the display of the application from the first mode to a second mode includes switching, in response to the operation when the position of the window changes to a position that meets a preset condition, the display of the application from the first mode to the second mode based on that the position of the window meets the preset condition.

In this disclosure, the position of the window displayed on the screen is controlled through the plurality of consecutive operations having a same operation gesture on the screen to continuously change, and mode switching is implemented when the position of the window changes to a position that meets a preset condition. The position of the window may be controlled through the plurality of consecutive operations to continuously change, thereby implementing mode switching.

According to some embodiments of this disclosure, the plurality of consecutive operations are consecutive slide operations, the plurality of consecutive operations are performed on the window on the screen, the position of the window changes to the position that meets the preset condition, and switching the display of the application from the first mode to the second mode based on that the position of the window meets the preset condition includes switching, when the position of the window changes to a position located in a preset hotspot in a second mode switching hotspot, the display of the application from the first mode to the second mode based on that the position of the window is located in the preset hotspot in the second mode switching hotspot.

In this disclosure, the position of the window is controlled through the consecutive slide operations on the window on the screen to change to a position located in the preset hotspot in the second mode switching hotspot, to implement mode switching. The position of the window may be controlled through the plurality of consecutive slide operations to continuously change until the position is located in the preset hotspot in the second mode switching hotspot, thereby implementing mode switching, and the consecutive operations do not require many changes.

According to some embodiments of this disclosure, the plurality of consecutive operations are consecutive slide operations, the plurality of consecutive operations are performed on the window on the screen, the position of the window changes to the position that meets the preset condition, and switching the display of the application from the first mode to the second mode based on that the position of the window meets the preset condition includes switching, when a size of the window changes to a preset size as the position of the window changes, the display of the application from the first mode to the second mode based on that the window of the preset size exits the screen.

In this disclosure, the position of the window is controlled through the consecutive slide operations on the window on the screen to change the size of the window, so that the window exits the screen, to implement mode switching. The position of the window may be controlled through the plurality of consecutive slide operations to continuously change until the window of the preset size exits the screen, thereby implementing mode switching, and the consecutive operations do not require many changes.

According to some embodiments of this disclosure, if the display of the application is switched to a floating card mode, switching to a floating card mode includes extracting key information based on a characteristic of the application, and displaying a floating card, and displaying the key information in the floating card based on preset layouts of different key information.

In this disclosure, the key information in the application, instead of the interface of the application, is displayed in the floating card, to further avoid unclearness of the interface of the application in a small window.

According to some embodiments of this disclosure, an operation performed on a window of the floating card is received. A size of the window of the floating card is a first preset size, and first key information is displayed in the window of the first preset size of the floating card. In response to the operation, the size of the window of the floating card is switched from the first preset size to a second preset size. The second preset size is different from the first preset size. Second key information is displayed in the window of the second preset size of the floating card. The second key information is different from the first key information.

In this disclosure, a size of the floating card is adjustable, and content displayed in the floating card changes with the size of the floating card. Therefore, more detailed content in a user interface of an application can be provided for the user, and more functions can be provided for the user. In addition, different function combinations are provided for the user based on different sizes of the floating card.

According to a second aspect, an embodiment of this disclosure further provides an electronic device, including a processor, a memory, and a display. The memory is configured to store computer-executable instructions, and when the electronic device runs, the processor executes the computer-executable instructions, to enable the electronic device to perform the following steps: displaying an application on a screen in a first mode, receiving an operation performed on the screen, where the operation is any operation in a plurality of consecutive operations, the plurality of consecutive operations include any one or any combination of a same operation mode, a same operation object, and a same region for an operation object, and the same operation mode includes either or both of a same operation gesture and a same operation direction for an operation gesture, and switching, in response to the operation, display of the application from the first mode to a second mode, where the first mode and the second mode each are any one of a full-screen mode, a window mode, a card mode, and a floating ball mode, and the first mode is different from the second mode.

According to some embodiments of this disclosure, the plurality of consecutive operations include either or both of the same operation mode or the same operation object, the plurality of consecutive operations are performed on the screen to control a size of a window of the application displayed on the screen to continuously change, and the processor executes the computer-executable instructions, to enable the electronic device to further perform the following step of switching, in response to the operation when the size of the window changes to a size that meets a preset size, the display of the application from the first mode to the second mode based on that the size of the window meets the preset size.

According to some embodiments of this disclosure, an operation mode of the plurality of consecutive operations is consecutive slide operations performed on the screen, and in response to the consecutive slide operations, the size of the window on the screen continuously increases or decreases until the display of the application is triggered to switch from the first mode to the second mode when the size of the window meets the preset size in response to one of the consecutive slide operations.

According to some embodiments of this disclosure, an operation object of the plurality of consecutive operations is the window, and the consecutive slide operations performed on the screen are a slide operation of dragging the window to slide from a first position to a second position on the screen, or consecutive slide operations performed on a first mode switching hotspot on the screen.

According to some embodiments of this disclosure, an operation object of the plurality of consecutive operations is the screen, the consecutive slide operations performed on the screen are slide operations from specified positions of the screen to other positions, and the specified positions of the screen include an edge of the screen and the window of the application.

According to some embodiments of this disclosure, the operation mode is a tap operation, the plurality of consecutive operations are consecutive tap operations performed on a window of the application, and the display of the application is triggered to switch from the first mode to the second mode when a size of the window meets a preset size in response to one of the consecutive operations.

According to some embodiments of this disclosure, an operation mode of the plurality of consecutive operations is a multi-finger pinch or a multi-finger scale-in operation, and the display of the application is triggered to switch from the first mode to the second mode when a size of a window meets a preset size in response to one of the consecutive operations.

According to some embodiments of this disclosure, the plurality of consecutive operations have the same operation gesture, in response to the plurality of consecutive operations performed on the screen, a size of the window displayed on the screen is controlled to continuously change, and the processor executes the computer-executable instructions, to enable the electronic device to further perform the following step of switching, in response to the operation when the position of the window changes to a position that meets a preset condition, the display of the application from the first mode to the second mode based on that the position of the window meets the preset condition.

According to some embodiments of this disclosure, the plurality of consecutive operations are consecutive slide operations, the plurality of consecutive operations are performed on the window on the screen, and the processor executes the computer-executable instructions, to enable the electronic device to further perform the following step of switching, when the position of the window changes to a position located in a preset hotspot in a second mode switching hotspot, the display of the application from the first mode to the second mode based on that the position of the window is located in the preset hotspot in the second mode switching hotspot.

According to some embodiments of this disclosure, the plurality of consecutive operations are consecutive slide operations, the plurality of consecutive operations are performed on the window on the screen, and the processor executes the computer-executable instructions, to enable the electronic device to further perform the following step of switching, when a size of the window changes to a preset size as the position of the window changes, the display of the application from the first mode to the second mode based on that the window of the preset size exits the screen.

According to some embodiments of this disclosure, the processor executes the computer-executable instructions, to enable the electronic device to further perform the following steps: extracting key information based on a characteristic of the application, and displaying a floating card, and displaying the key information in the floating card based on preset layouts of different key information.

According to some embodiments of this disclosure, the processor executes the computer-executable instructions, to enable the electronic device to further perform the following steps: receiving an operation performed on a window of the floating card, where a size of the window of the floating card is a first preset size, and displaying first key information in the window of the first preset size of the floating card, and switching, in response to the operation, the size of the window of the floating card from the first preset size to a second preset size, where the second preset size is different from the first preset size, and displaying second key information in the window of the second preset size of the floating card, where the second key information is different from the first key information.

According to a third aspect, an embodiment of this disclosure further provides a computer storage medium. The computer storage medium includes computer instructions, and when the computer instructions are run on an electronic device, the electronic device is enabled to perform the display method according to any possible implementation of the first aspect.

According to a fourth aspect, an embodiment of this disclosure further provides a computer program product. When program code included in the computer program product is executed by a processor in an electronic device, the display method according to any possible implementation of the first aspect is implemented.

For detailed descriptions of the second aspect to the fourth aspect and various implementations thereof in this disclosure, refer to detailed descriptions of the first aspect and the various implementations thereof. In addition, for beneficial effects of the second aspect to the fourth aspect and the implementations thereof, refer to the analysis of beneficial effects of the first aspect and the implementations thereof. Details are not described herein again.

BRIEF DESCRIPTION OF DRAWINGS

FIG. 2 is a schematic diagram of a software structure of an electronic device according to an embodiment of this disclosure;

FIG. 27 is a flowchart of a display method according to an embodiment of this disclosure.

DESCRIPTION OF EMBODIMENTS

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this disclosure, the term, such as "example" or "for example", is used to represent giving an example, an illustration, or a description. Any embodiment or design scheme described as "example" or "for example" in embodiments of this disclosure should not be explained as being more preferred or having more advantages than another embodiment or design scheme. Exactly, use of the term "example", "for example", or the like is intended to present a relative concept in a specific manner.

Unless otherwise defined, all technical and scientific terms used in this specification have same meanings as those usually understood by a person skilled in the art of this disclosure. Terms used in the specification of this disclosure are merely for the purpose of describing specific embodiments, but are not intended to limit this disclosure. It should be understood that in this disclosure, unless otherwise specified, "a plurality of" means two or more than two.

Figure 1:
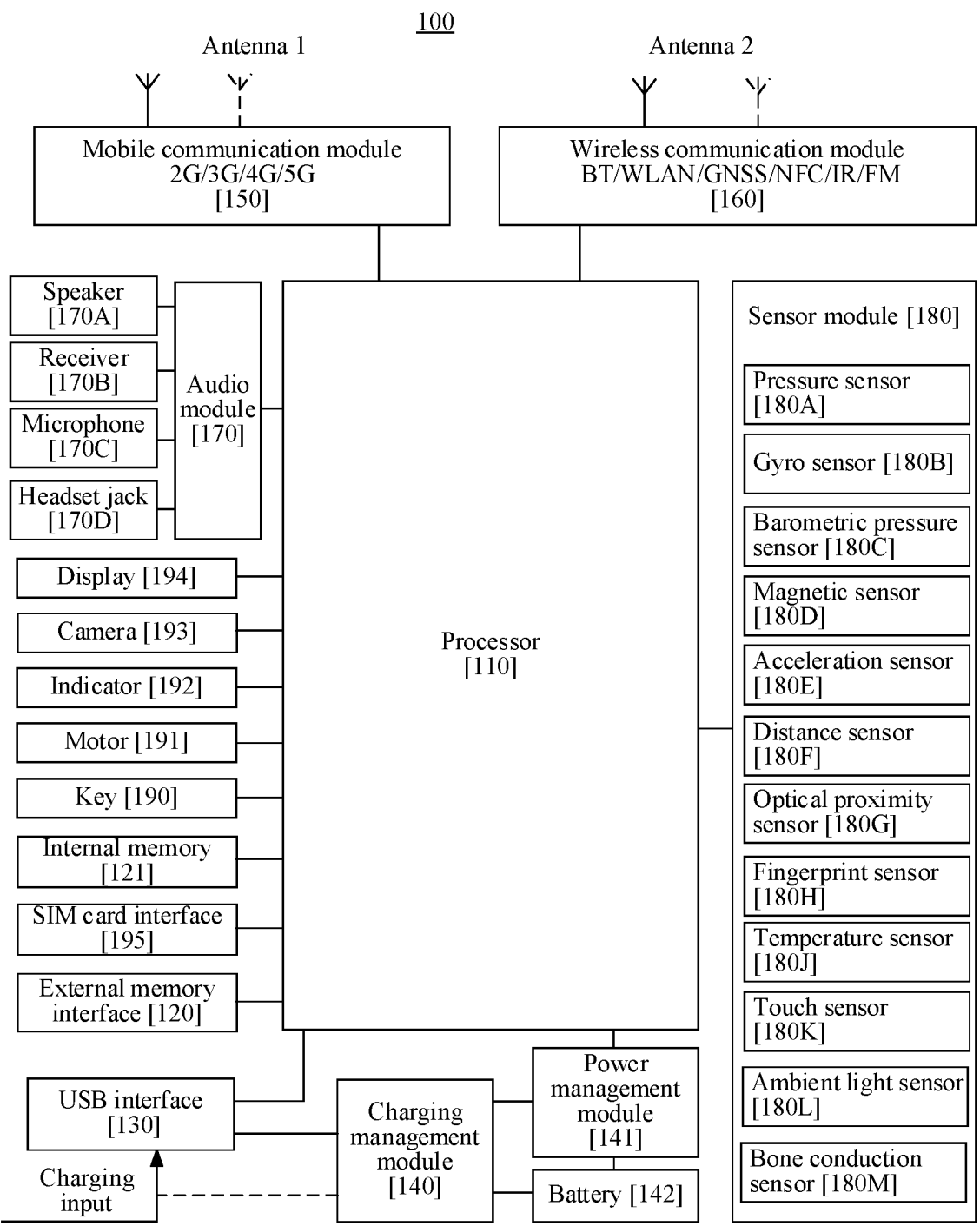
FIG. 1 is a schematic diagram of a hardware structure of an electronic device according to an embodiment of this disclosure.

FIG. 1 is a schematic diagram of a hardware structure of an electronic device according to an embodiment of this disclosure. FIG. 1 is a schematic structural diagram of an electronic device 100. The electronic device 100 may include at least one of a mobile phone, a tablet computer, a folding screen device, a smart screen device, a personal computer, a desktop computer, a laptop computer, a handheld computer, a notebook computer, an ultra-mobile personal computer (UMPC), a netbook, a personal digital assistant (PDA), a smart television, a cellular phone, and the like. A specific type of the electronic device 100 is not specially limited in embodiments of this disclosure.

The electronic device 100 may include a processor 110, an external memory interface 120, an internal memory 121, a Universal Serial Bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this disclosure does not constitute a specific limitation on the electronic device 100. In some other embodiments of this disclosure, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural processing unit (NPU), and/or the like. Different processing units may be independent components, or may be integrated into one or more processors.

The processor may generate an operation control signal based on an instruction operation code and a time sequence signal to complete control of instruction fetching and instruction execution.

A memory may be further arranged in the processor 110, and is configured to store instructions and data. In some embodiments, the memory in the processor 110 may be a cache. The memory may store an instruction or data that has been used by the processor 110 or that is frequently used by the processor 110. If the processor 110 needs to use the instruction or the data, the processor 110 may directly invoke the instruction or the data from the memory. This avoids repeated access, reduces waiting time of the processor 110, and improves system efficiency.

In some embodiments, the processor 110 may include one or more interfaces. The interface may include an Inter-Integrated Circuit (I2C) interface, an I2C Sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a USB interface, and/or the like. The processor 110 may be connected to modules such as a touch sensor, an audio module, a wireless communication module, a display, and a camera by at least one of the foregoing interfaces.

It may be understood that an interface connection relationship between the modules illustrated in this embodiment of this disclosure is merely an example for description, and constitutes no limitation on the structure of the electronic device 100. In some other embodiments of this disclosure, the electronic device 100 may alternatively use an interface connection manner different from that in the foregoing embodiment, or use a combination of a plurality of interface connection manners.

The USB interface 130 is an interface complying with a USB standard specification, and may be configured to connect the electronic device 100 and a peripheral device, and may be further a Mini USB connector, a Micro USB connector, a USB Type-C connector, or the like. The USB interface 130 may be configured to connect to a charger, so that the charger charges the electronic device 100, may be configured to connect to another electronic device, so that data is transmitted between the electronic device 100 and the other electronic device, or may be configured to connect to a headset, and output, through the headset, audio stored in the electronic device. The connector may also be configured to connect to another electronic device, for example, a virtual reality (VR) device. In some embodiments, the universal serial bus standard specification may be USB1.x, USB2.0, USB3.x, and USB4.

The charging management module 140 is configured to receive charging input from a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be arranged in the processor 110. In some other embodiments, the power management module 141 and the charging management module 140 may alternatively be arranged in a same device.

A wireless communication function of the electronic device 100 may be implemented via the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is applied to the electronic device 100 and that includes second generation (2G)/third generation (3G)/fourth generation (4G)/fifth generation (5G). The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be arranged in the processor 110. In some embodiments, at least some functional modules of the mobile communication module 150 may be arranged in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker

170A, the receiver 170B, or the like), or displays an image or a video by the display 194. In some embodiments, the modem processor may be an independent component. In some other embodiments, the modem processor may be independent of the processor 110, and is arranged in a same device as the mobile communication module 150 or another functional module.

The wireless communication module 160 may provide a wireless communication solution that is applied to the electronic device 100 and that includes a wireless local area network (WLAN) (such as a WI-FI) network, BLUETOOTH (BT), BT low energy (BLE), ultra-wideband (UWB), global navigation satellite system (GNSS), frequency modulation (FM), near field wireless communication technology (NFC), and infrared (IR) technology). The wireless communication module 160 may be one or more components integrating at least one communication processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 of the electronic device 100 is coupled to the mobile communication module 150, and the antenna 2 is coupled to the wireless communication module 160, so that the electronic device 100 can communicate with a network and another electronic device by using a wireless communication technology. The wireless communication technology may include a Global System for Mobile Communications (GSM), a General Packet Radio Service (GPRS), code-division multiple access (CDMA), wideband CDMA (WCDMA), time-division CDMA (TD-SCDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BEIDOU navigation satellite system (BDS), a quasi-zenith satellite system (QZSS), and/or a satellite based augmentation system (SBAS).

The electronic device 100 may implement a display function via the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid-crystal display (LCD), an organic light-emitting diode (LED) (OLED), an active-matrix OLED (AMOLED), a flexible LED (FLED), a mini-LED, a micro-LED, a micro-OLED, a quantum dot LED (QLED), or the like. In some embodiments, the electronic device 100 may include one or more displays 194.

The electronic device 100 may implement a photographing function via the camera module 193, the ISP, the video codec, the GPU, the display 194, the AP, the NPU, and the like.

The camera module 193 may be configured to collect color image data and depth data of a photographed object. The ISP may be configured to process the color image data collected by the camera module 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be arranged in the camera module 193.

In some embodiments, the camera module 193 may include a color camera module and a three-dimensional (3D) sensing module.

In some embodiments, a light-sensitive element of a camera of the color camera module may be a charge-coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as red, green, and blue (RGB) or luma, blue projection, and red projection (YUV).

In some embodiments, the 3D sensing module may be a time of flight (TOF) 3D sensing module or a structured light 3D sensing module. Structured light 3D sensing is an active depth sensing technology, and basic components of the structured light 3D sensing module may include an infrared emitter, an IR camera module, and the like. A working principle of the structured light 3D sensing module is to first emit a light spot (pattern) of a specific pattern to a photographed object, then receive light spot pattern code (light coding) on a surface of the object, further compare the light spot with an originally projected light spot in terms of a similarity and a difference, and calculate three-dimensional coordinates of the object according to a trigonometric principle. The three-dimensional coordinates include a distance between the electronic device 100 and the photographed object. The TOF 3D sensing may be an active depth sensing technology, and basic components of the TOF 3D sensing module may include an infrared emitter, an IR camera module, and the like. A working principle of the TOF 3D sensing module is to calculate a distance (that is, a depth) between the TOF 3D sensing module and a photographed object based on an infrared refraction time, to obtain a 3D depth-of-field image.

The structured light 3D sensing module may be further applied to fields such as facial recognition, somatic game console, and industrial machine vision detection. The TOF 3D sensing module may be further applied to fields such as a game console and augmented reality (AR)/VR.

In some other embodiments, the camera module 193 may further include two or more cameras. The two or more cameras may include a color camera, and the color camera may be configured to collect color image data of a photographed object. The two or more cameras may collect depth data of a photographed object by using a stereo vision technology. The stereo vision technology is based on a principle of a parallax of human eyes. Under a natural light source, two or more cameras are used to photograph an image of a same object from different angles, and then an operation such as a triangulation method is performed to obtain distance information, that is, depth information, between the electronic device 100 and the photographed object.

In some embodiments, the electronic device 100 may include one or more camera modules 193. Further, the electronic device 100 may include one front-facing camera module 193 and one rear-facing camera module 193. The front-facing camera module 193 may be usually configured to collect color image data and depth data of a photographer facing the display 194, and the rear-facing camera module may be configured to collect color image data and depth data of a photographed object (such as a character or a scenery) facing the photographer.

In some embodiments, a central processing unit (CPU), the GPU, or the NPU in the processor 110 may process color image data and depth data collected by the camera module 193. In some embodiments, the NPU may identify, based on a neural network algorithm on which a skeleton point identification technology is based, for example, a convolutional neural network (CNN) algorithm, color image data collected by the camera module 193 (further, the color camera module), to determine skeleton points of the photographed character. The CPU or the GPU may also run a neural network algorithm to determine the skeleton points of the photographed character based on the color image data. In some embodiments, the CPU, the GPU, or the NPU may be further configured to determine the figure (for example, a body proportion and a fatness status of a body part between skeleton points) of the photographed character based on depth data collected by the camera module 193 (which may be a 3D sensing module) and the recognized skeleton points, further determine a body beautification parameter for the photographed character, and finally process the photographed image of the photographed character based on the body beautification parameter, so that a body shape of the photographed person in the photographed image is beautified. In a subsequent embodiment, how to perform body shaping processing on an image of a photographed character based on color image data and depth data that are collected by the camera module 193 is described in detail. Details are not described herein.

The digital signal processor is configured to process a digital signal, and may further process another digital signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play back or record videos in a plurality of coding formats, for example, Moving Picture Experts Group (MPEG)-1, MPEG-2, MPEG-3, and MPEG-4.

The NPU is a neural-network (NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be used to connect to an external storage card, for example, a micro Secure Digital (SD) card, to extend a storage capability of the electronic device 100. The external memory card communicates with the processor 110 through the external memory interface 120, to implement a data storage function.

For example, files such as music and videos are stored in the external storage card. Alternatively, files, such as music and a video, are transmitted from an electronic device to an external storage card.

The internal memory 121 may be configured to store computer-executable program code. The executable program code includes instructions. The internal memory 121 may include a program storage region and a data storage region. The program storage region may store an operating system, an application required by at least one function (for example, a voice playing function or an image playing function), and the like. The data storage region may store data (such as audio data and an address book) created during use of the electronic device 100, and the like. In addition, the internal memory 121 may include a high-speed random-access memory (RAM), or may include a nonvolatile memory, for example, at least one magnetic disk storage device, a flash memory, or a Universal Flash Storage (UFS). The processor 110 runs the instructions stored in the internal memory 121 and/or the instructions stored in the memory arranged in the processor, to perform various function methods or data processing of the electronic device 100.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be arranged in the processor 110, or some functional modules in the audio module 170 are arranged in the processor 110.

The speaker 170A, also referred to as a "loudspeaker", is configured to convert an audio electrical signal into a sound signal. The electronic device 100 may be used to listen to music via the speaker 170A, or output a hands-free audio signal.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be arranged in the electronic device 100. In some other embodiments, two microphones 170C may be arranged in the electronic device 100, to collect a sound signal and implement a noise reduction function. In some other embodiments, three, four, or more microphones 170C may alternatively be arranged in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 millimeter (mm) open mobile terminal platform (OMTP) standard interface or cellular telecommunications industry association of the United States of America (USA) (CTIA) standard interface.

The pressure sensor 180A is configured to sense a pressure signal, and can convert the pressure signal into an electrical signal. In some embodiments, the pressure sensor 180A may be arranged on the display 194. There is a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on a Short Message Service (SMS) message application icon, an instruction for viewing an SMS message is performed. When a touch operation whose touch operation intensity is greater than or equal to the first pressure threshold is performed on the SMS message application icon, an instruction for creating a new SMS message is performed.

The gyro sensor 180B may be configured to determine a moving posture of the electronic device 100. In some embodiments, an angular velocity of the electronic device 100 around three axes (namely, axes x, y, and z) may be determined through the gyro sensor 180B. The gyro sensor 180B may be configured to implement image stabilization during photographing. For example, when the shutter is pressed, the gyro sensor 180B detects an angle at which the electronic device 100 shakes, calculates, based on the angle, a distance for which a lens module needs to compensate, and controls a lens to cancel shake of the electronic device 100 through reverse motion, to implement image stabilization. The gyro sensor 180B may also be used in a navigation scenario and a somatic game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip cover by using the magnetic sensor 180D. When the electronic device is a foldable electronic device, the magnetic sensor 180D may be configured to detect folding or spreading, or a folding angle of the electronic device. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, an LED and an optical detector, for example, a photodiode. The LED may be an infrared LED. The electronic device 100 emits infrared light via the LED. The electronic device 100 detects infrared reflected light from a nearby object through the photodiode. When the intensity of the detected reflected light is greater than the threshold, it may be determined that there is an object near the electronic device 100. When the intensity of the detected reflected light is less than the threshold, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L may be configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is blocked, for example, the electronic device is in a pocket. When it is detected that the electronic device is blocked or in a pocket, some functions (for example, a touch function) may be disabled to prevent a misoperation.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature detected by the temperature sensor 180J exceeds a threshold, the electronic device 100 lowers performance of the processor, to reduce power consumption of the electronic device to implement thermal protection. In some other embodiments, when the temperature detected by the temperature sensor 180J is lower than another threshold, the electronic device 100 heats the battery 142. In some other embodiments, when the temperature is below another threshold, the electronic device 100 may boost the output voltage of the battery 142.

The touch sensor 180K is also referred to as a "touch component". The touch sensor 180K may be arranged on the display 194, and the touch sensor 180K and the display 194 constitute a touchscreen, which is also referred to as a "touchscreen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be arranged on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be arranged in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 may include a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different regions of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or more SIM card interfaces. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a micro-kernel architecture, a micro service architecture, or a cloud architecture. In an embodiment of this disclosure, an ANDROID system with a layered architecture is used as an example to describe a software structure of the electronic device 100.

FIG. 2 is a schematic diagram of a software structure of an electronic device 100 according to an embodiment of this disclosure.

In a layered architecture, software is divided into several layers, and each layer has a clear role and task. The layers communicate with each other through a software interface. In some embodiments, the ANDROID system is divided into five layers: an application layer, an application framework layer, an ANDROID runtime (ART) and a native C/C++ library, a hardware abstraction layer (HAL), and a kernel layer from top to bottom.

The application layer may include a series of application packages.

As shown in FIG. 2, the application packages may include applications such as Camera, Gallery, Calendar, Phone, Map, Navigation, WLAN, BT, Music, Videos, and Messages.

The application framework layer provides an application programming interface (API) and a programming framework for an application at the application layer. The application framework layer includes some predefined functions.

As shown in FIG. 2, the application framework layer may include a window manager, a content provider, a view system, a resource manager, a notification manager, an activity manager, an input manager, and the like.

The window manager provides a window manager service (WMS). The WMS can be used for window management, window animation management, surface management, and as a transit station of the input system.

The content provider is configured to store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The activity manager may provide an activity manager service (AMS), and the AMS may be for starting, switching, and scheduling system components (such as activities, services, content providers, and broadcast receivers), and managing and scheduling application processes.

The input manager may provide an input manager service (IMS), and the IMS may be for managing system input, for example, touchscreen input, key input, and sensor input. The IMS obtains an event from an input device node and allocates the event to a proper window by interacting with the WMS.

The ANDROID runtime includes a core library and an ANDROID runtime. The ANDROID runtime is responsible for converting source code into machine code. The ANDROID runtime mainly includes use of encoding technologies such as ahead of time (AOT) and just in time (JIT).

The core library mainly provides basic JAVA class library functions such as a basic data structure library, a mathematic library, an input/output (I/O) library, a tool library, a database library, and a network library. The core library provides APIs for users to develop ANDROID applications.

The native C/C++ library may include a plurality of functional modules, for example, a surface manager, a media framework, libc, OpenGL embedded system (ES), SQLite, and Webkit.

The surface manager is configured to manage a display subsystem, and provide fusion of two-dimensional (2D) and 3D layers for a plurality of applications. The media framework supports playback and recording in a plurality of commonly used audio and video formats, static image files, and the like. The media library may support a plurality of audio and video encoding formats, for example, MPEG-4, H.264, MPEG-1 Audio Layer III or MPEG-2 Audio Layer III (MP3), Advanced Audio Coding (AAC), Adaptive Multi-Rate (AMR), Joint Photographic Experts Group (JPEG), and Portable Network Graphics (PNG). OpenGL ES provides drawing and operations for 2D and 3D graphics in applications. SQLite provides a lightweight relational database for an application of the electronic device 100.

The hardware abstraction layer runs in a user space, encapsulates a kernel layer driver, and provides a calling interface for an upper layer.

The kernel layer is a layer between hardware and software. The kernel layer includes at least a display driver, a camera driver, an audio driver, and a sensor driver.

For better understanding of this disclosure, the following first describes some terms and concepts in this disclosure. A screen provides a device with a capability of presenting a user interface and/or receiving a user input. The screen may be a touchscreen.

A desktop refers to a screen space of a screen currently used by an electronic device.

Figure 3A:
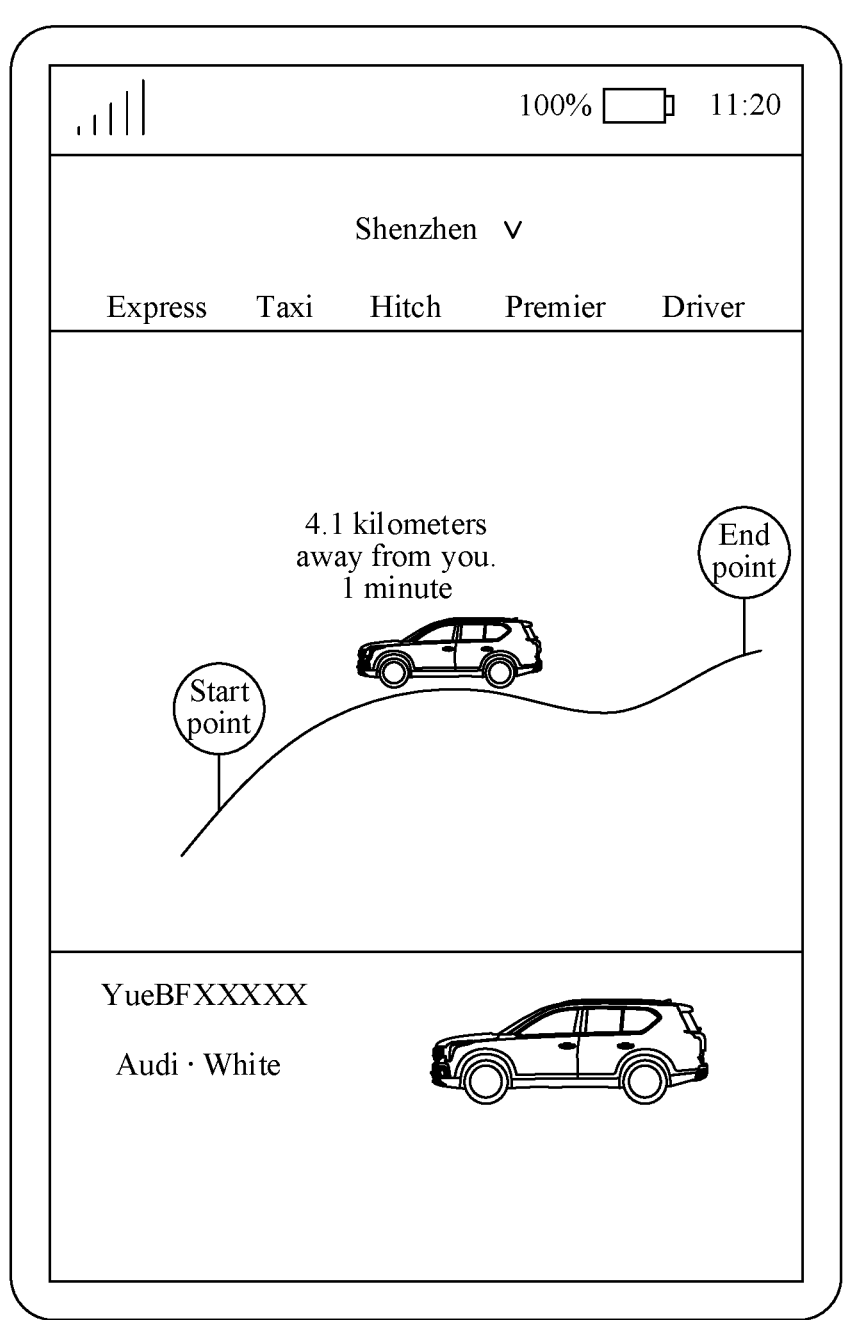
FIG. 3A, FIG. 3B, FIG. 3C, and FIG. 3D are schematic diagrams of application interfaces according to an embodiment of this disclosure.

A full-screen mode means that a user interface of an application is maximized to fill up an entire desktop, as shown in FIG. 3A. The full-screen mode may be directly switched to any one of a window mode, a card mode, or a floating ball mode, or may be directly switched to from any one of the window mode, the card mode, or the floating ball mode. In the full-screen mode and the window mode, the card mode, and the floating ball mode that are described below, for ease of description, a full-screen window in the full-screen mode is referred to as a display window, a window of a floating window in the window mode is referred to as a floating window, a window of a floating card in the card mode is referred to as a floating card, and a window of a floating ball in the floating ball mode is referred to as a floating ball.

Figure 3B:
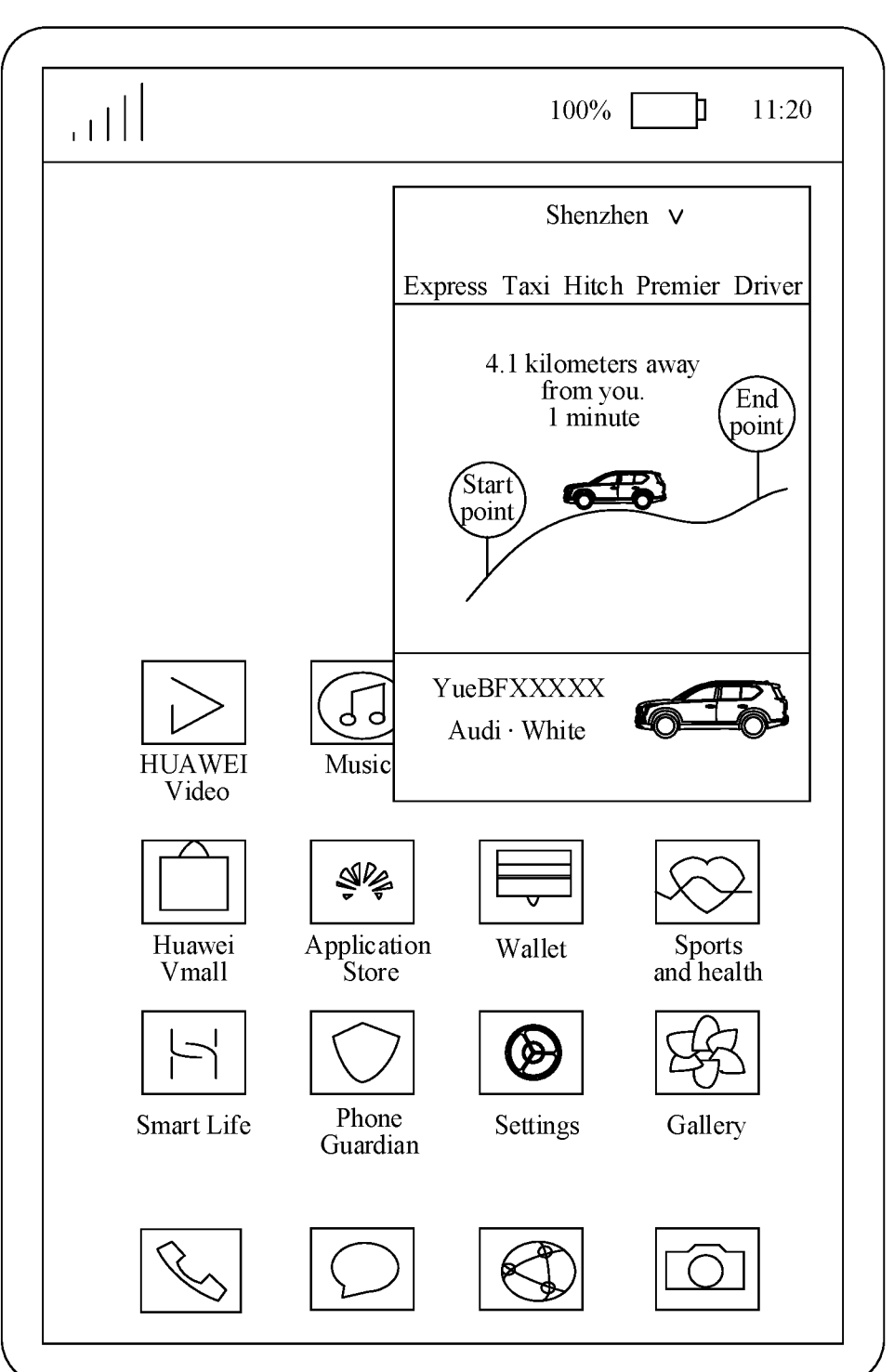

The window mode means that a user interface of an application is displayed in a floating window, and a position of the user interface is a movable or unmovable floating window, as shown in FIG. 3B. A size of a floating window in which a user interface of an application in the window mode is located is less than a size of a window in which the user interface of the application in the full-screen mode is located. The window mode may be directly switched to any one of the full-screen mode, the card mode, or the floating ball mode, or may be directly switched to from any one of the full-screen mode, the card mode, or the floating ball mode. Although FIG. 3B and the following accompanying drawings may show that a window floats only on a home screen, it may be understood that the window may also float on a user interface of a started application. Although FIG. 3B and the following accompanying drawings only show that a multi-task interface is entered in response to an operation when the home screen is displayed, it may be understood that a multi-task interface is also entered in response to the operation when the user interface of the started application is displayed. This is not limited in this disclosure. The window may be any one of the following windows: a window of a floating window, a window of a floating card, or a window of a floating ball.

The mini mode refers to a mode in the conventional art. In the mini mode, a user interface of an application is displayed in a floating window. A size of a floating window in which a user interface of an application in the mini mode is located is less than a size of a floating window in which the user interface of the application in the window mode is located. The mini mode is a proportionally reduced version of the window mode.

Figure 3C:
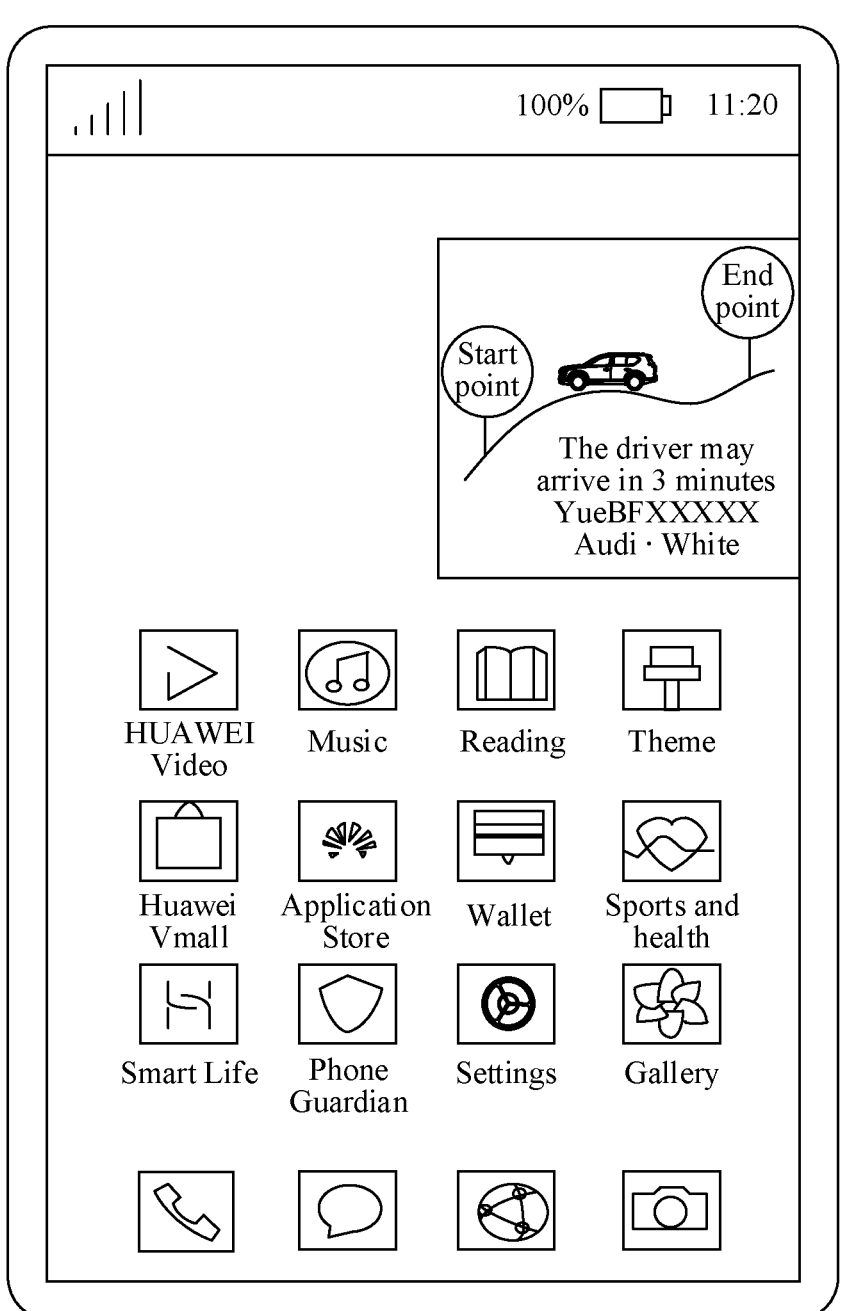

The card mode means that key information extracted from a user interface of an application is displayed in a floating card based on a preset layout, as shown in FIG. 3C. The key information may be extracted based on application characteristics (or features) of the application. A size of a floating card in which key information in an application in the card mode is located may be less than a size of a floating window in which the user interface of the application in the window mode is located. The card mode may be directly switched to any one of the full-screen mode, the window mode, or the floating ball mode, or may be directly switched to from any one of the full-screen mode, the window mode, or the floating ball mode.

Figure 3D:
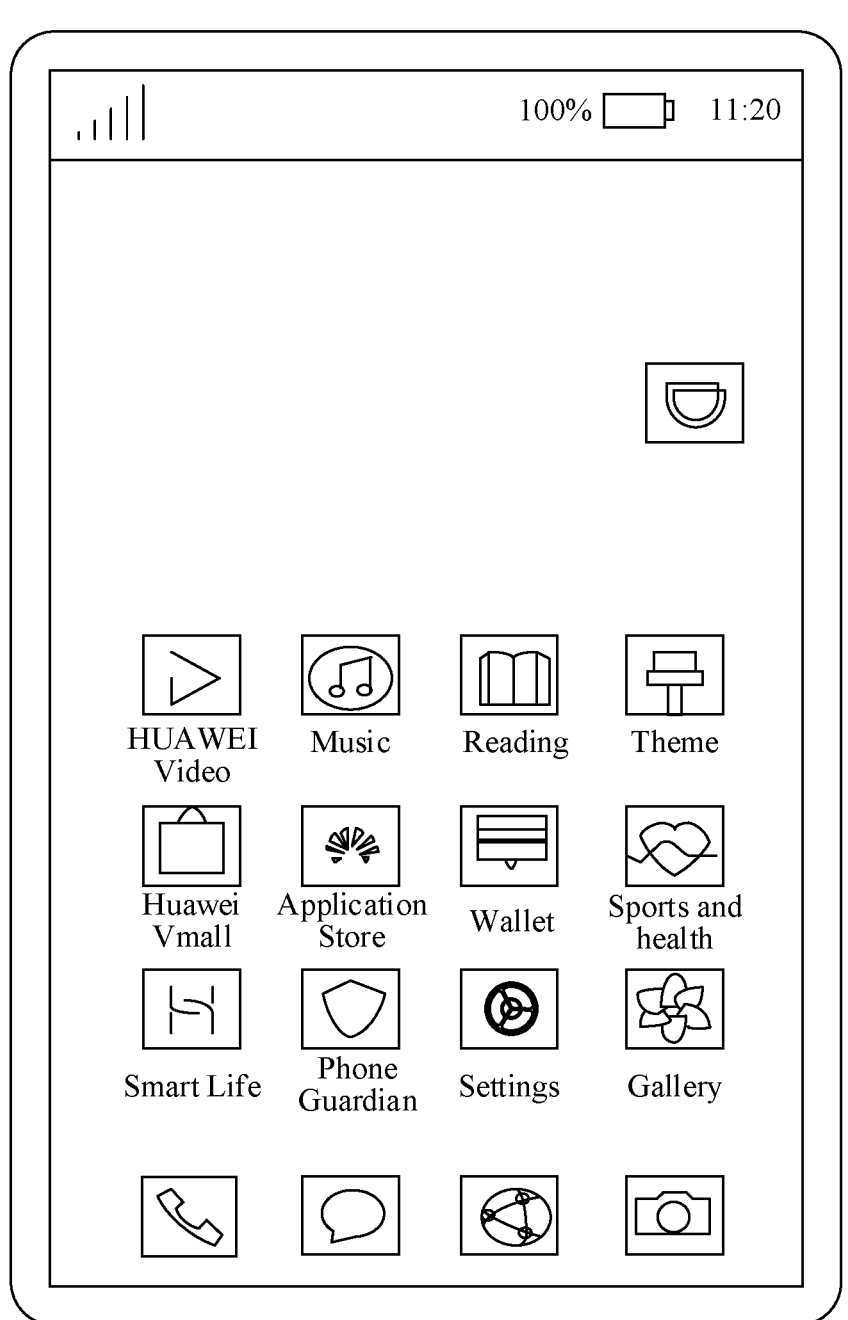

The floating ball mode means that an application floats and is displayed in a floating ball state, as shown in FIG. 3D. The floating ball may display an icon of the application, a name of the application, an icon and a name of the application, or the like. The floating ball mode may be directly switched to any one of the full-screen mode, the window mode, or the card mode, or may be directly switched to from any one of the full-screen mode, the window mode, or the card mode. In a scenario in which the floating ball mode and the card mode are mutually switched, information displayed in the floating ball mode is different from information displayed in the card mode. For example, the card mode may provide more display content than the floating ball mode.

The following describes in detail solutions provided in embodiments of this disclosure by using an example in which embodiments of this disclosure are applied to a mobile phone.

First, in Embodiment 1 to Embodiment 6, a specific application scenario is used as an example to describe a display method in this disclosure. In the specific application scenario, a user is using taxi hailing software while wanting to view a calendar, and expects that information in the taxi hailing software does not block viewing the calendar.

Figure 4A:
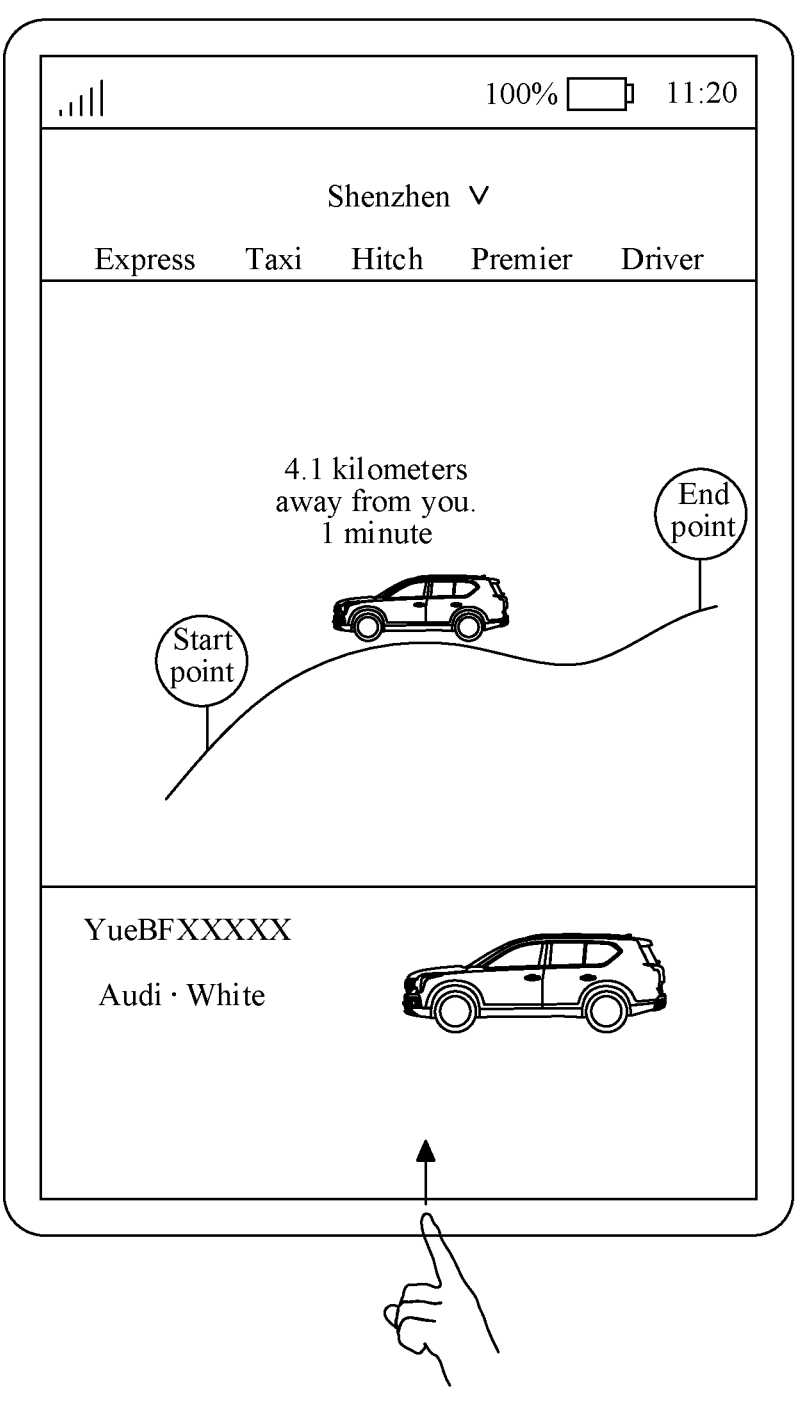
FIG. 4A, FIG. 4B, FIG. 4C, and FIG. 4D are schematic diagrams of some application interfaces according to an embodiment of this disclosure.

A display method in Embodiment 1 of this disclosure is described below by using an example in which a user is using taxi hailing software in full screen, as shown in FIG. 4A. In FIG. 4A, the using taxi hailing software in full screen means that a status bar is also displayed when a display window is displayed on a desktop. A user interface of the taxi hailing software is displayed in the display window. The display window occupies most of the desktop. The status bar may include signal strength, time, current remaining power, and the like. It should be understood that the status bar may display more or less information than that shown in the figure. For example, the status bar may further include a name of an operator (for example, China Mobile), a WI-FI icon, BLUETOOTH, and an alarm clock. This is not limited in this disclosure. Optionally, a floating shortcut menu (for example, Assistive Touch of Apple) and the like may be further displayed on the desktop. Optionally, the using taxi hailing software in full screen may further mean that the display window is maximized to fill up the entire desktop, and the entire desktop does not display other content. A user interface of the taxi hailing software is displayed in the display window. Optionally, the using taxi hailing software in full screen may alternatively mean that only a part of a display region of a screen is occupied. For example, when the screen is an anisotropic cutting screen (notch screen), a middle part of the anisotropic cutting screen displays the user interface of the taxi hailing software, and one side edge part or two side edge parts of the anisotropic cutting screen are off.

Figure 4B:
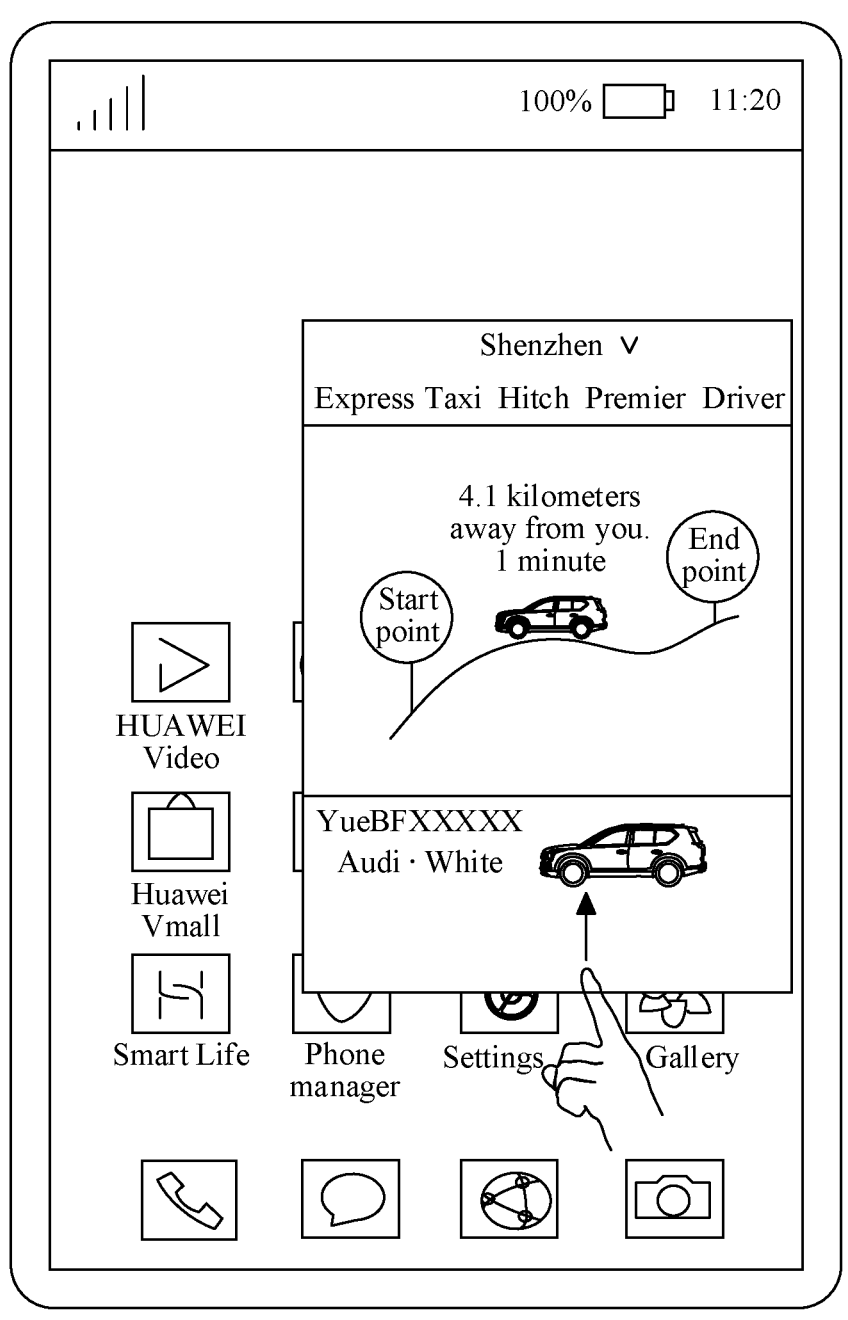
Figure 4C:
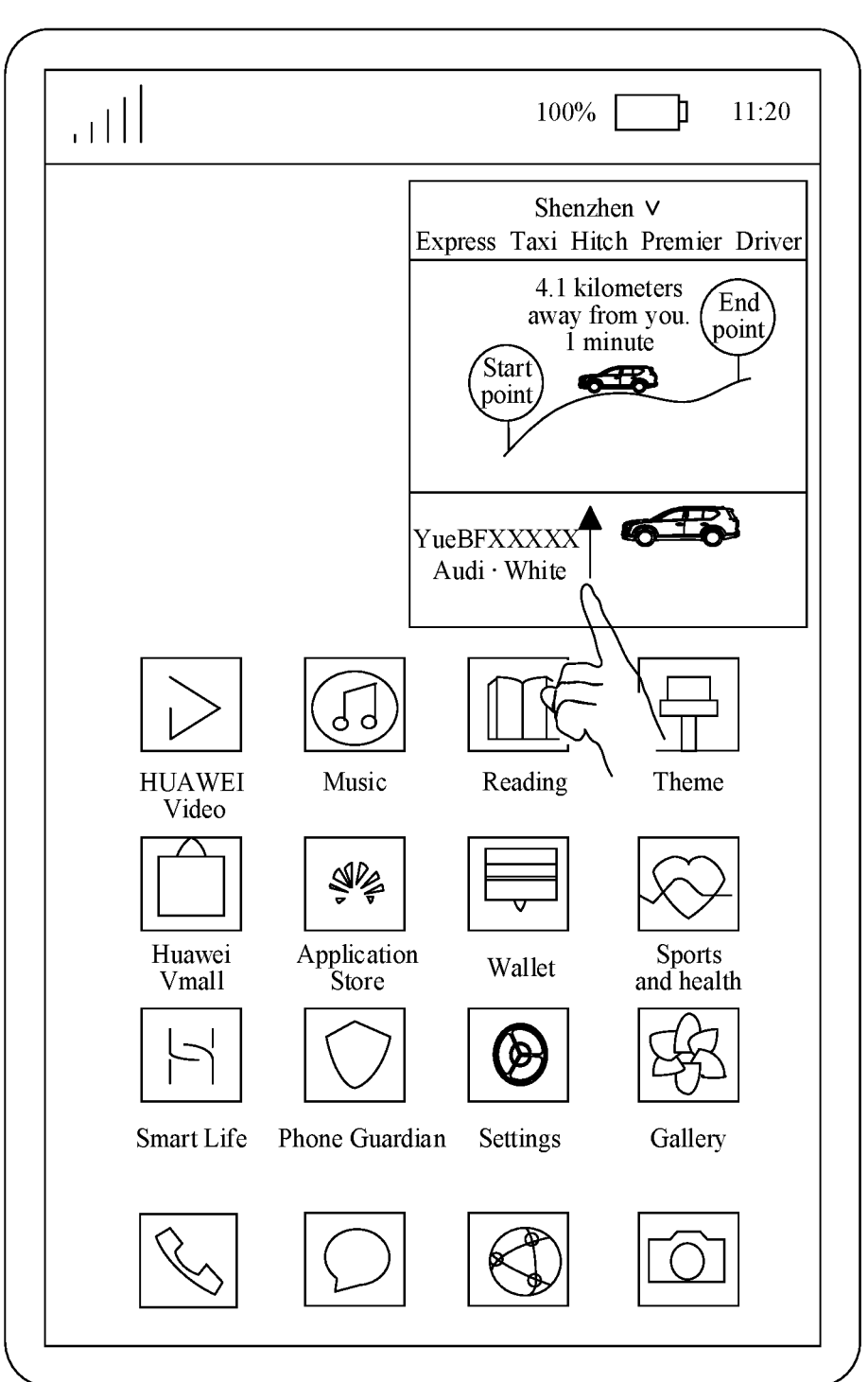
Figure 4D:
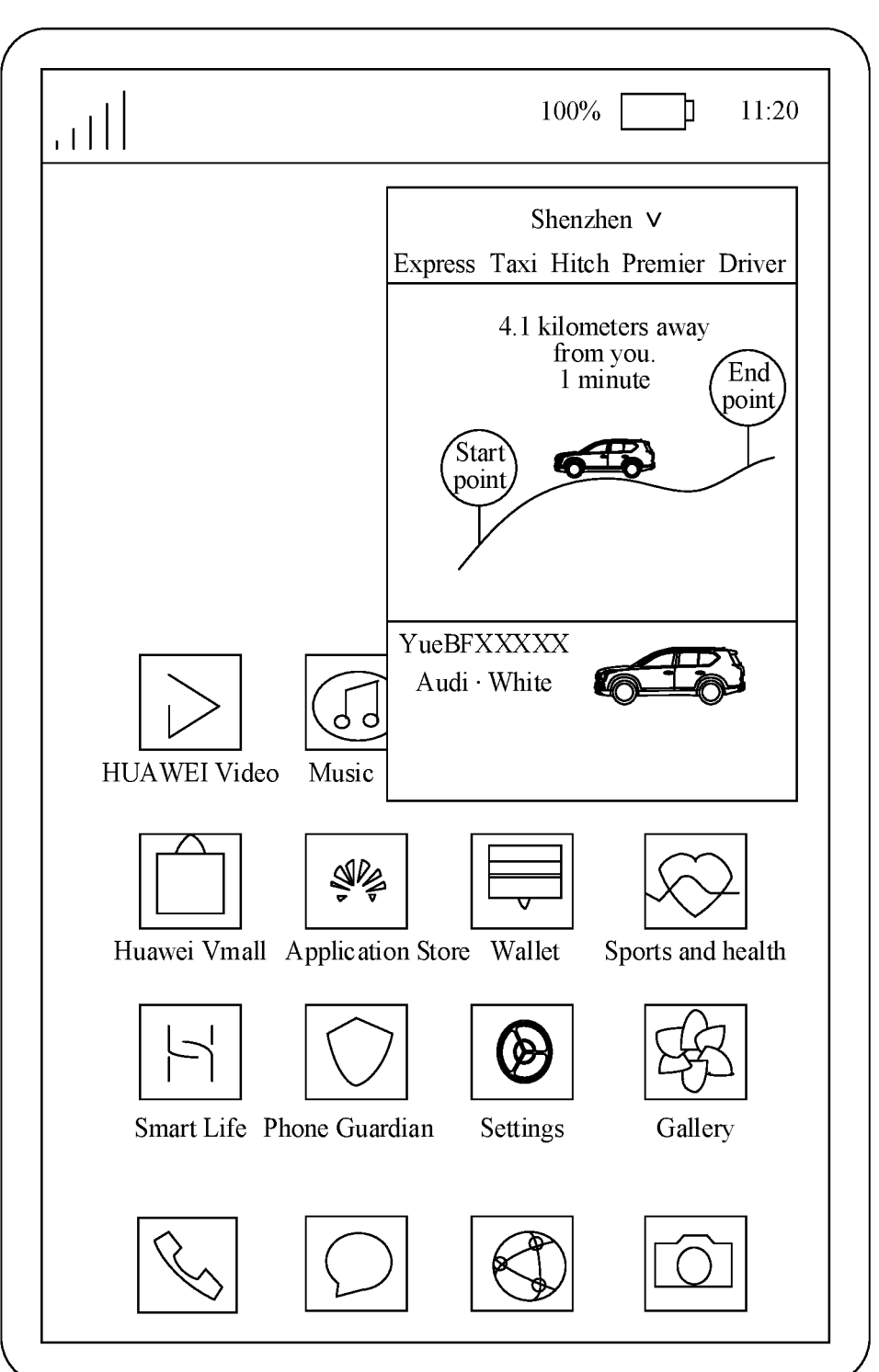

When the user uses the taxi hailing software in full screen while wanting to view a calendar, the user may perform a preset slide operation, for example, sliding upward from a bottom edge of the screen, as shown in FIG. 4A. The sliding upward from the bottom edge of the screen may be sliding upward from a central edge position at the bottom of the screen, or may be sliding upward from a left edge position or a right edge position at the bottom of the screen, or the like. In response to the slide operation, the display window is scaled out from edges of the window to the center of the window, as shown in FIG. 4B. In this case, as shown in FIG. 4B, the slide operation continues, and the display window may continue to change with the slide operation (as shown in FIG. 4C), that is, is animated with a hand, so that a height of the display window is less than a preset height (for example, $\frac{1}{2}$ height) of the screen. In this case, the finger is directly released, and the display window becomes a floating window, as shown in FIG. 4D. A size of the floating window may be a preset default size or a size preset by the user.

Optionally, the preset slide operation may alternatively be sliding from left to right of the screen, sliding from right to left of the screen, sliding from top to bottom of the screen, or the like.

Optionally, when a width of the display window is less than a preset width (for example, $\frac{1}{2}$ width) of the screen, the finger may be directly released, and the display window becomes a floating window.

Optionally, the display window may be further scaled out along a preset direction (for example, a horizontal/vertical direction) and the like. To be specific, when the user interface in the display window is compressed along the preset direction, and a size (width/height) of the display window in the preset direction is less than a preset value of the screen, the finger is directly released, and the display window becomes a floating window. This is not limited in this disclosure. For example, when the preset slide operation is sliding from left to right of the screen or sliding from right to left of the screen, the display window is scaled out along a horizontal direction. When the width of the display window is less than the preset width (for example, $\frac{1}{2}$ width) of the screen, the finger is directly released, and the display window becomes a floating window. Alternatively, when the preset slide operation is sliding from bottom to top of the screen or sliding from top to bottom of the screen, the display window is scaled out along a vertical direction. When the height of the display window is less than the preset height (for example, ½ height) of the screen, the finger is directly released, and the display window becomes a floating window, that is, is switched from a full-screen mode to a window mode. A size of the floating window in the window mode is less than a size of the display window in the full-screen mode.

Figure 5A:
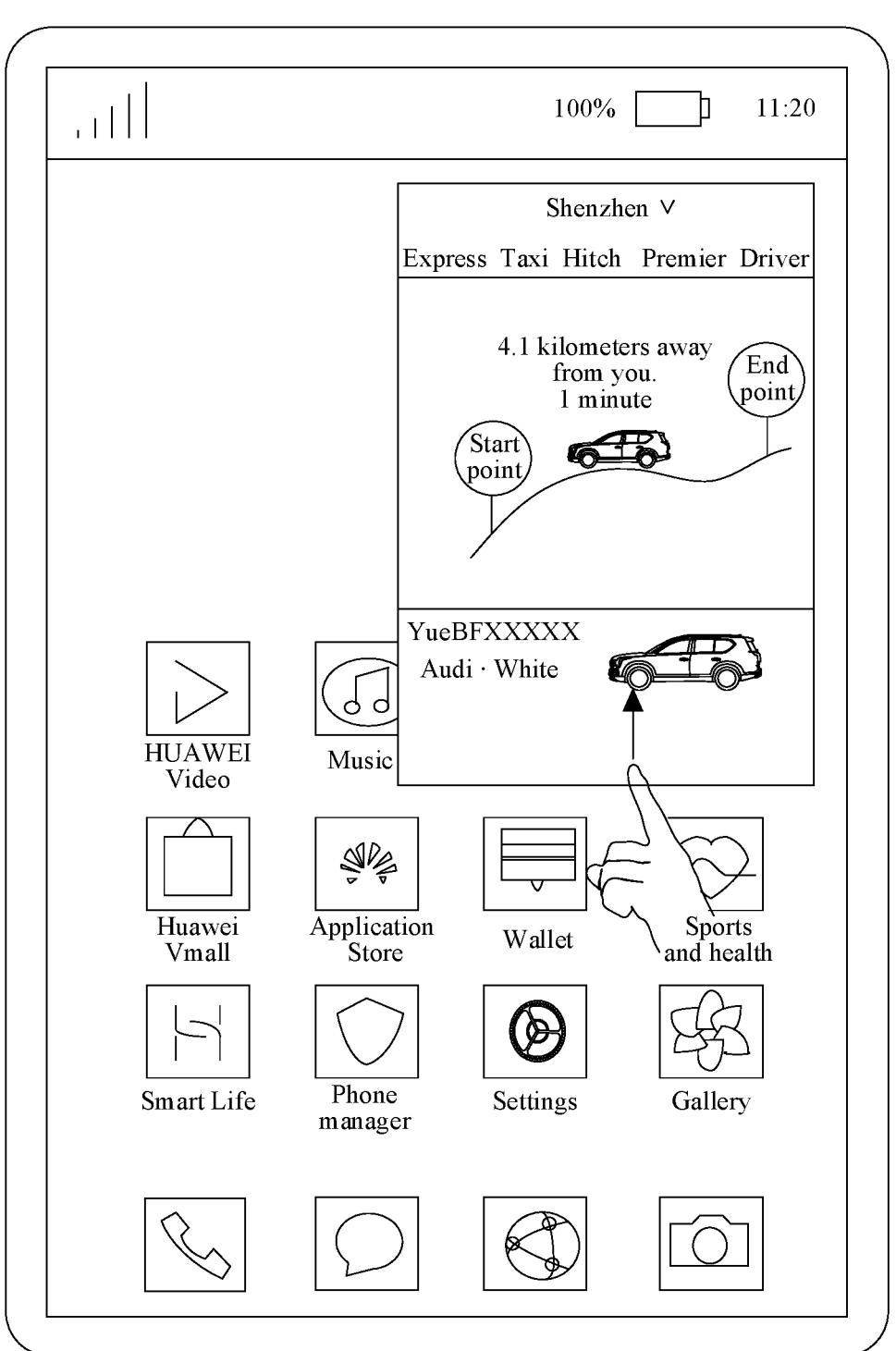
FIG. 5A, FIG. 5B, and FIG. 5C are schematic diagrams of some application interfaces according to an embodiment of this disclosure.
Figure 5B:
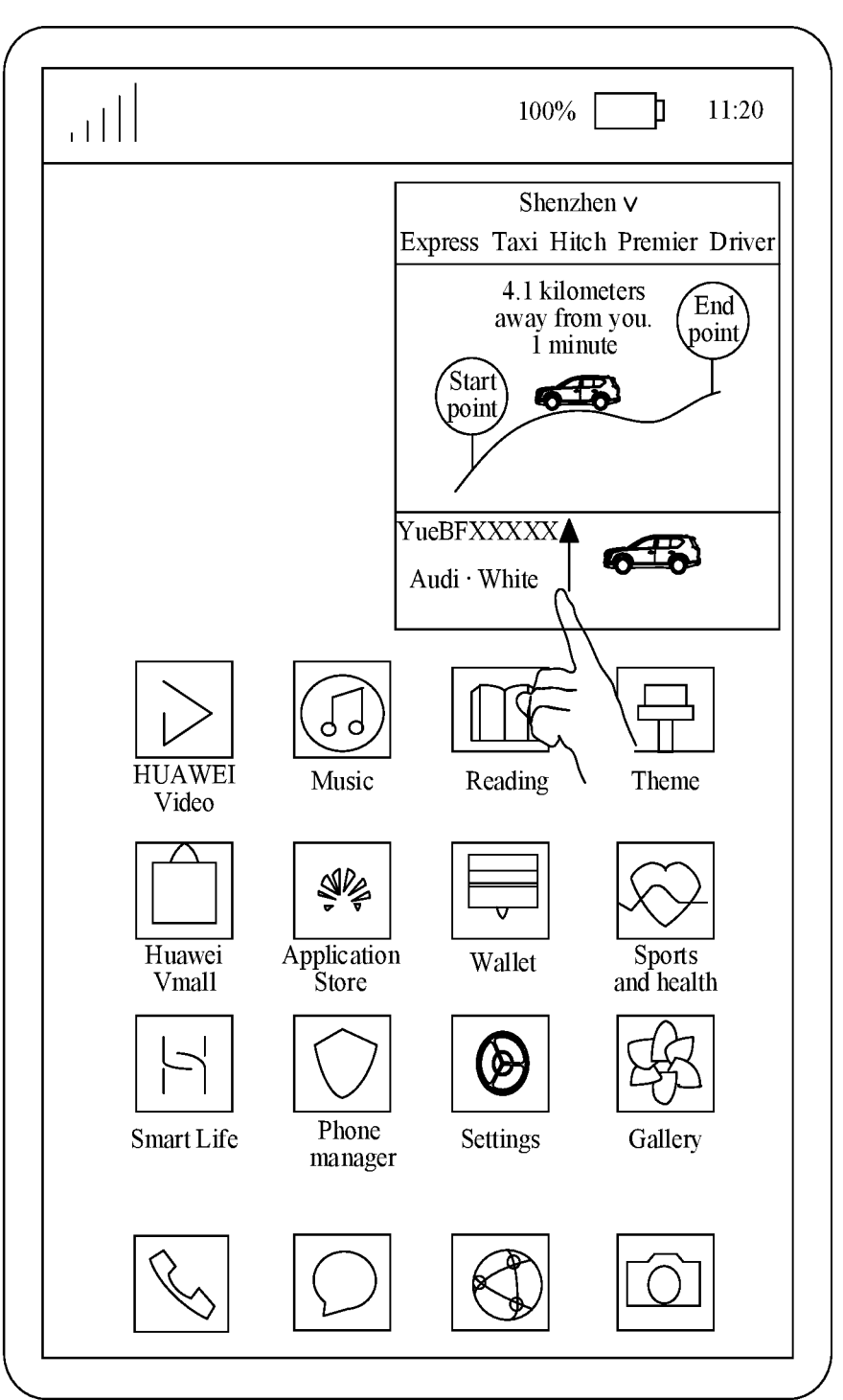
Figure 5C:
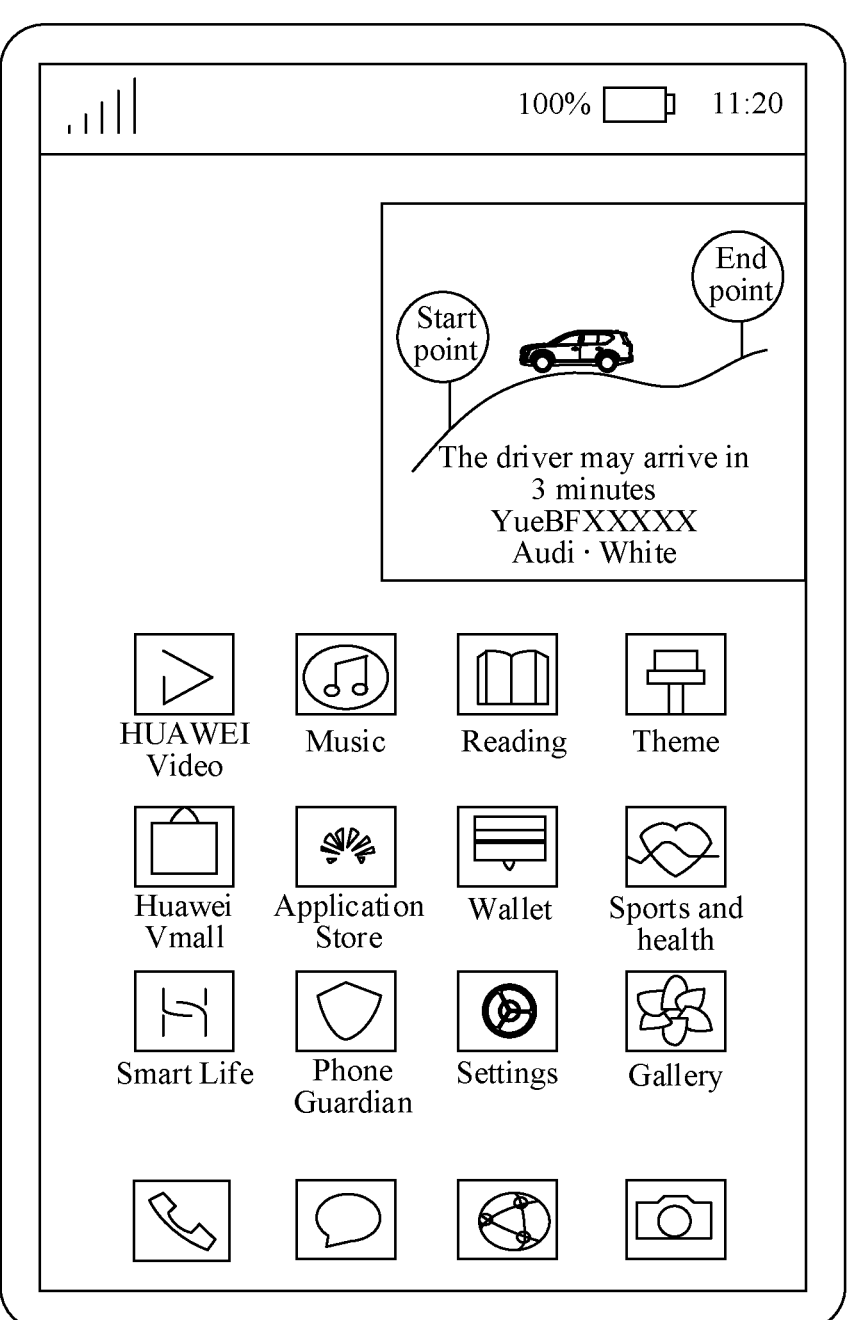

The user may drag the floating window to scale out the floating window. As shown in FIG. 5A, the user may drag a preset position of the floating window to slide upward, for example, drag an edge of the floating window to slide upward. In response to the drag operation, the floating window continues to scale out toward the center of the screen, so that the size of the floating window is less than a preset size, for example, a size of a 2×2 desktop grid, as shown in FIG. 5B. A widget (a widget, that is, a tiny program view) may be embedded into the desktop, and a size of the widget may be fixed. A grid design, for example, a 4×4 grid or a 5×5 grid, is used on the desktop, that is, four rows and four columns of widgets or five rows and five columns of widgets are arranged on the desktop. The 2×2 desktop grid means two rows and two columns of widgets in a 4×4 grid or a 5×5 grid. In this case, the mobile phone extracts key information from the user interface of the application displayed in the floating window, displays a floating card, and displays the key information in the floating card based on preset layouts of different key information, as shown in FIG. 5C. In this case, the mobile phone switches from the window mode to a card mode. The key information may be extracted based on application characteristics of the application. A size of the floating card is less than the size of the floating window, and a degree of detail of information displayed in the floating card is lower than or equal to a degree of detail of information displayed in the floating window.

Optionally, the user may drag a middle position or another position of the floating window to move upward, and in response to the drag operation, the display window continues to scale out toward the center of the screen. Optionally, the display window may continue to scale out along a preset direction (for example, a horizontal/vertical direction), so that a width/height of the display window is less than a preset width/height, for example, a size of a 2 desktop grid. In this case, the mobile phone switches from a window mode to a card mode. For example, the display window may continue to scale out along the horizontal direction, so that the width of the display window is less than the preset width, for example, a width of the 2 desktop grid. In this case, the mobile phone switches from the window mode to the card mode. The display window may continue to scale out along the vertical direction, so that the height of the display window is less than the preset height, for example, a height of the 2 desktop grid. In this case, the mobile phone switches from the window mode to the card mode. Optionally, the user may drag the floating window to a preset region of the screen, for example, an upper right corner or an upper left corner, and in response to the drag operation, the mobile phone switches from the window mode to the card mode. Optionally, the user may drag the floating window to a preset edge of the screen, for example, a topmost edge, and in response to the drag operation, the mobile phone switches from the window mode to the card mode. Optionally, the user may drag the floating window to a preset hotspot on the screen, and in response to the drag operation, the mobile phone switches from the window mode to the card mode.

Different types of applications have different application characteristics, as shown in Table 1. The different types may include travel, life service, finance, agenda, sports and health, entertainment, and the like. An application of the travel type may include DiDi Dache, BAIDU Dache, and the like. An application of the life service type may include Meituan, Dianping, and the like. An application of the financial type may include a bank APP, ALIPAY, and the like. An application of the agenda type may include Agenda, Calendar, and the like. An application of the sports and health type may include Keep, Sports and Health, and the like. An application of the entertainment type may include iQIYI, TENCENT Video, YOUKU, and the like. Application characteristics of different types of applications may be, for example an application characteristic of an application of the travel type may be a vehicle status, an application characteristic of an application of the life service type may be a food status, an application characteristic of an application of the financial type may be a payment, an application characteristic of an application of the agenda type may be agenda content, an application characteristic of an application of the sports and health type may be a sports status, and an application characteristic of an entertainment type may be video content.

Different key information may be extracted based on application characteristics of different applications, as shown in Table 1. Extracting different key information based on application characteristics of different applications may be, for example key information extracted from an application of the travel type based on a vehicle status includes a license plate number, a traveling time, a location, a route, and the like, key information extracted from an application of the life service type based on a food status includes a number arrangement status, a delivery status, a popular recommendation, a friend status, and the like, key information extracted from an application of the financial type based on a payment includes charging, paying, scanning, and the like, key information extracted from an application of the agenda type based on agenda content includes an agenda reminder, a calendar, and the like, key information extracted from an application of the sports and health type based on a sports status includes a sports status, device information, friend information, and the like, and key information extracted from the application of an entertainment type based on video content includes video playback, a content recommendation, and the like.

TABLE 1

| No. | Application type | Key information | Application | Application characteristic |
|---|---|---|---|---|
| 1 | Travel | License plate number, traveling time, location, and route | DiDi Dache, BAIDU Dache, and the like | Vehicle status |

TABLE 1-continued

| No. | Application type | Key information | Application | Application characteristic |
|---|---|---|---|---|
| 2 | Life service | Number arrangement status, delivery status, popular recommendation, and friend status | Meituan, Dianping, and the like | Food status |
| 3 | Finance | Charging, paying, and scanning | Bank APP, ALIPAY, and the like | Payment |
| 4 | Agenda | Agenda reminder and calendar | Agenda, Calendar, and the like | Agenda content |
| 5 | Sports and health | Sports status, device information, and friend information. | Keep, Sports and Health, and the like | Sports status |
| 6 | Entertainment | Video playback and content recommendation | iQIYI, TENCENT Video, YOUKU, and the like | Video content |

Figure 6A:
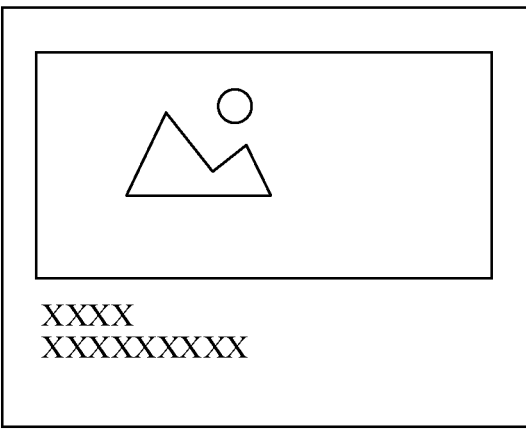
FIG. 6A, FIG. 6B, FIG. 6C, FIG. 6D, and FIG. 6E are schematic diagrams of preset layouts according to an embodiment of this disclosure.
Figure 6B:
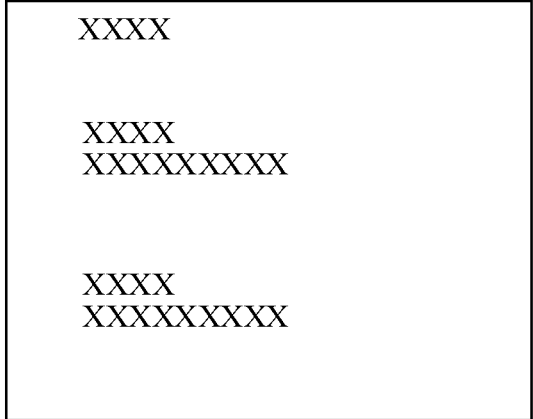
Figure 6C:
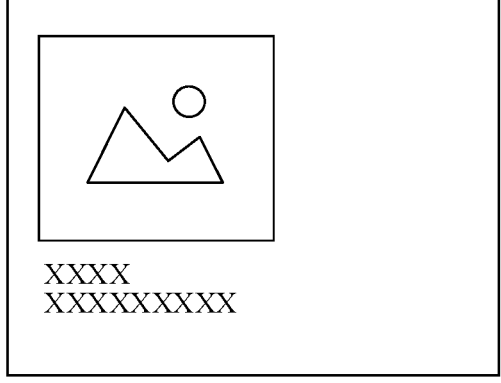
Figure 6D:
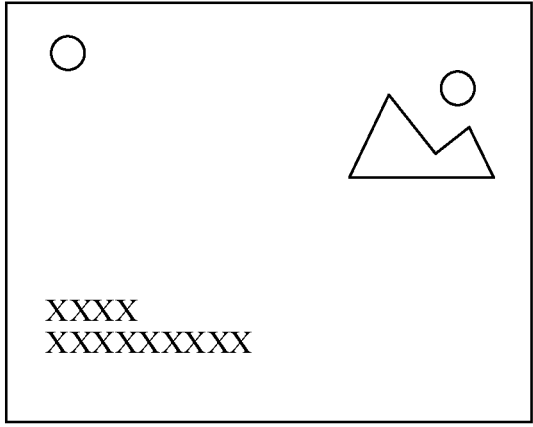
Figure 6E:
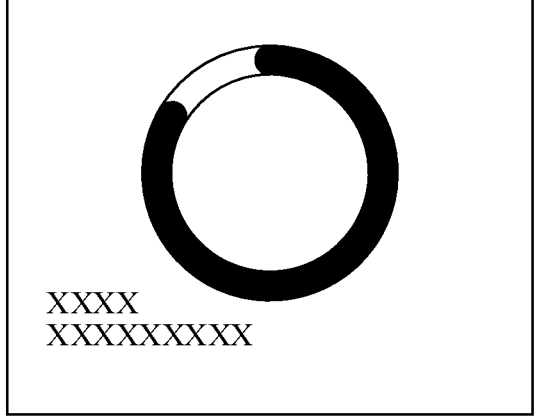

A preset layout of the floating card may include an image-text layout, a list layout, a grid layout, an immersive layout, and a data information layout. The image-text layout includes a picture and a text, as shown in FIG. 6A. The text can include Chinese characters, English letters, and digits. The list layout includes a text, as shown in FIG. 6B. The grid layout includes a plurality of pictures, as shown in FIG. 6C. The immersive layout includes a complete image, as shown in FIG. 6D). The data information layout includes a graph representing data, as shown in FIG. 6E. In FIG. 6E, the data is represented by a donut chart. Optionally, the data may also be represented by a pie chart or a line chart.

The preset layouts of different key information may be, for example A preset layout of key information including an image and a text may be an image-text layout. A preset layout of key information including only a text may be a list layout. A preset layout of key information including a plurality of images may be a grid layout. A preset layout of key information including a complete image may be an immersive layout. A preset layout of key information including a graph may be a data information layout.

The following describes, based on different preset layouts of key information displayed in the floating card, in detail the card mode to which different applications are switched in the window mode.

Figure 7A:
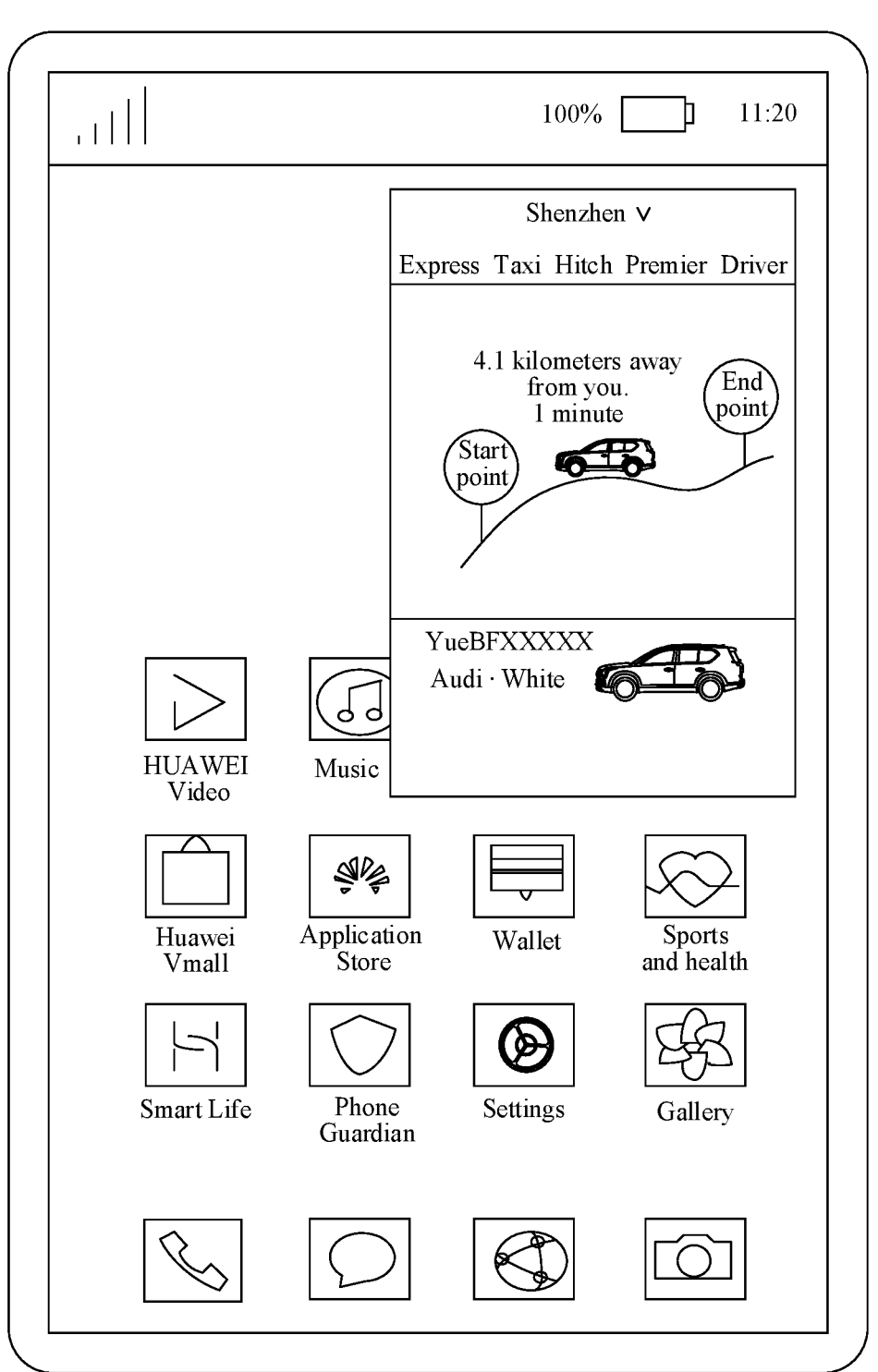
FIG. 7A and FIG. 7B are schematic diagrams of some application interfaces according to an embodiment of this disclosure.
Figure 7B:
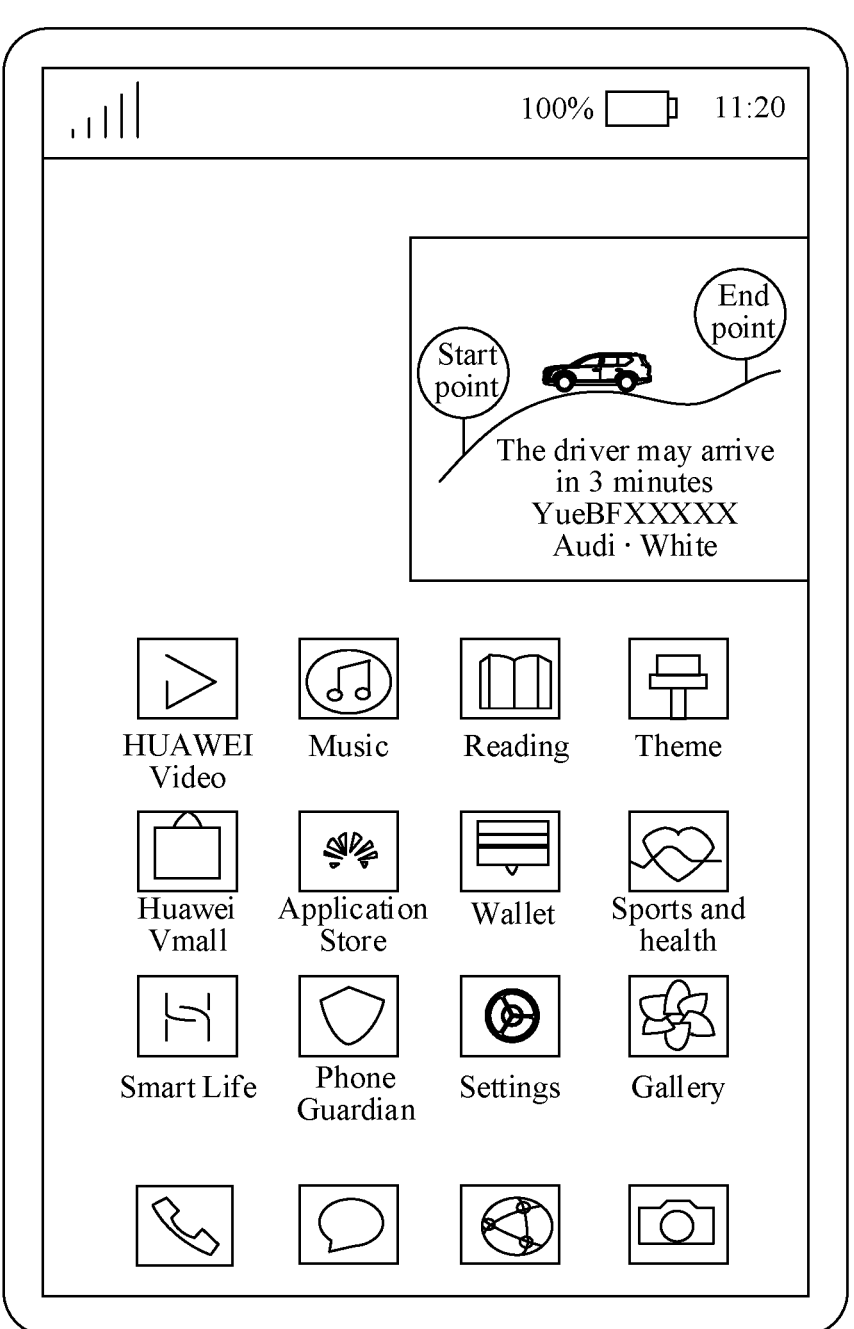

As shown in FIG. 7A, a user interface of taxi hailing software is displayed in a floating window. Based on different application characteristics of the foregoing different types of applications, different key information may be extracted based on the application characteristics of the different applications. Key information extracted from the user interface of the taxi hailing software includes a license plate number YueBFXXXXX, a white Audi, a driver's arrival in 3 minutes, and a route map. When the application is switched from the window mode to the card mode, the key information includes a picture and a text, and the key information may be displayed in a floating card in a layout manner of an image-text layout, as shown in FIG. 7B.

Figure 8A:
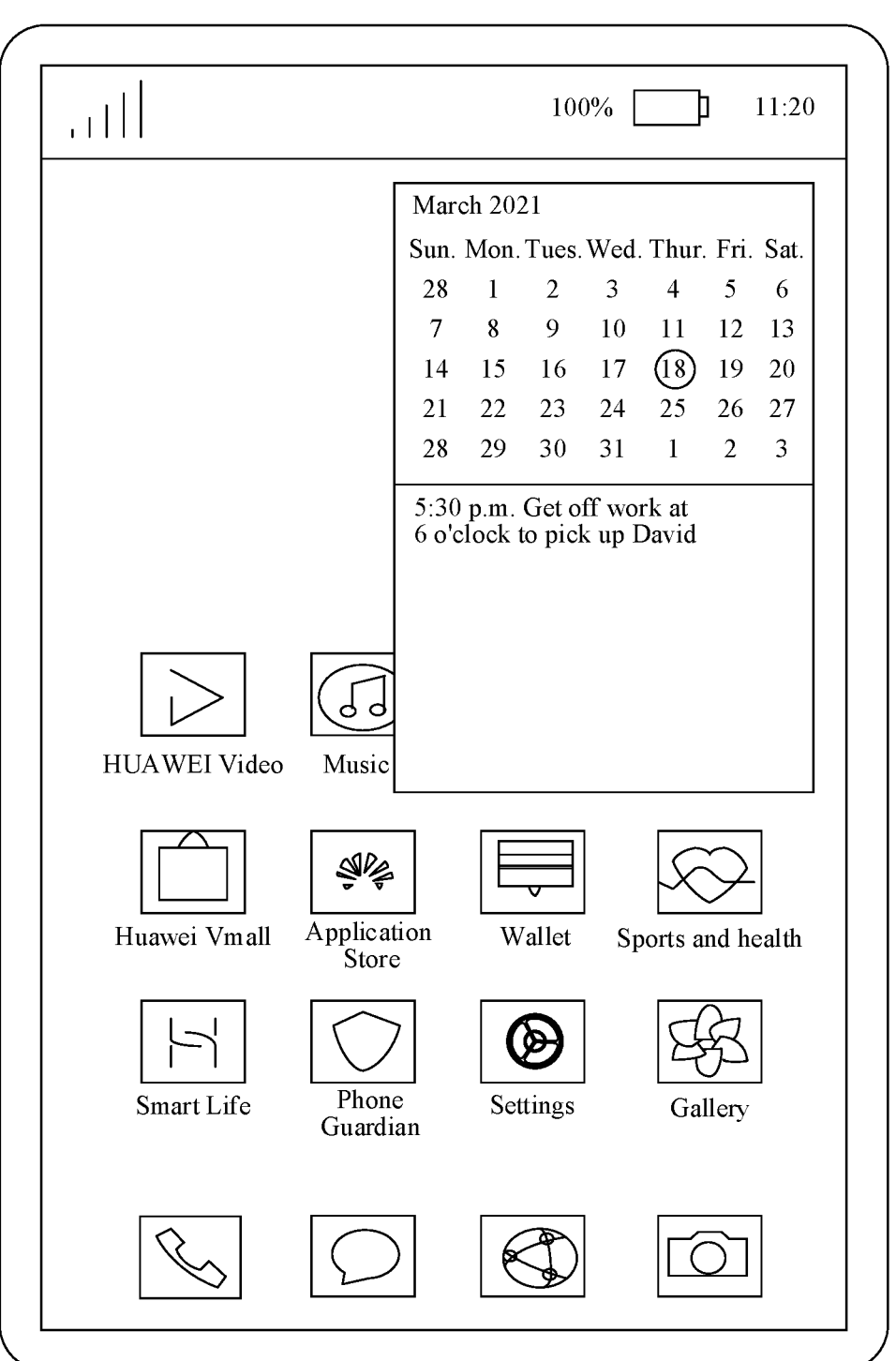
FIG. 8A and FIG. 8B are schematic diagrams of some application interfaces according to an embodiment of this disclosure.
Figure 8B:
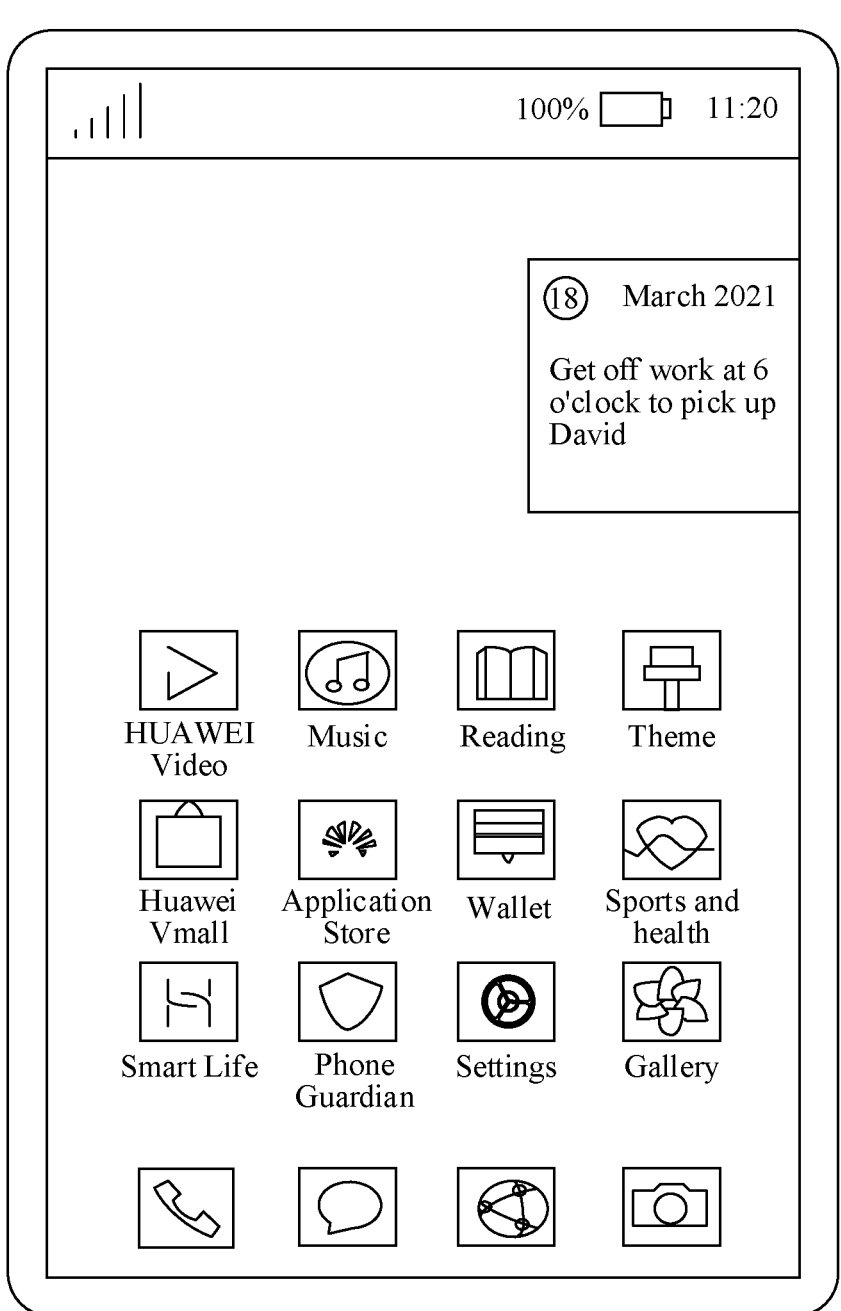

As shown in FIG. 8A, a user interface of a calendar is displayed in a floating window. Based on different application characteristics of the foregoing different types of applications, different key information may be extracted based on the application characteristics of the different applications. Key information extracted from the user interface of the calendar includes a calendar 2021 Mar. 18 and a calendar reminder: Pick up David at 6 o'clock. When the application is switched from the window mode to the card mode, the key information includes only a text, and the key information may be displayed in a floating card in a layout manner of a list layout, as shown in FIG. 8B.

Figure 9A:
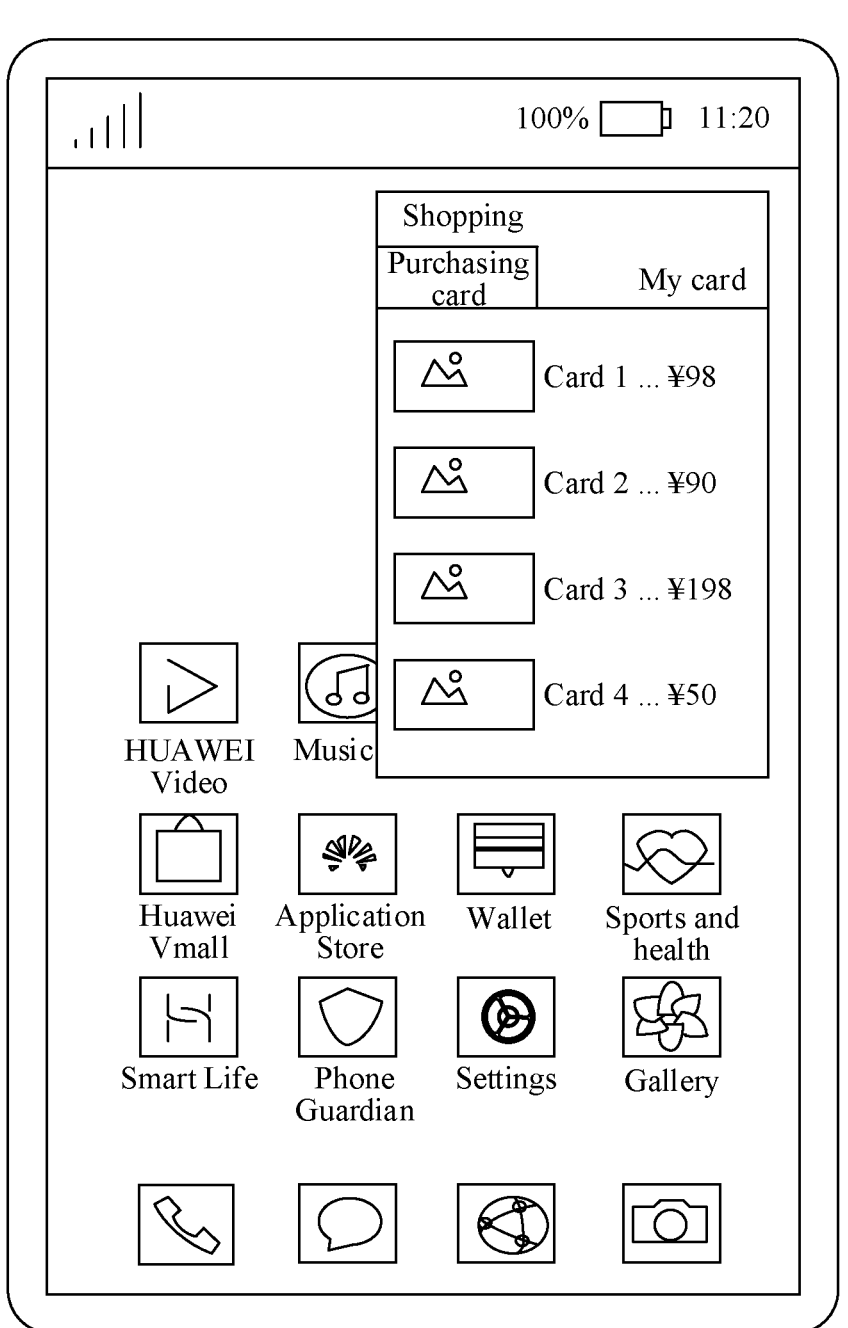
FIG. 9A and FIG. 9B are schematic diagrams of some application interfaces according to an embodiment of this disclosure.
Figure 9B:
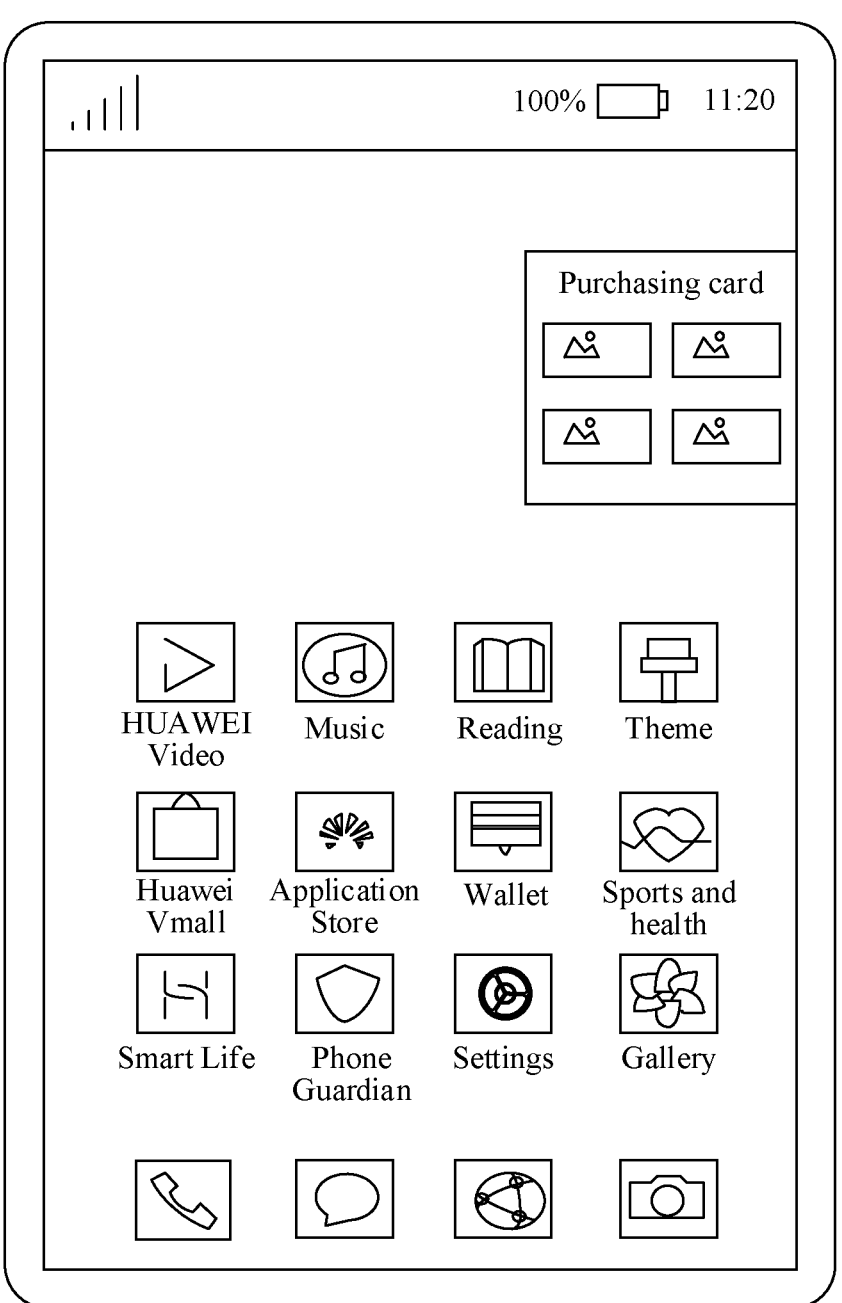

As shown in FIG. 9A, a user interface of shopping software is displayed in a floating window. Based on different application characteristics of the foregoing different types of applications, different key information may be extracted based on the application characteristics of the different applications. Key information extracted from the user interface of the shopping software includes a picture of a card 1, a picture of a card 2, a picture of a card 3, a picture of a card 4, and a Purchasing card text. When the application is switched from the window mode to the card mode, the key information includes a plurality of pictures, and the key information may be displayed in a floating card in a layout manner of a grid layout, as shown in FIG. 9B.

Figure 10A:
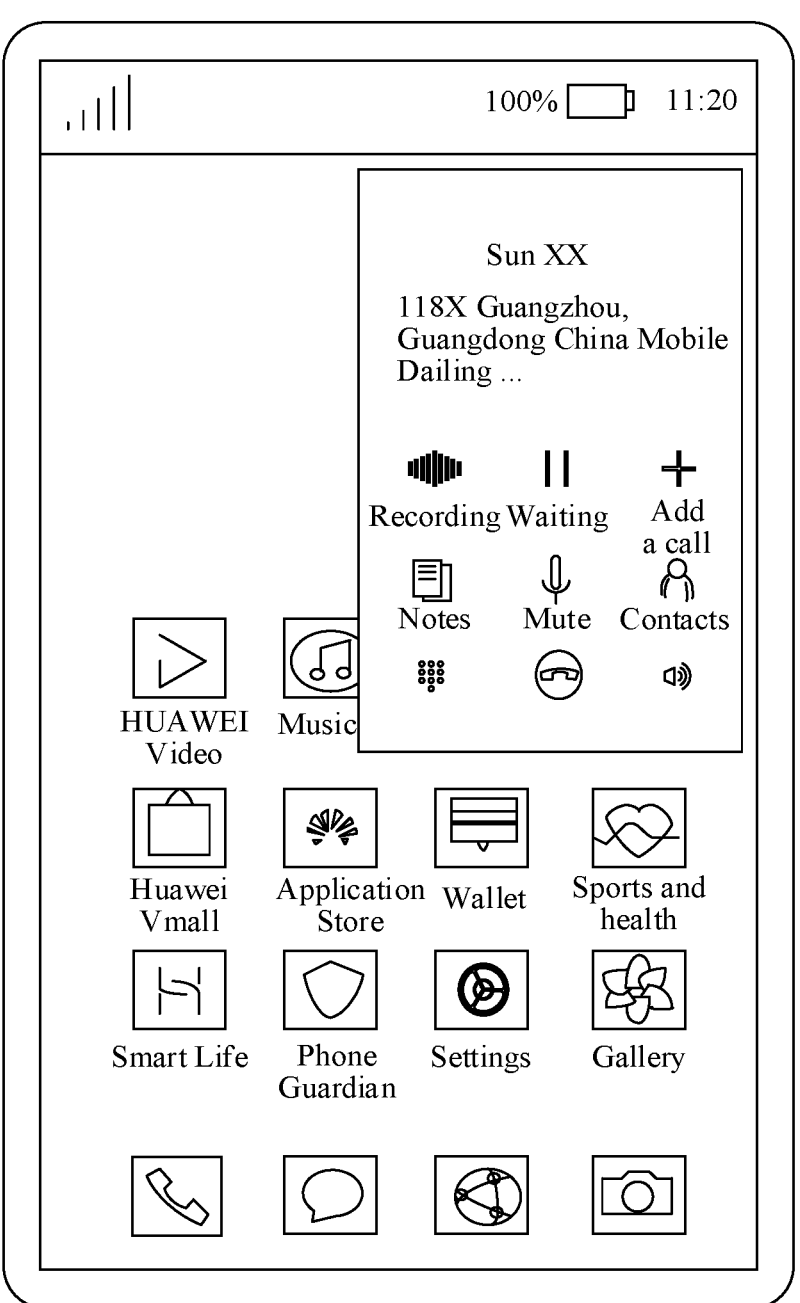
FIG. 10A and FIG. 10B are schematic diagrams of some application interfaces according to an embodiment of this disclosure.
Figure 10B:
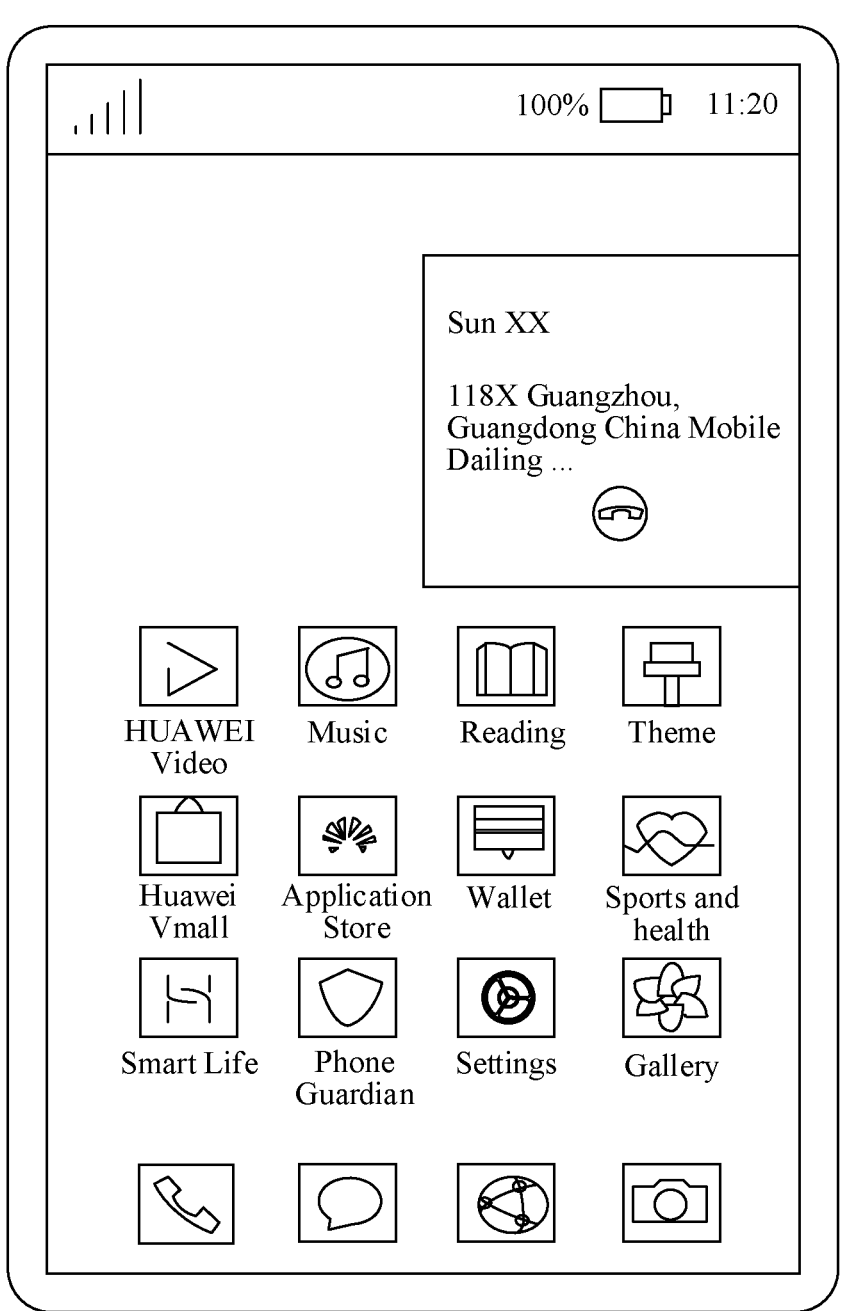

A user interface of call software shown in FIG. 10A is displayed in a floating window. Based on different application characteristics of the foregoing different types of applications, different key information may be extracted based on the application characteristics of the different applications. Key information extracted from the user interface of the call software includes a complete background image and information on the image: Name: Sun XX, Telephone number: 118X, Guangzhou, Guangdong, China Mobile, Dialing, and a Hang-up button. When the application is switched from the window mode to the card mode, the key information includes a complete background image, and the key information may be displayed in a floating card in a layout manner of an immersive layout, as shown in FIG. 10B.

Figure 11A:
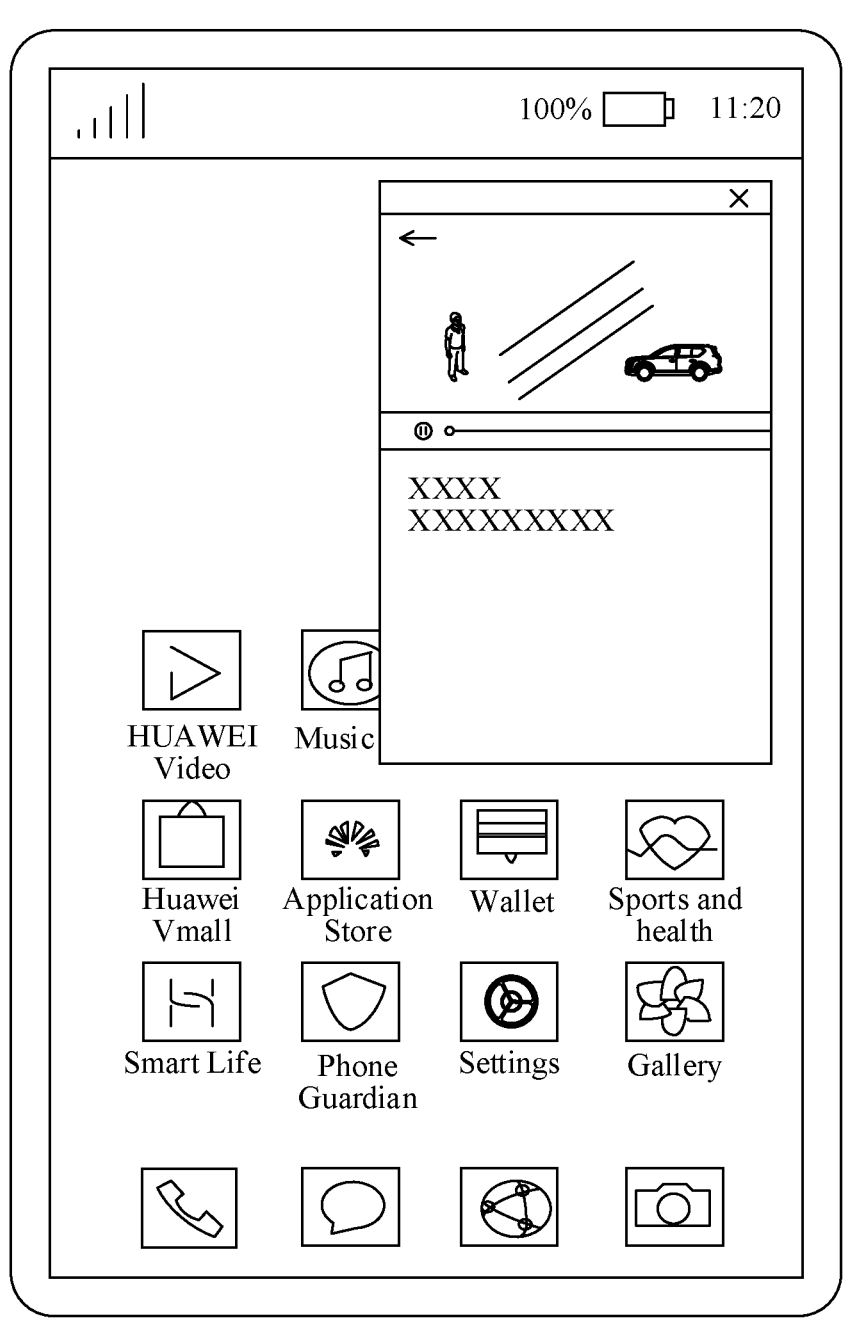
FIG. 11A and FIG. 11B are schematic diagrams of some application interfaces according to an embodiment of this disclosure.
Figure 11B:
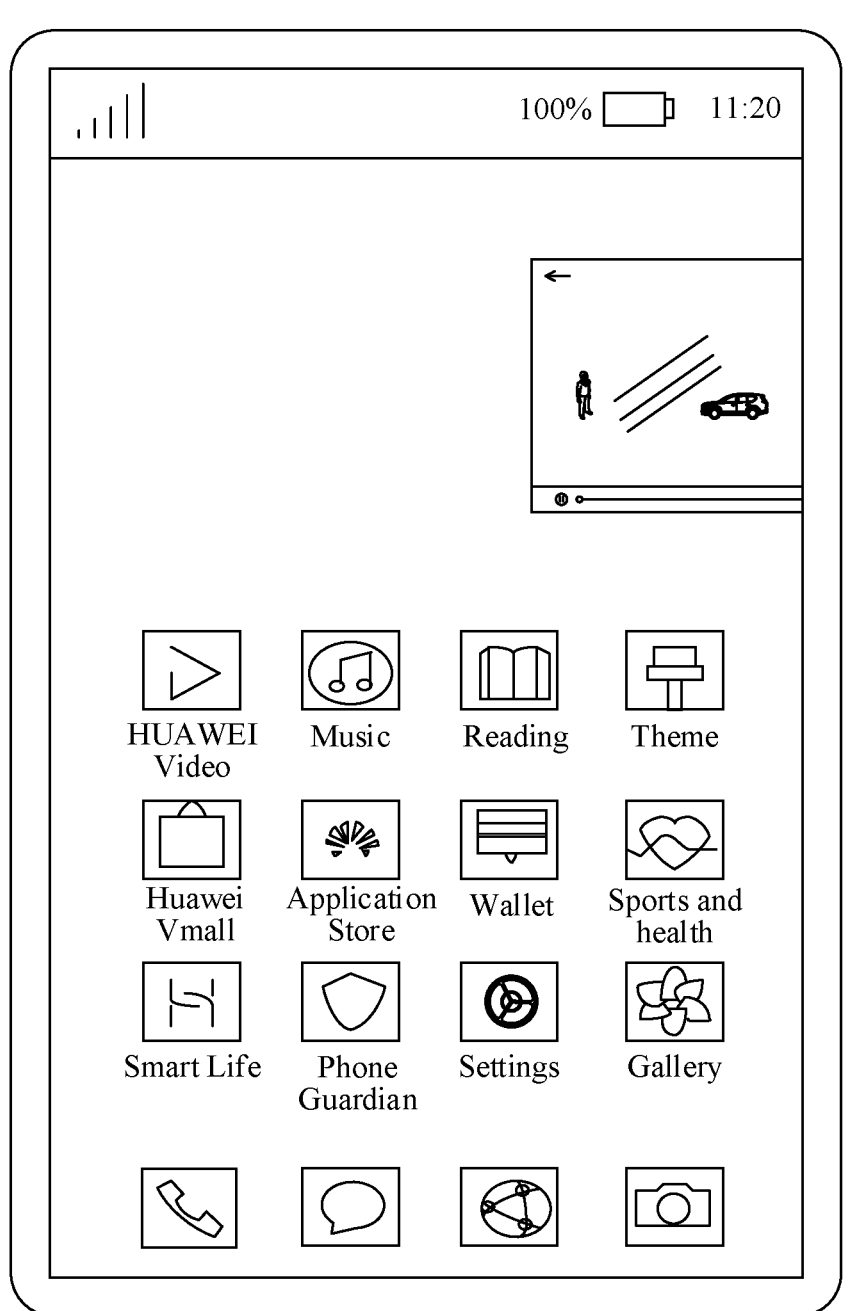

As shown in FIG. 11A, a user interface of video software is displayed in a floating window. Based on different application characteristics of the foregoing different types of applications, different key information may be extracted based on the application characteristics of the different applications. Key information extracted from the user interface of the video software includes a complete video image. When the application is switched from the window mode to the card mode, the key information includes a complete image, and the key information may be displayed in a floating card in a layout manner of an immersive layout, as shown in FIG. 11B.

Figure 12A:
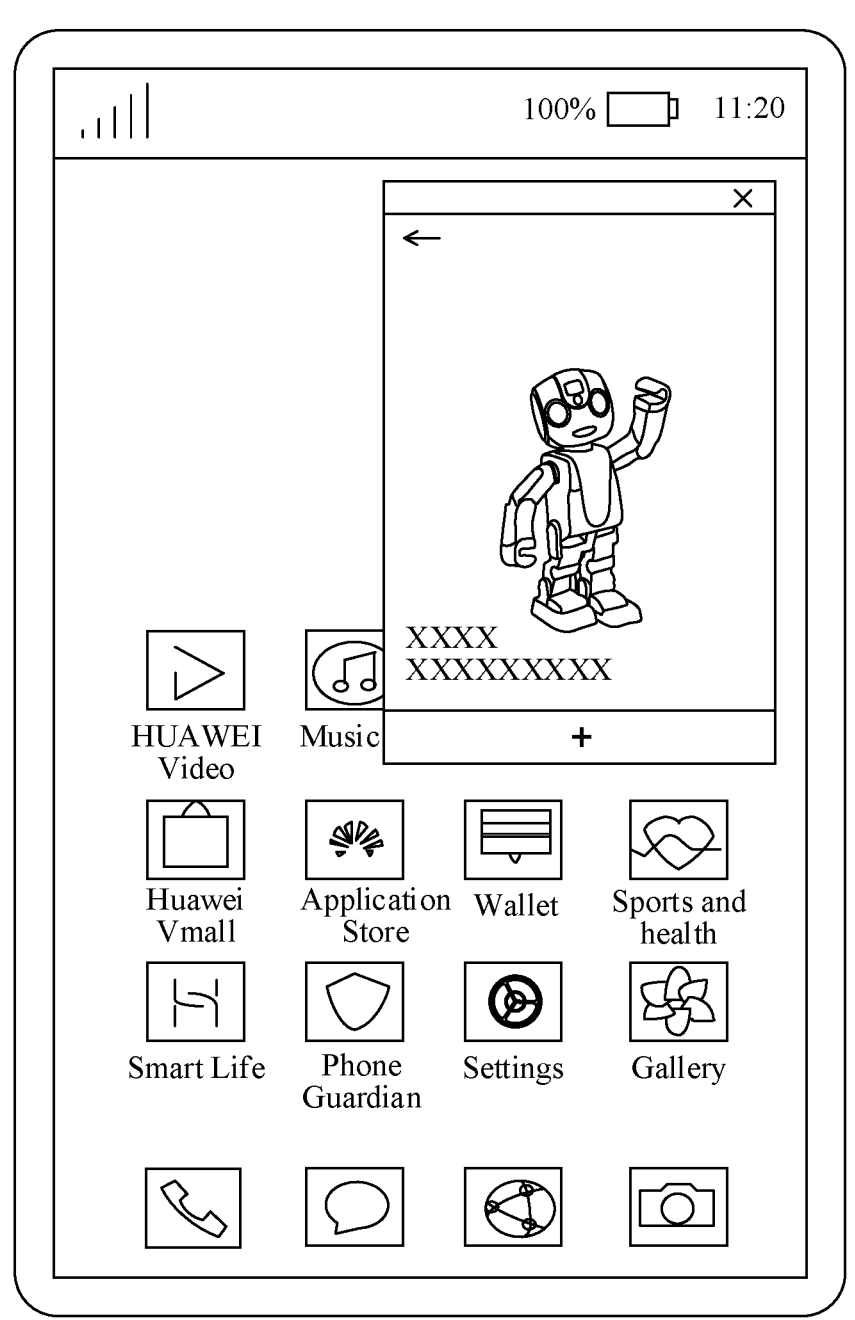
FIG. 12A and FIG. 12B are schematic diagrams of some application interfaces according to an embodiment of this disclosure.
Figure 12B:
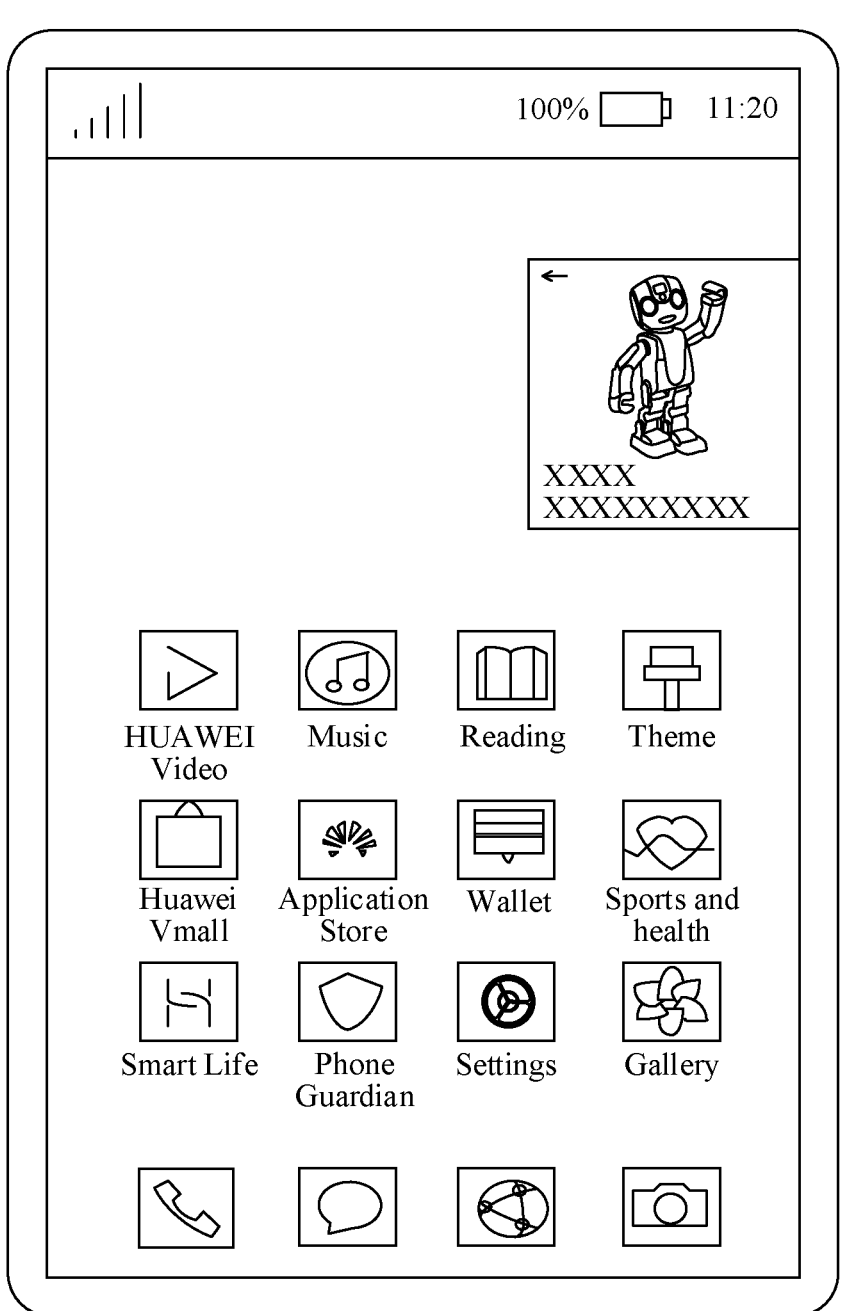

As shown in FIG. 12A, a user interface of another video software is displayed in a floating window. Based on different application characteristics of the foregoing different types of applications, different key information may be extracted based on the application characteristics of the different applications. Key information extracted from the user interface of the video software includes a complete video image. When the application is switched from the window mode to the card mode, the key information includes a complete image, and the key information may be displayed in a floating card in a layout manner of an immersive layout, as shown in FIG. 12B.

Figure 13A:
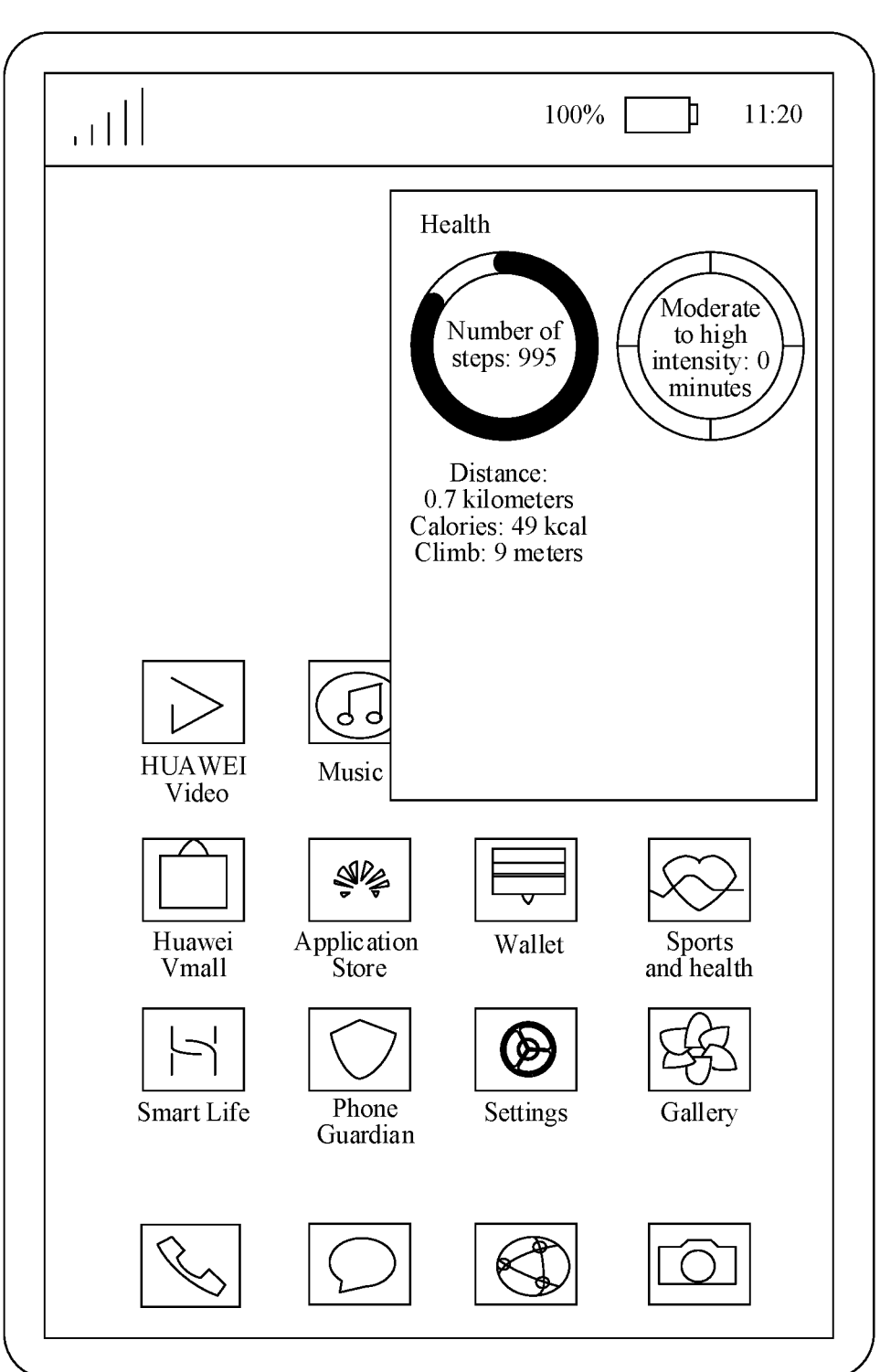
FIG. 13A and FIG. 13B are schematic diagrams of some application interfaces according to an embodiment of this disclosure.
Figure 13B:
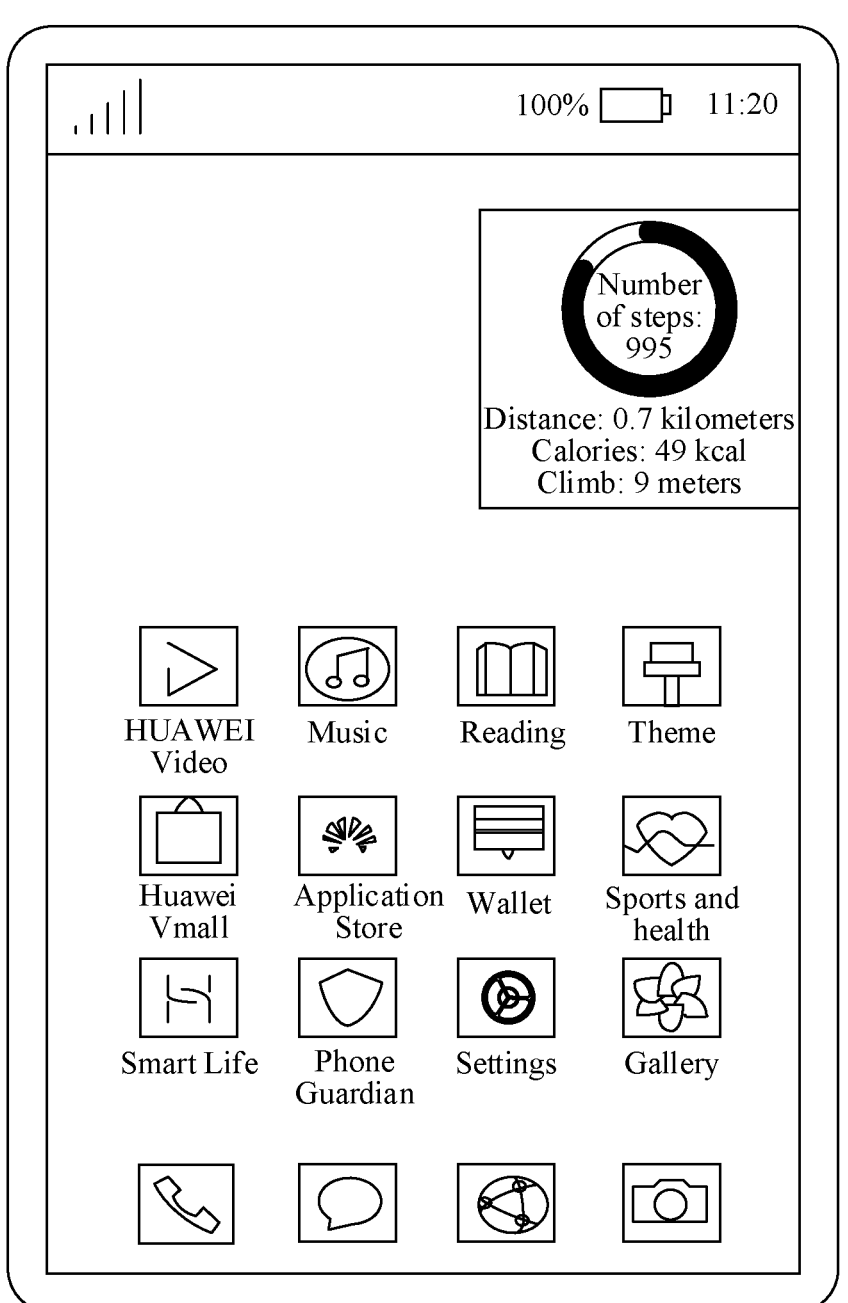

As shown in FIG. 13A, a user interface of sports software is displayed in a floating window. Based on different application characteristics of the foregoing different types of applications, different key information may be extracted based on the application characteristics of the different applications. Key information extracted from the user interface of the sports software includes a graph representing sports status data. When the application is switched from the window mode to the card mode, the key information includes a graph representing data, and the key information may be displayed in a floating card in a layout manner of a data information layout, as shown in FIG. 13B.

Optionally, sizes of floating cards of different applications may be the same. Optionally, sizes of floating cards of different applications may be different. Switching the window mode to the card mode instead of a mini mode in the conventional art can avoid unclearness of content in the window. In addition, by displaying key information in the card mode, key information in the user interface of the application instead of the user interface of the application is displayed in a window of a same size. Therefore, the user can be prevented from failing to clearly see the content in the window because much content is displayed in a small size of the window. The key information in the user interface of the application may be provided to the user.

Figure 14A:
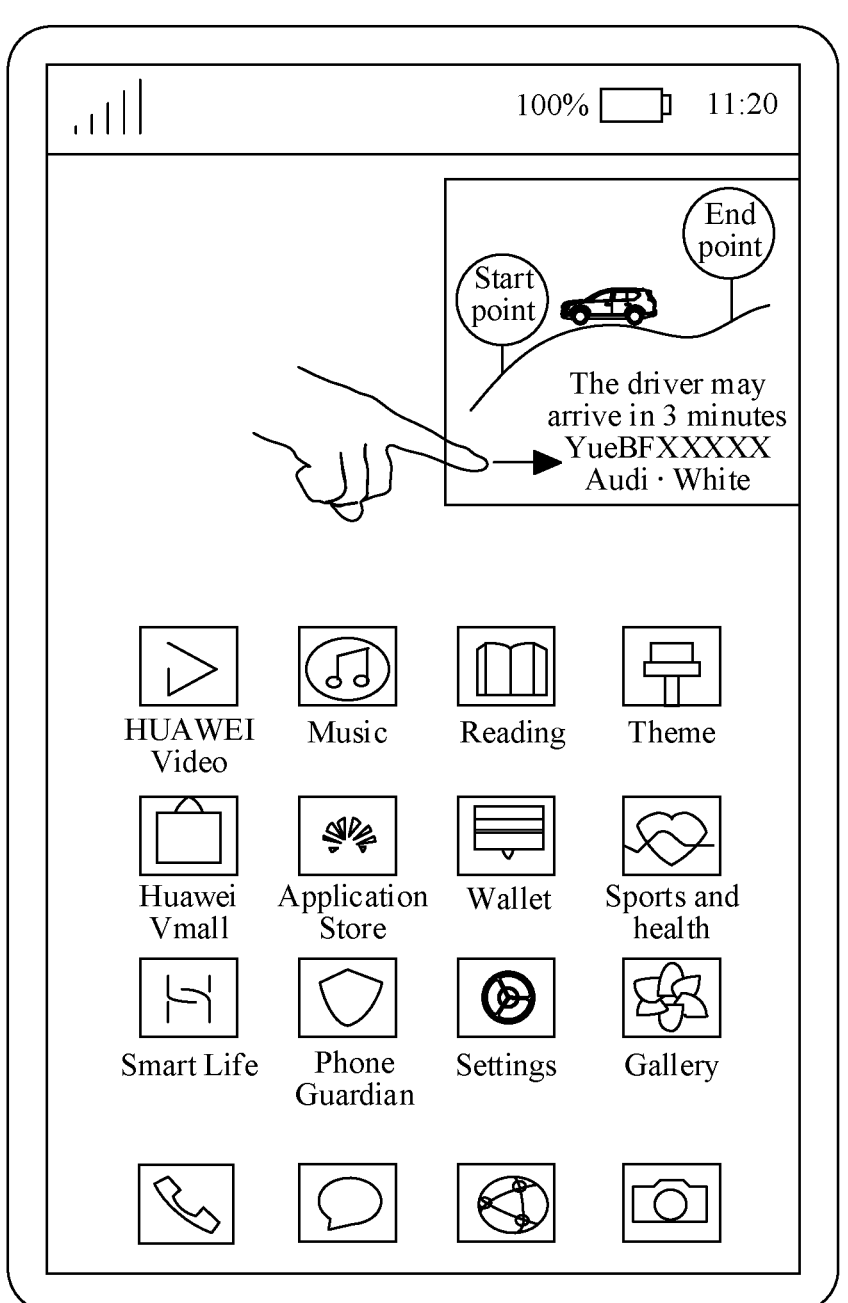
FIG. 14A, FIG. 14B, and FIG. 14C are schematic diagrams of some application interfaces according to an embodiment of this disclosure.
Figure 14B:
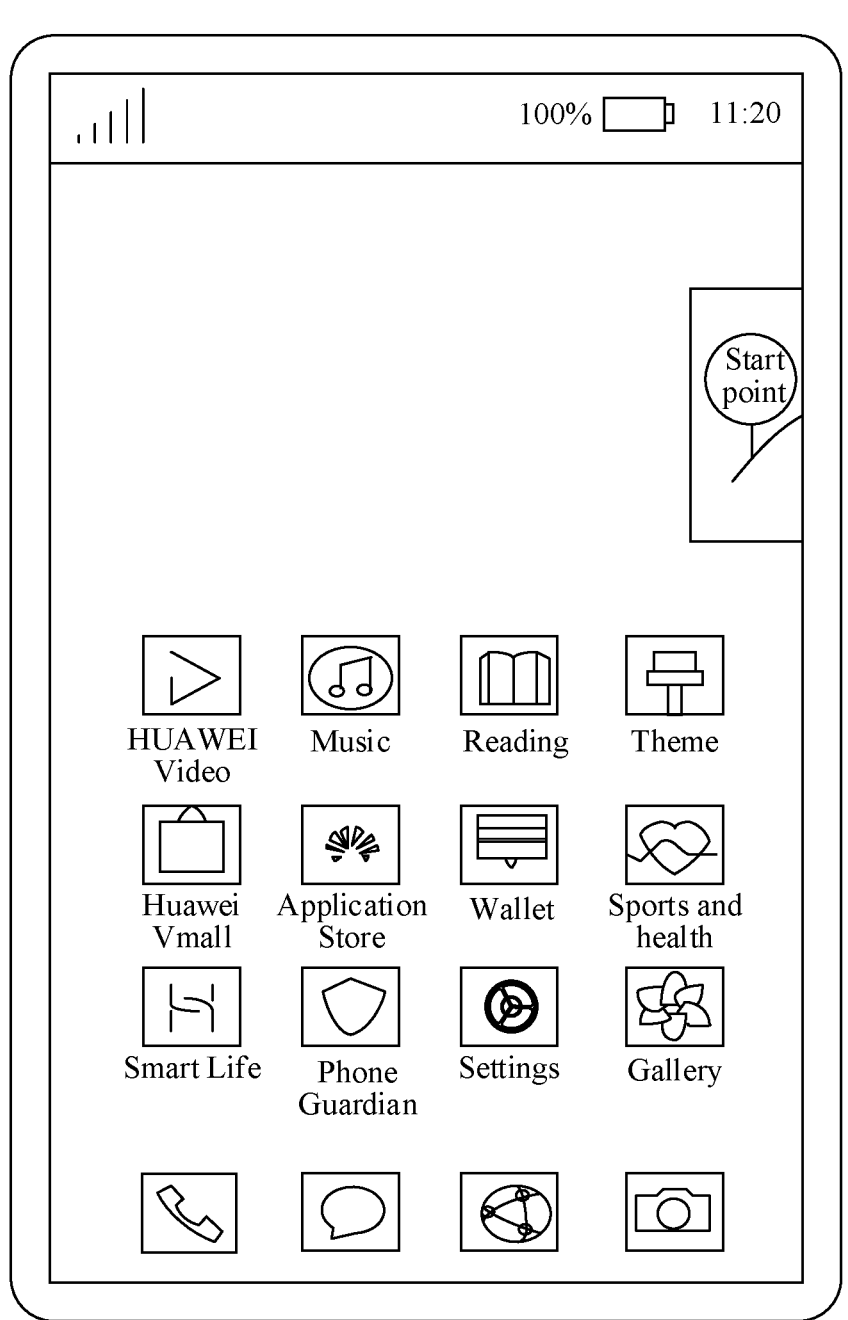
Figure 14C:
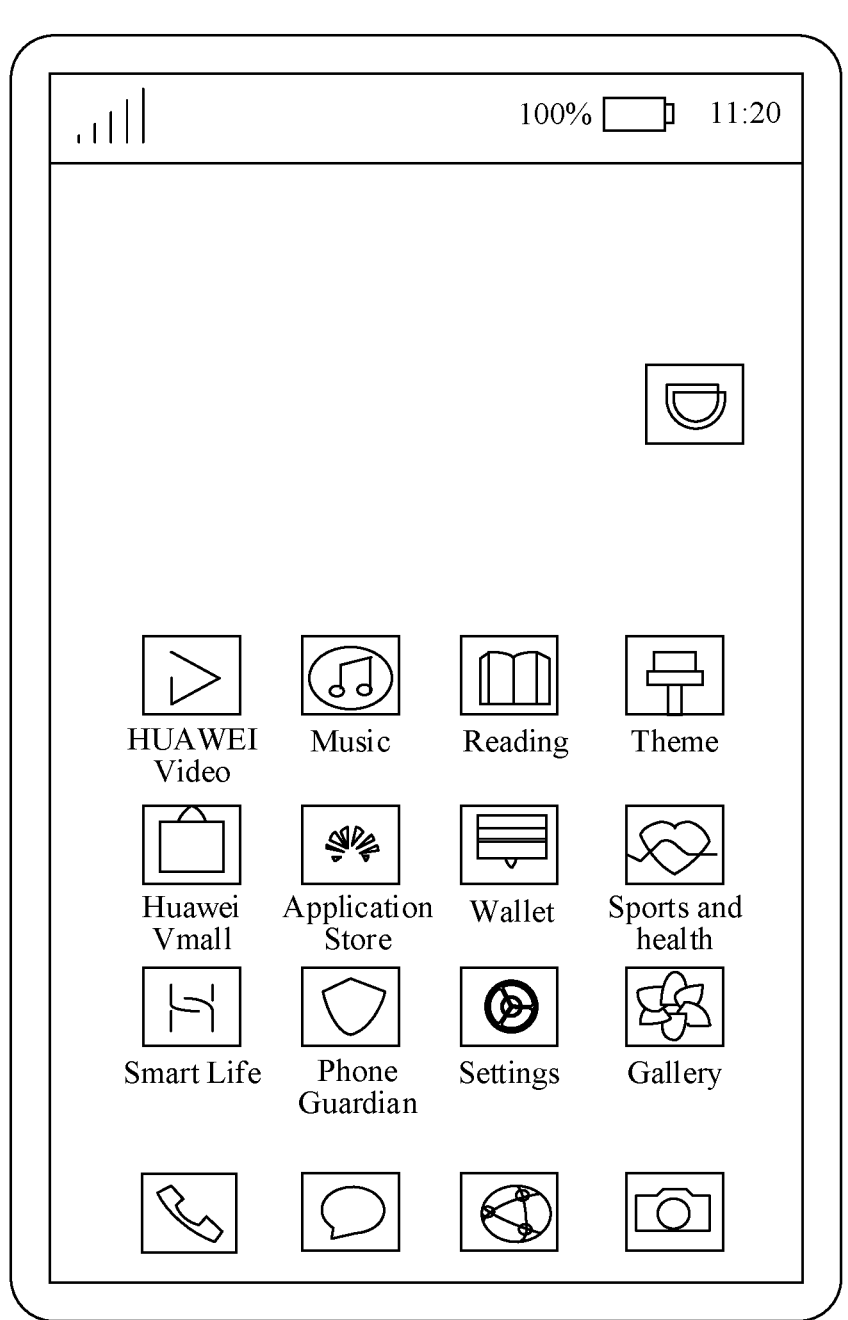

In the foregoing scenario, when the floating card is displayed on the screen, the user may want to better view a to-be-opened calendar, and expect that content in an interface of the to-be-opened calendar is not blocked. In this case, the floating card needs to be hidden. For example, as shown in FIG. 14A, the user may drag the floating card to move along a preset direction, for example, to move to a left edge of the screen or to a right edge of the screen. In response to the drag operation when the floating card moves to an edge of the screen, the floating card is displayed in a gradually exiting manner until the floating card exits the screen by a size exceeding a preset size (for example, ½), as shown in FIG. 14B. In this case, the mobile phone may hide the floating card of the taxi hailing software, and display a floating ball of the taxi hailing software. As shown in FIG. 14C, the taxi hailing software switches from a card mode to a floating ball mode. An icon of the taxi hailing software, a name of the taxi hailing software, or an icon and a name of the taxi hailing software are displayed in a floating ball of the taxi hailing software.

In this case, the user may start to view a calendar by tapping an icon of a calendar application on a home screen, and information in the taxi hailing software does not block viewing of the calendar. It may be understood that, when the taxi hailing software switches from the full-screen mode to the window mode, or when the taxi hailing software switches from the window mode to the card mode, the user may further tap the icon of the calendar application on the home screen to start to view the calendar, and continue to perform the foregoing switching of the display mode of the taxi hailing software.

Figure 15A:
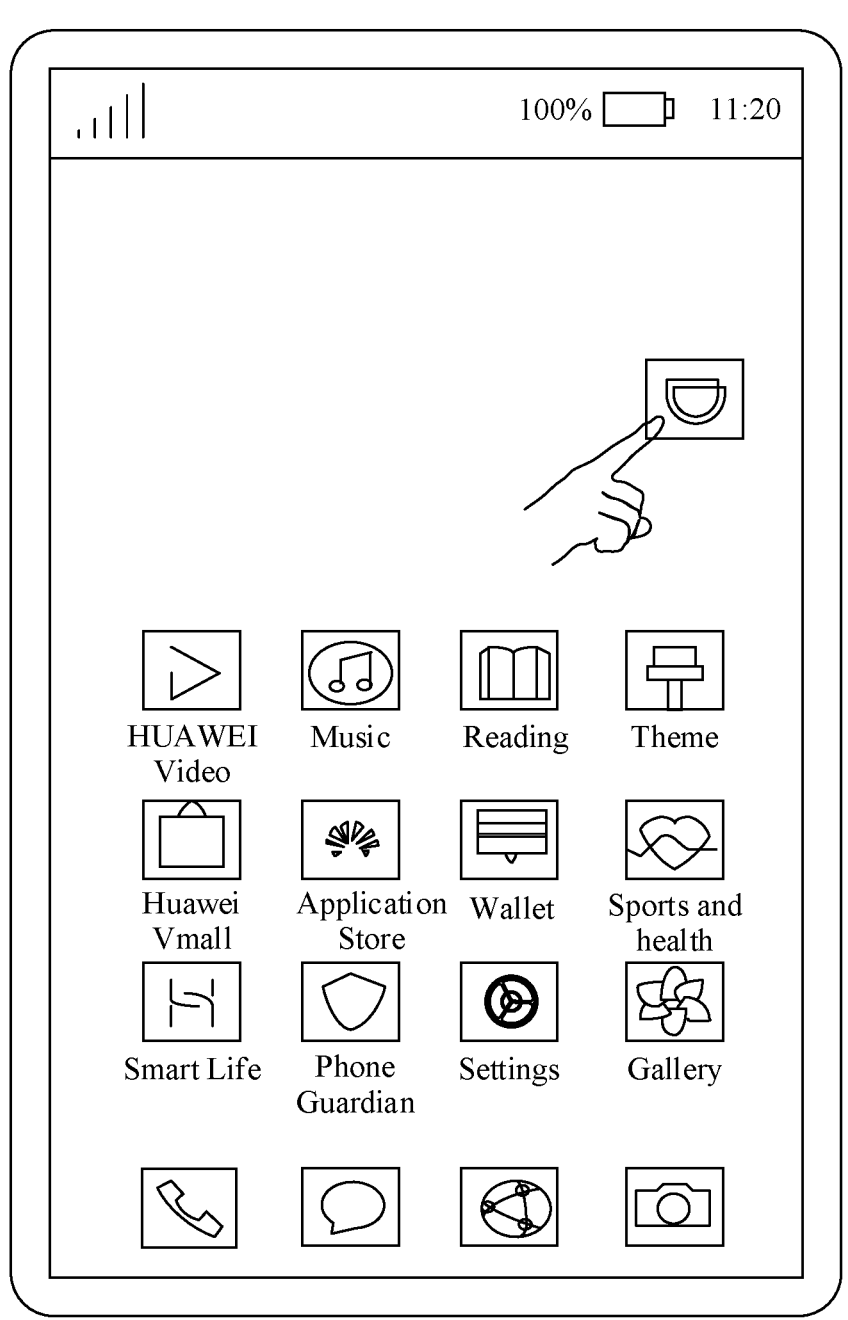
FIG. 15A and FIG. 15B are schematic diagrams of some application interfaces according to an embodiment of this disclosure.
Figure 15B:
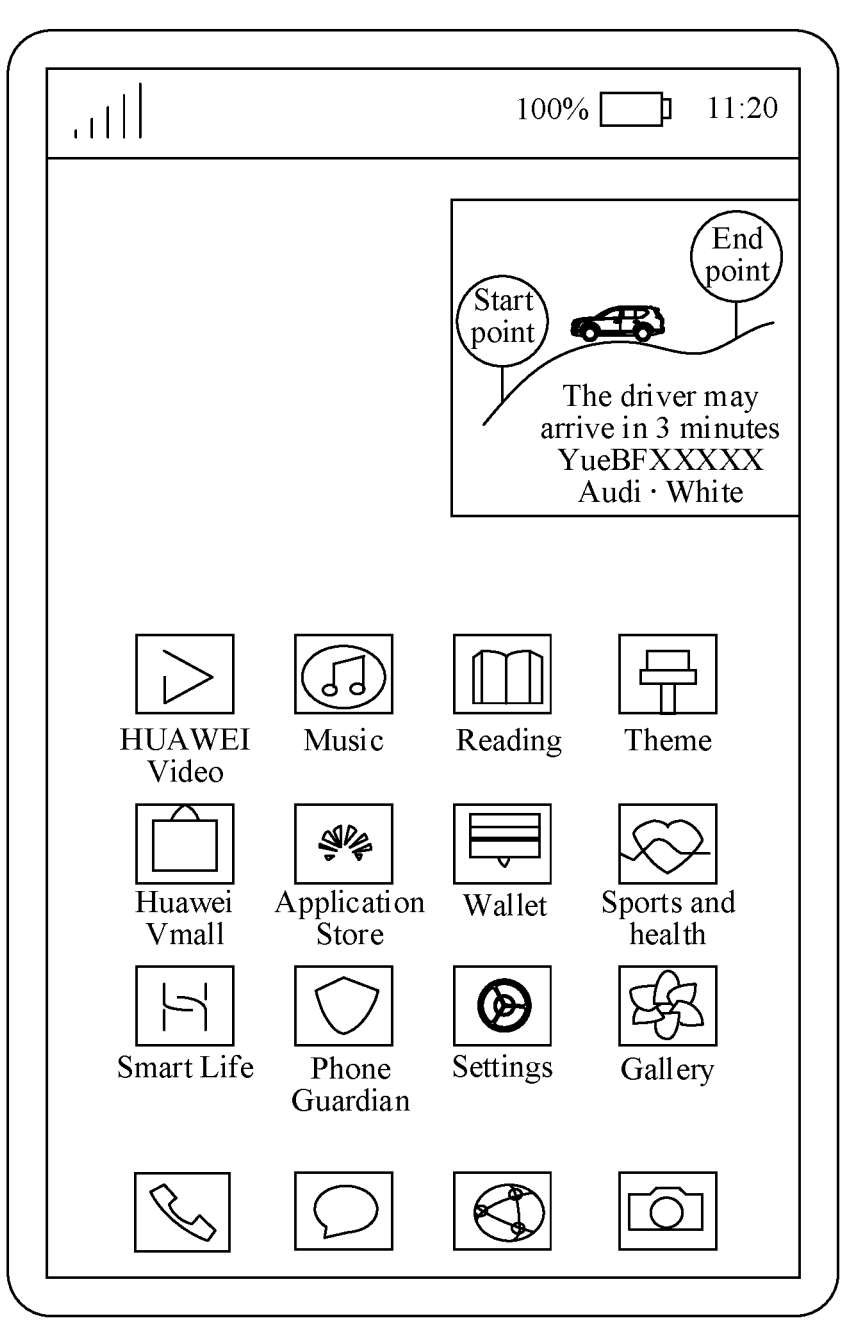

After viewing the calendar, the user may want to view information in the taxi hailing software, and in this case, the information in the taxi hailing software needs to be displayed. For example, as shown in FIG. 15A, the user may tap the floating ball of the taxi hailing software. In response to the tap operation, the mobile phone re-invokes the floating card of the taxi hailing software, as shown in FIG. 15B. In this case, the taxi hailing software switches from the floating ball mode to the card mode. Display content in the re-invoked floating card of the taxi hailing software may be the same as that when the floating card of the taxi hailing software is hidden. The key information in the taxi hailing software is displayed in the floating card based on preset layouts of different key information. Optionally, a position, on the screen, of the re-invoked floating card of the taxi hailing software may be the same as or different from a position, on the screen, of the floating card of the taxi hailing software when the floating card is hidden. Optionally, display content in the re-invoked floating card of the taxi hailing software may alternatively be different from that when the floating card of the taxi hailing software is hidden. For example, the display content may also be different based on different display positions and card sizes. For example, before the user indicates, through an operation, the taxi hailing software to switch from the card mode to the floating ball mode, the user adjusts a size of a card displayed in a floating manner. When the user indicates the taxi hailing software to switch from the floating ball mode to the card mode, the card may be displayed again based on a default size. In this case, different content may be displayed on cards of different sizes.

Figure 16A:
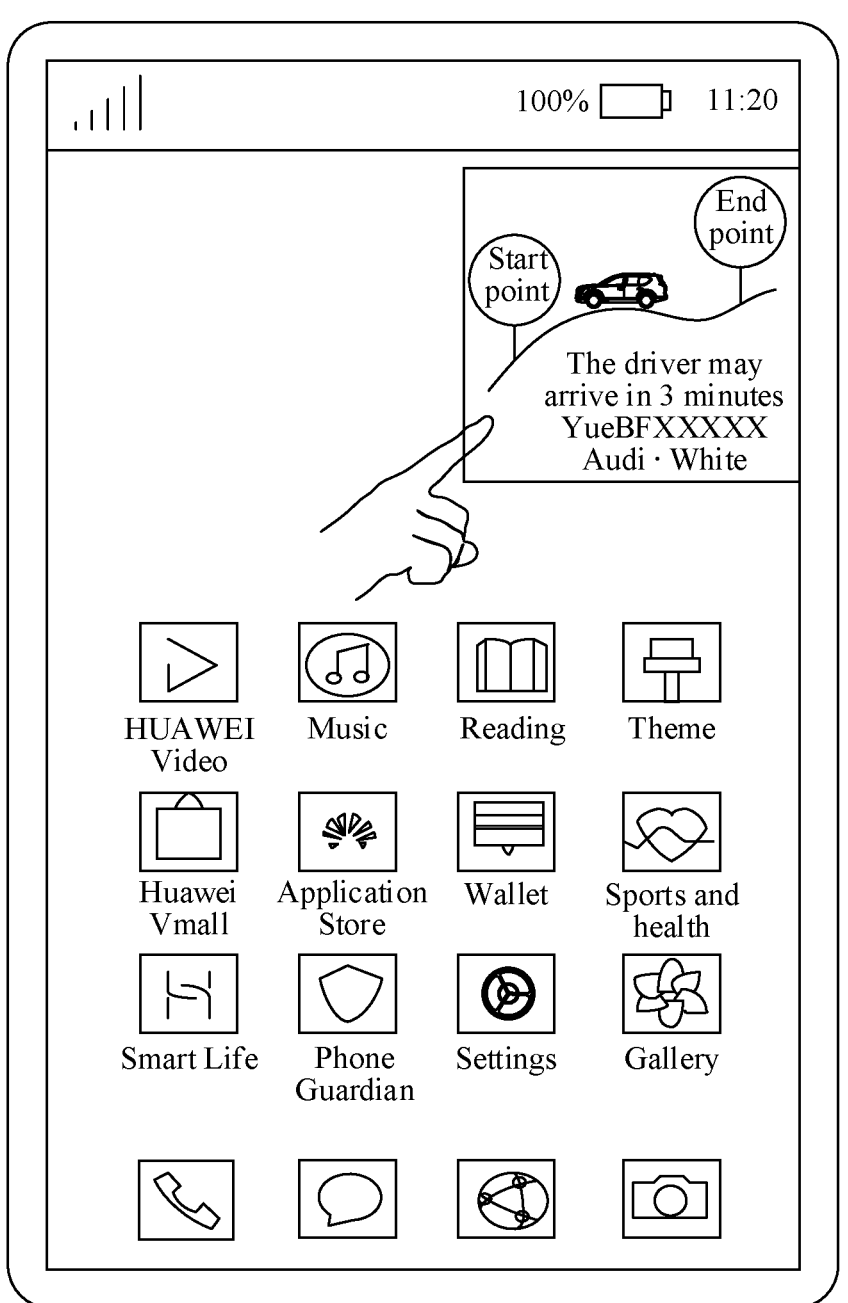
FIG. 16A and FIG. 16B are schematic diagrams of some application interfaces according to an embodiment of this disclosure.
Figure 16B:
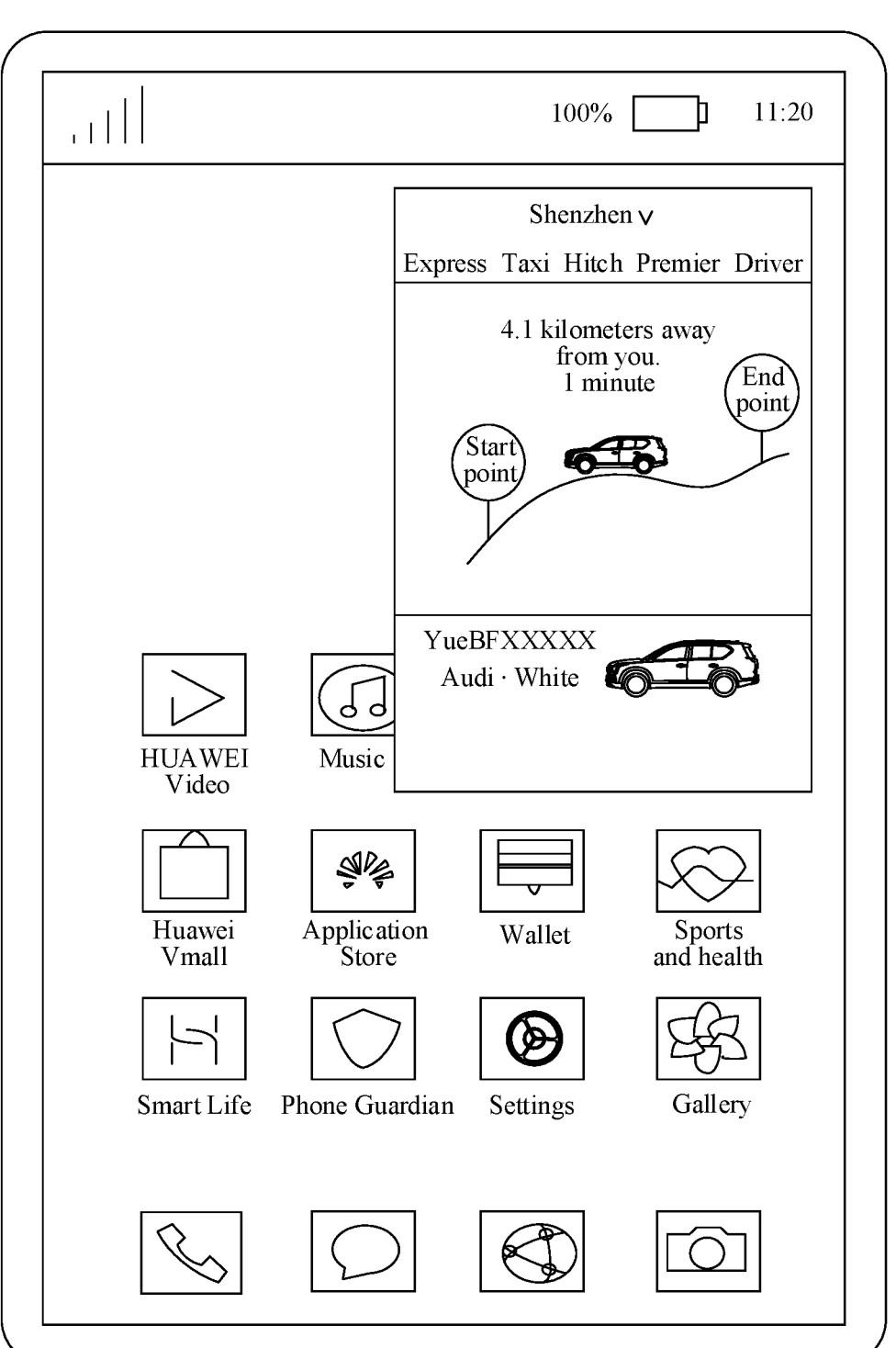

When viewing information in the taxi hailing software, the user may want to view more information in the taxi hailing software. In this case, the more information in the taxi hailing software needs to be displayed. For example, as shown in FIG. 16A, the user may tap the floating card of the taxi hailing software. In response to the tap operation, the mobile phone re-invokes the floating window of the taxi hailing software, as shown in FIG. 16B. In this case, the taxi hailing software switches from the card mode to the window mode. Display content in the re-invoked floating window of the taxi hailing software may be the same as that when the floating window of the taxi hailing software is scaled out to the floating card. The user interface of the taxi hailing software is displayed in the floating window. Optionally, a position, on the screen, of the re-invoked floating window of the taxi hailing software may be the same as or different from a position, on the screen, of the floating window of the taxi hailing software when the floating window of the taxi hailing software is scaled out to the floating card, and content in the re-invoked floating window of the taxi hailing software may also be the same as or different from content in the floating window of the taxi hailing software when the floating window of the taxi hailing software is scaled out to the floating card.

Figure 17A:
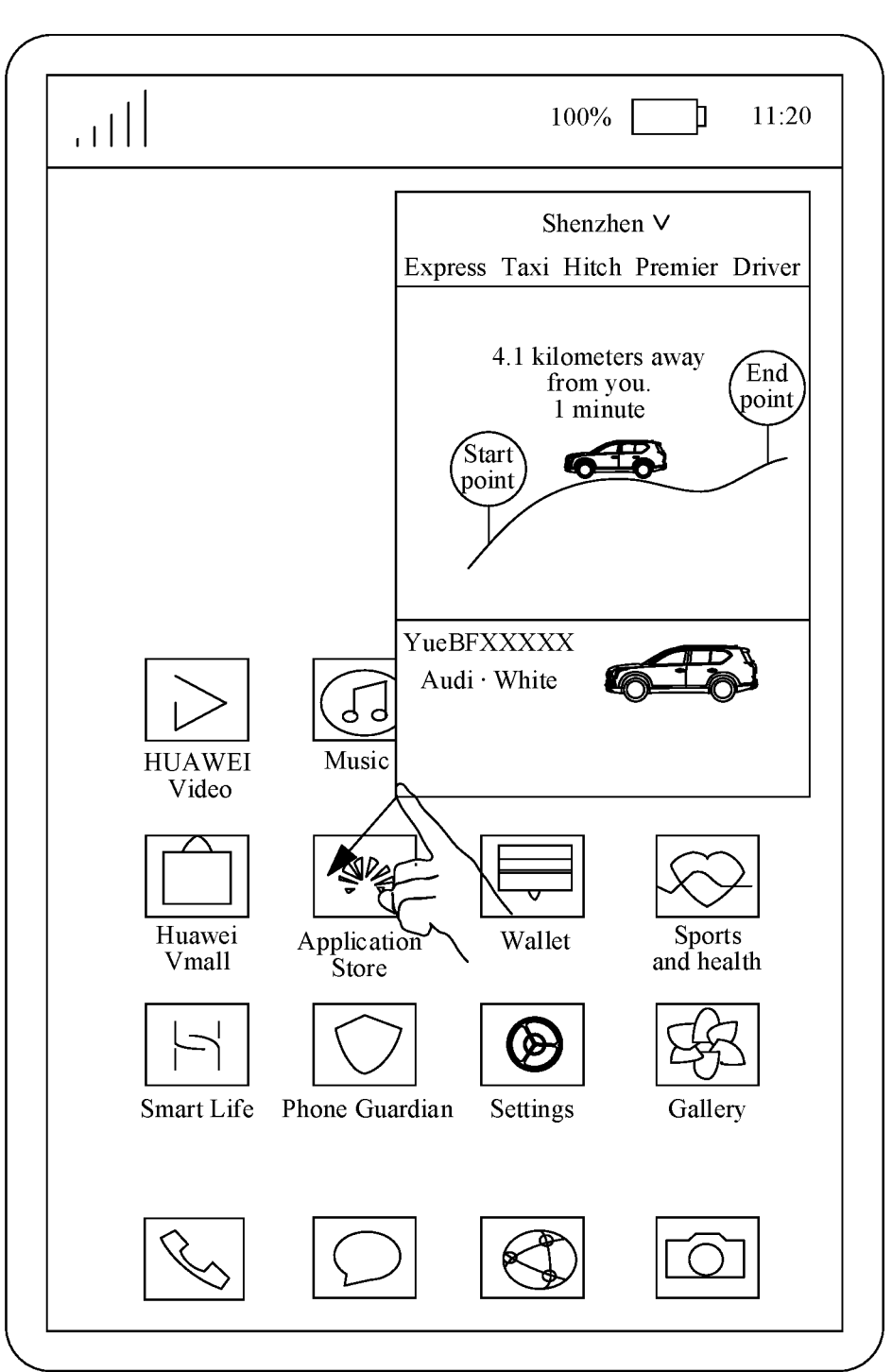
FIG. 17A, FIG. 17B, and FIG. 17C are schematic diagrams of some application interfaces according to an embodiment of this disclosure.
Figure 17B:
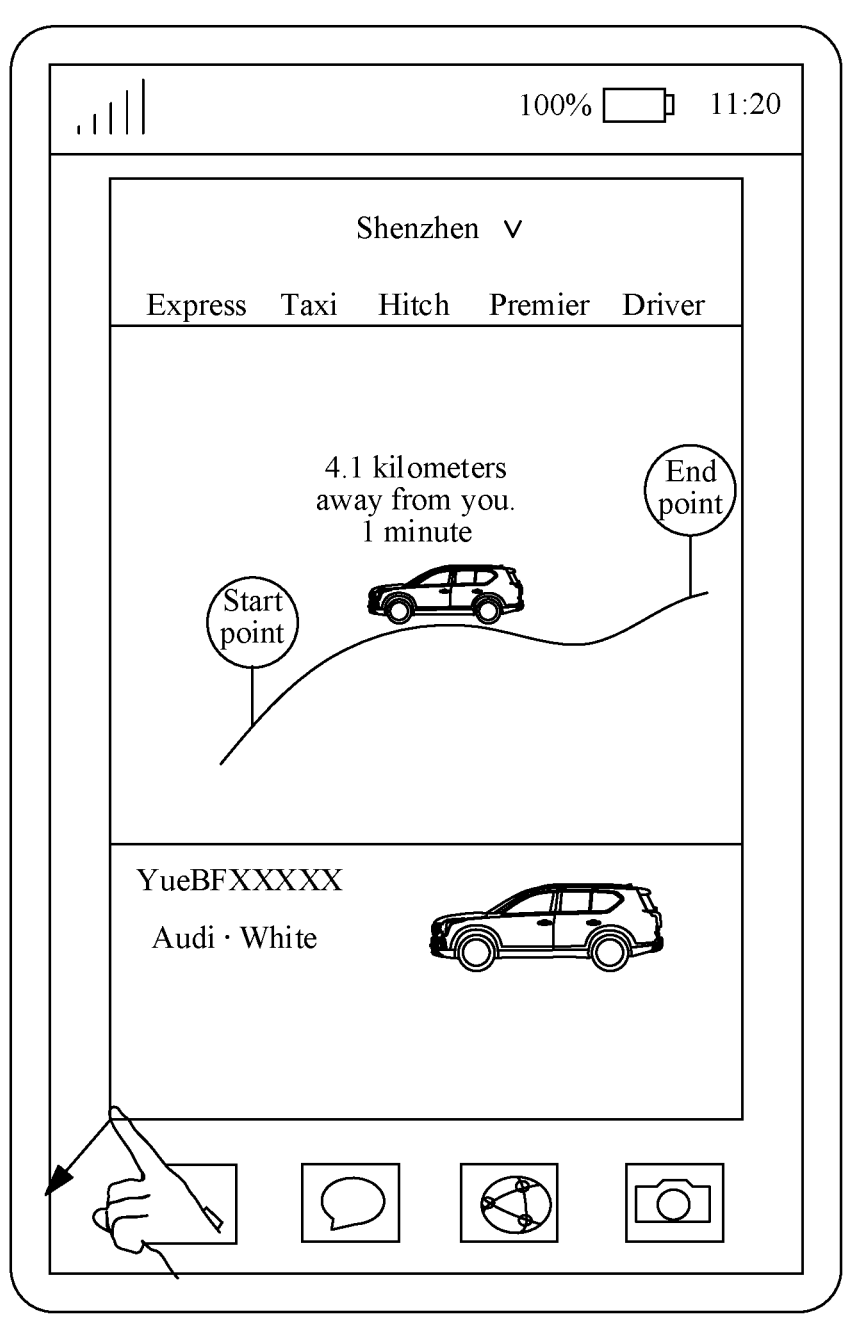
Figure 17C:
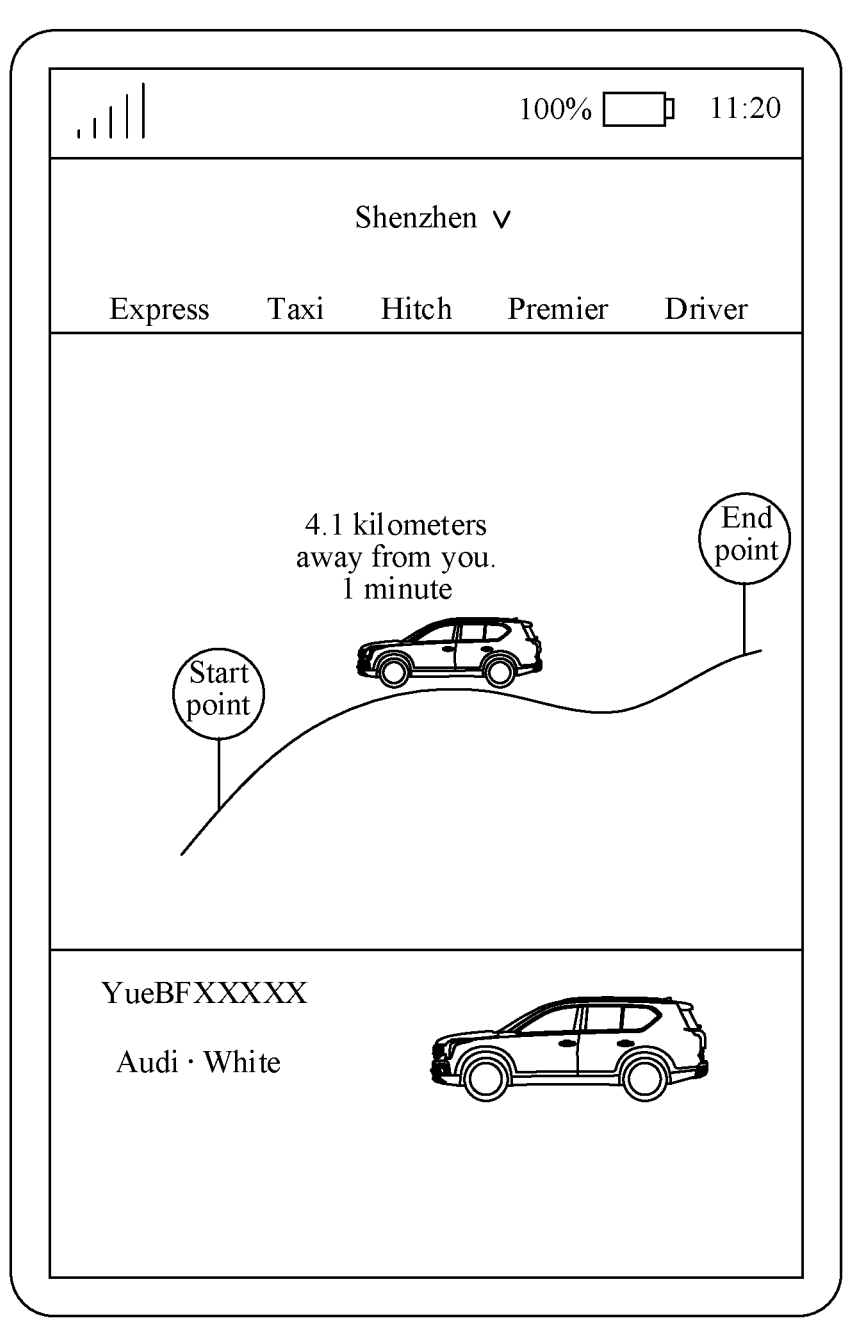

The user may drag the floating window to scale in the floating window. As shown in FIG. 17A, the user may drag a preset position of the floating window to slide outward, for example, drag an edge of the floating window to slide outward. In response to the drag operation, the display window scales in toward edges of the screen, so that the size of the display window is greater than a preset window size, for example, ⅘ of a size of the desktop, as shown in FIG. 17B. In this case, the user interface of the taxi hailing software is displayed in full screen. As shown in FIG. 17C, the taxi hailing software switches from the window mode to the full-screen mode.

Optionally, the floating window may include a title bar. The title bar may include buttons such as "Maximize/Restore". The user may click the "Maximize/Restore" button on the title bar of the floating window to display the user interface of the taxi hailing software in full screen, so that the display mode enters the full-screen mode.

Optionally, the user may drag a preset position of the floating window to slide downward, for example, drag an edge of the floating window to slide downward. Optionally, the preset position may be a middle position or another position of the floating window. Optionally, the display window may be scaled in along a preset direction (for example, a horizontal/vertical direction), so that a width/height of the display window is greater than a preset width/height. In this case, the mobile phone switches from the window mode to the full-screen mode. For example, the display window may continue to scale in along a horizontal direction, so that a width of the display window is greater than a preset width, for example, ⅘ of a width of the desktop. In this case, the mobile phone switches from the window mode to the full-screen mode. The display window may continue to scale in along a vertical direction, so that a height of the display window is greater than a preset height, for example, ⅘ of a height of the desktop. In this case, the mobile phone switches from the window mode to the full-screen mode.

Optionally, an operation of switching the taxi hailing software from the card mode to the floating ball mode is the same as an operation of switching the taxi hailing software from the window mode to the card mode. Optionally, an operation of switching the taxi hailing software from the window mode to the card mode is the same as an operation of switching the card mode to the floating ball mode, and a switching condition of switching the taxi hailing software from the window mode to the card mode is the same as that of switching the card mode to the floating ball mode. Optionally, an operation of switching the taxi hailing software from the full-screen mode to the window mode is the same as an operation of switching the card mode to the floating ball mode, and a switching condition of switching the taxi hailing software from the full-screen mode to the window mode is the same as that of switching the card mode to the floating ball mode.

Optionally, in response to the slide operation shown in FIG. 4B, when the finger is directly released, the taxi hailing software may directly switch from the full-screen mode to either of the card mode and the floating ball mode. Optionally, in response to the drag operation shown in FIG. 5A, when the size of the floating window is less than a preset size, the taxi hailing software may directly switch from the foregoing window mode to the floating ball mode. Optionally, in response to the tap operation shown in FIG. 15A, the taxi hailing software may directly switch from the floating ball mode to either of the window mode and the full-screen mode. Optionally, in response to the tap operation shown in FIG. 16A, the taxi hailing software may directly switch from the foregoing card mode to the full-screen mode.

Figure 18A:
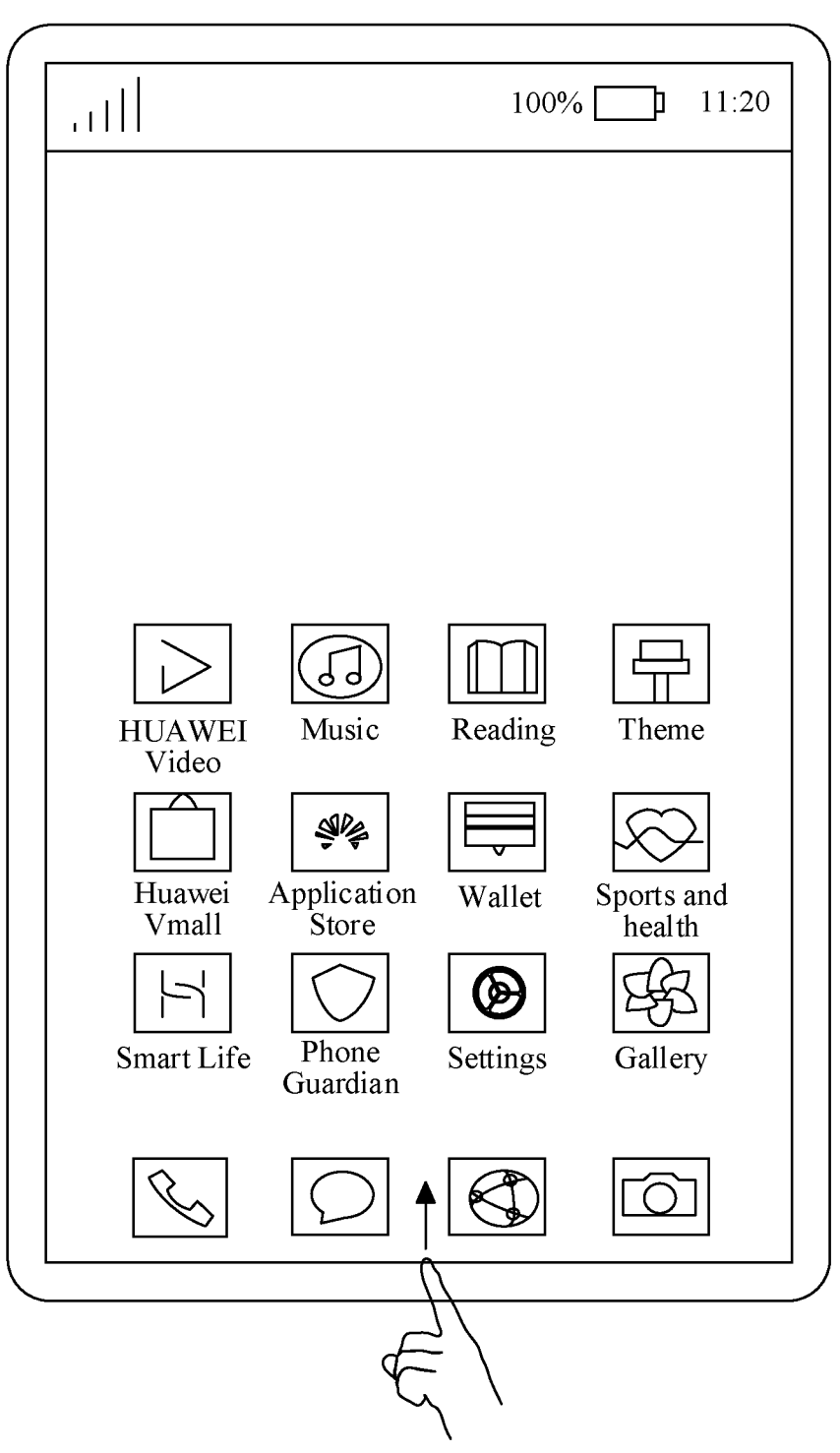
FIG. 18A, FIG. 18B, FIG. 18C, and FIG. 18D are schematic diagrams of some application interfaces according to an embodiment of this disclosure.
Figure 18B:
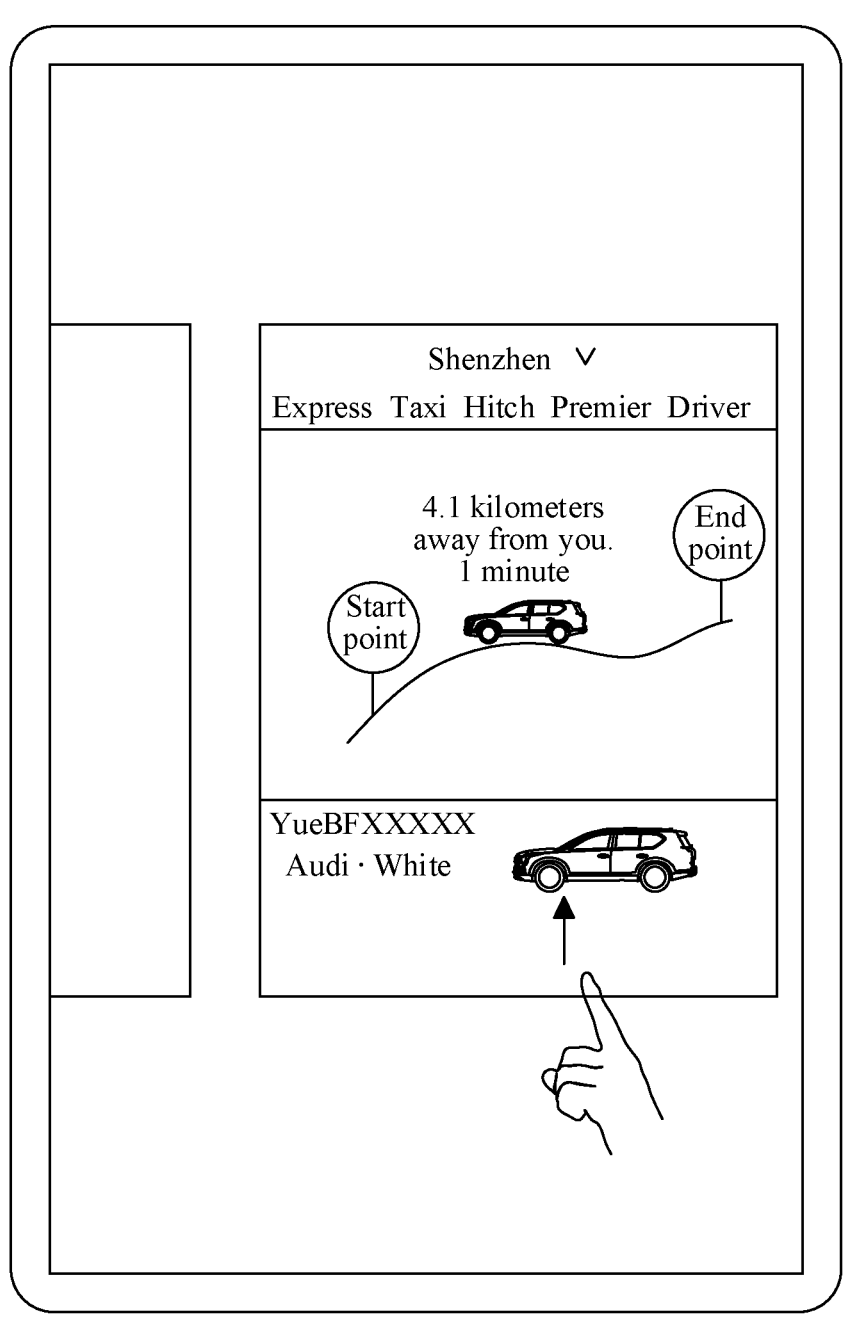

The following describes a display method in Embodiment 2 of this disclosure by using an example in which a user enters a multi-task interface. The user may enter the multi-task interface by performing a preset operation (as shown in FIG. 18A), for example, sliding upward from a bottom edge of the screen (as shown in FIG. 18B). Optionally, the preset operation may further be tapping a menu key. The sliding upward from the bottom edge of the screen may be sliding upward from a central edge position at the bottom of the screen, or may be sliding upward from a left edge position or a right edge position at the bottom of the screen, or the like. A task thumbnail of a last frame of image of an application that is run on a background is displayed on the multi-task interface, and a name corresponding to the application is marked at a preset position (for example, above or below the task thumbnail) of the task thumbnail. The task thumbnail is a snapshot, and after the task thumbnail is selected, the current user interface of the application is restored. A size of the task thumbnail is smaller than a size of the desktop. On the multi-task interface, the user may want to activate a task thumbnail of specific application software, for example, a task thumbnail of taxi hailing software, and expect that information in the taxi hailing software does not block viewing of a calendar. In this case, the user needs to switch a display mode of the taxi hailing software.

Figure 18C:
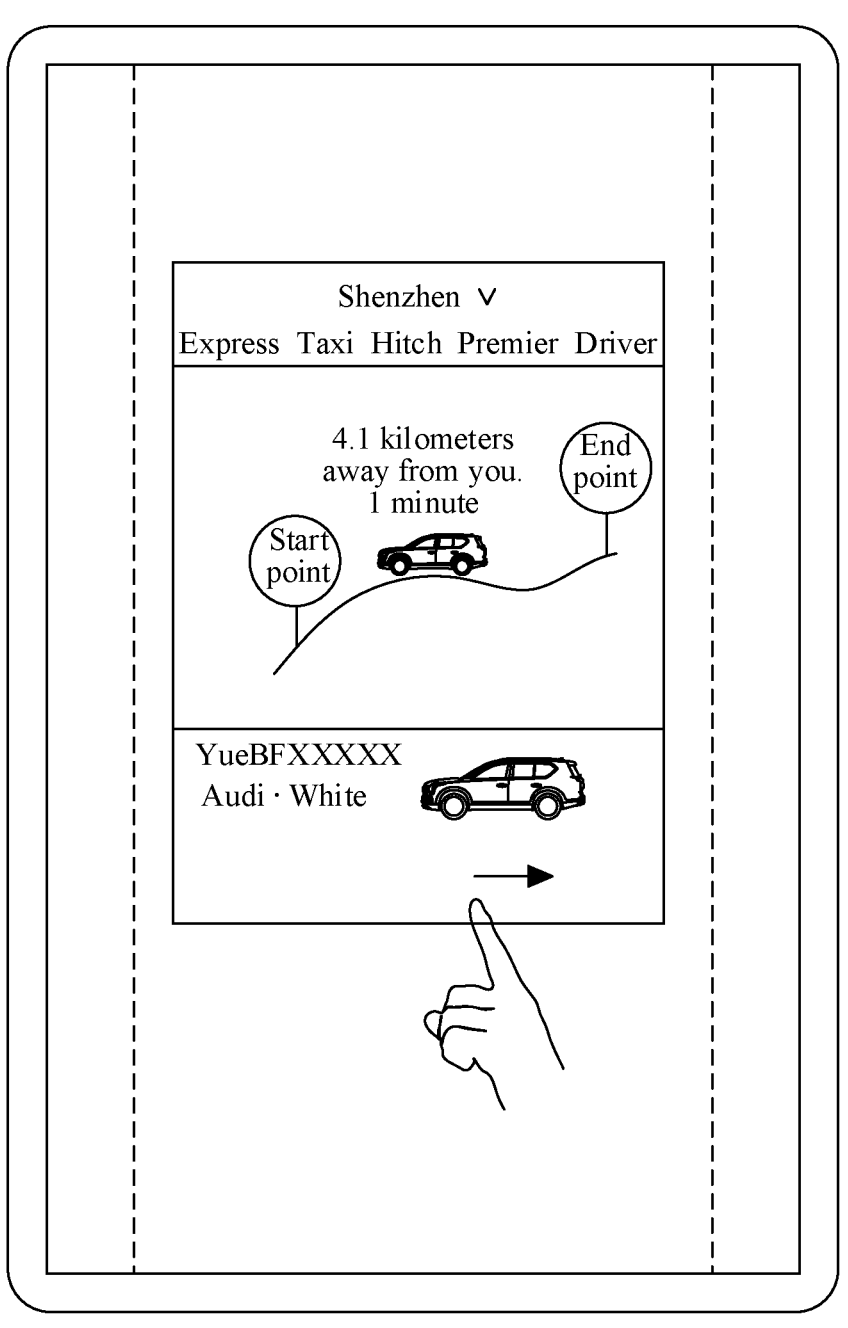
Figure 18D:
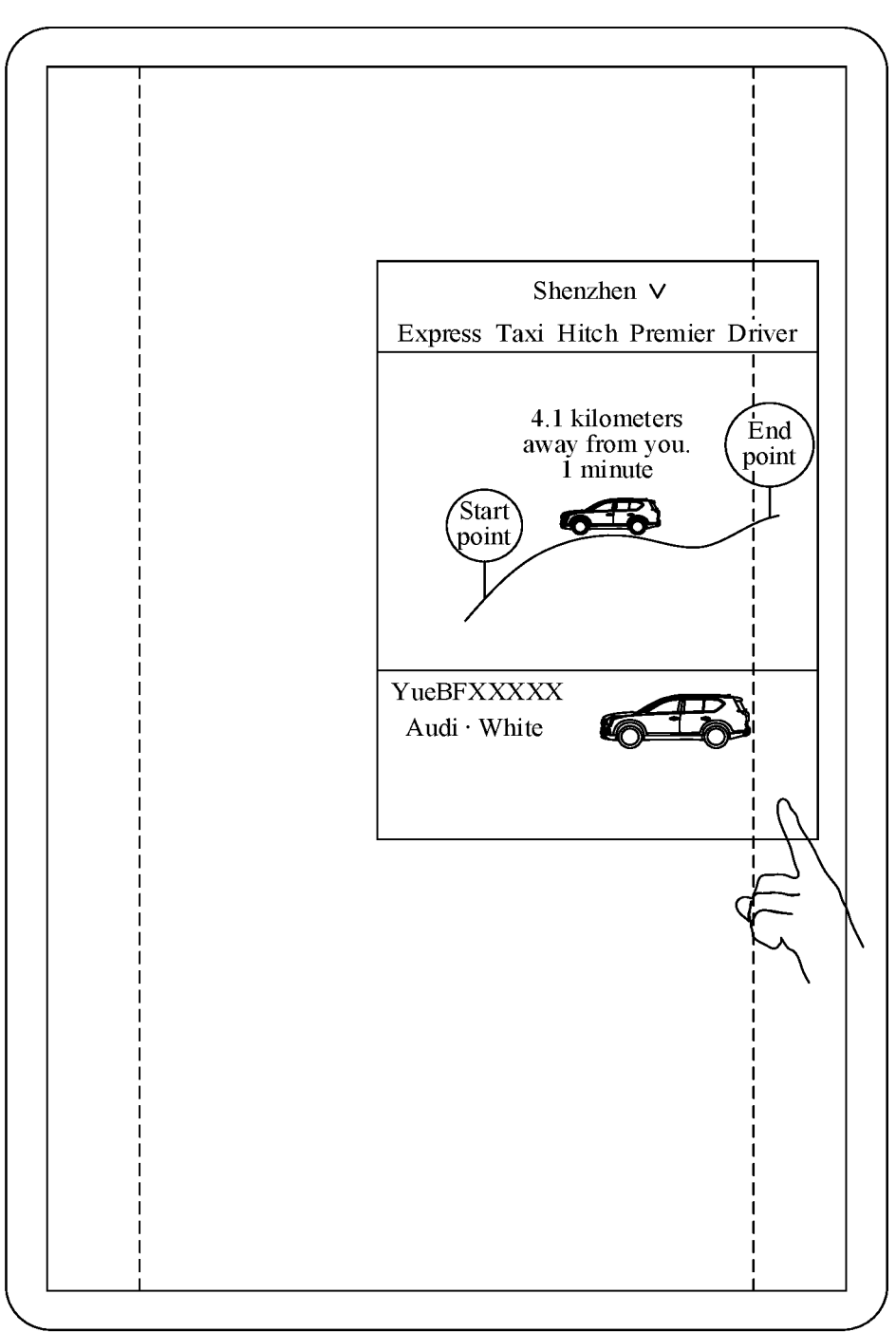

For example, as shown in FIG. 18B, the user selects the task thumbnail of the taxi hailing software. The selection may be sliding upward or the like. In response to the selection operation, the mobile phone may be triggered to enable a preset first mode switching hotspot on the desktop, as shown in FIG. 18C. The first mode switching hotspot may be located on a side edge of the desktop, for example, a left side edge, a right side edge, left and right side edges, an upper side edge, a lower side edge, or upper and lower side edges. In FIG. 18C, the first mode switching hotspot is located on the left and right side edges of the desktop, which are a region defined by a left dashed line and a left edge of the screen and a region defined by a right dashed line and a right edge of the screen. It may be understood that, to help a user to understand a position of the first mode switching hotspot by the user, FIG. 18C shows the first mode switching hotspot. However, a person skilled in the art may understand that the first mode switching hotspot may not be displayed. In response to the selection operation, the mobile phone displays a window of the taxi hailing software. The window displays a current user interface of the taxi hailing software. Optionally, a size of the window of the taxi hailing software is the same as a size of the task thumbnail. Optionally, a size of the window of the taxi hailing software is different from a size of the task thumbnail. Optionally, FIG. 18C shows a home screen of the mobile phone. Optionally, in FIG. 18C, the window of the taxi hailing software may be further scaled out from edges of the window of the taxi hailing software to the center of the window of the taxi hailing software. Optionally, in FIG. 18C, a task thumbnail of another application is not displayed. Optionally, the selection may be touching and holding or panning, and a size of the window of the taxi hailing software does not change. The selection may be sliding, and the window of the taxi hailing software may be further scaled in to edges of the screen. In FIG. 18C, the user drags the window of the taxi hailing software to move toward a preset direction, for example, to move toward a right edge of the screen. In response to the drag operation, the window of the taxi hailing software may be moved to the right edge of the screen, as shown in FIG. 18D.

Figure 19A:
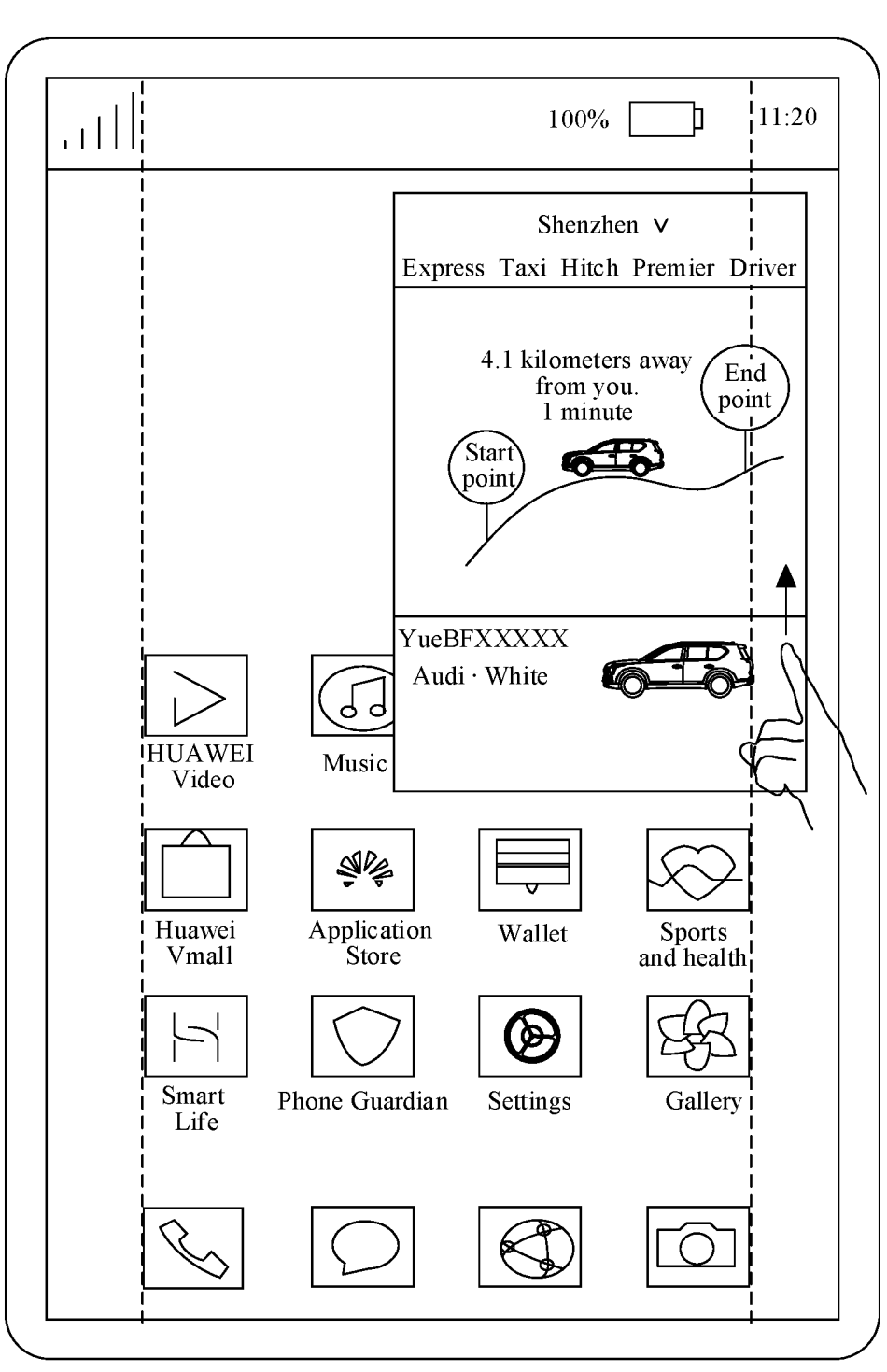
FIG. 19A, FIG. 19B, FIG. 19C, and FIG. 19D are schematic diagrams of some application interfaces according to an embodiment of this disclosure.
Figure 19B:
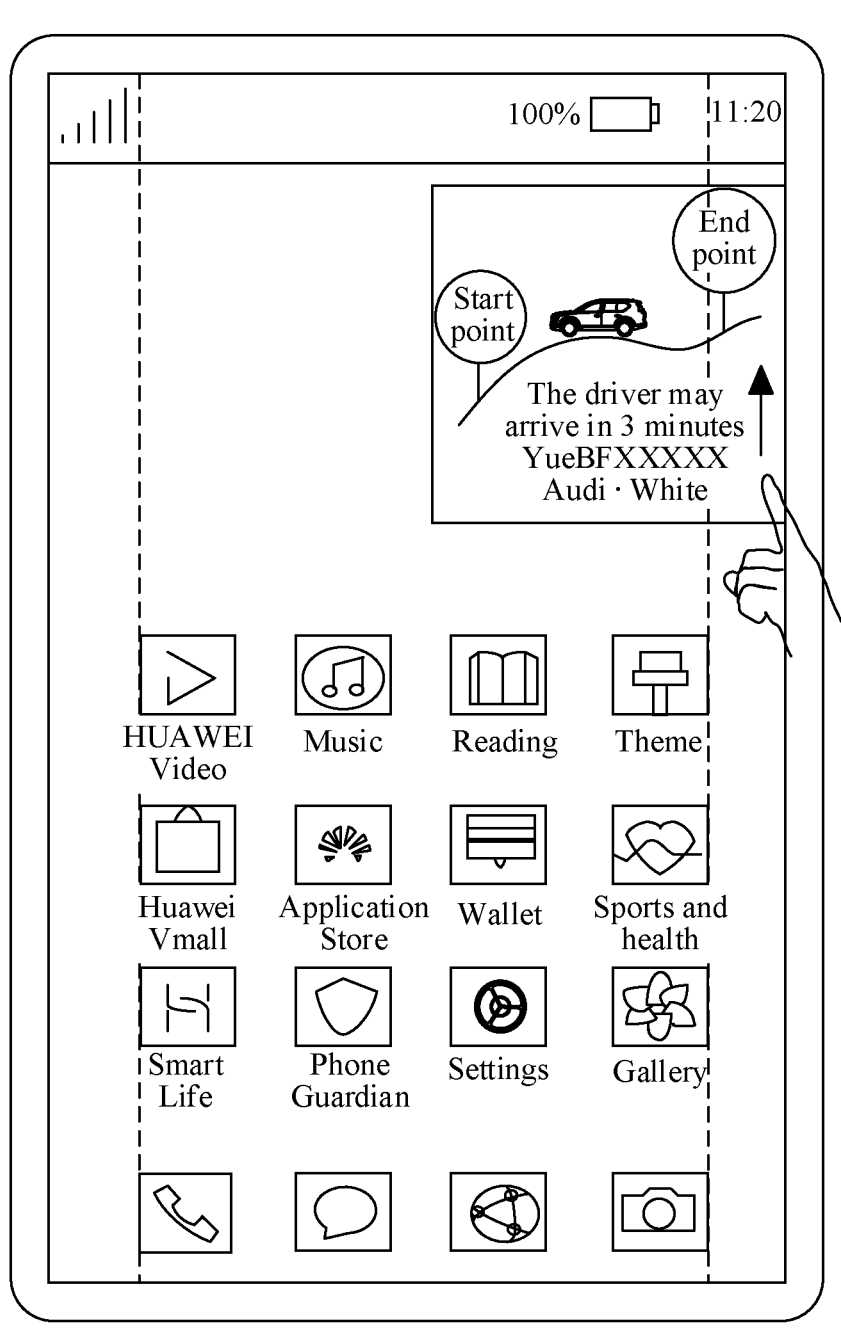
Figure 19C:
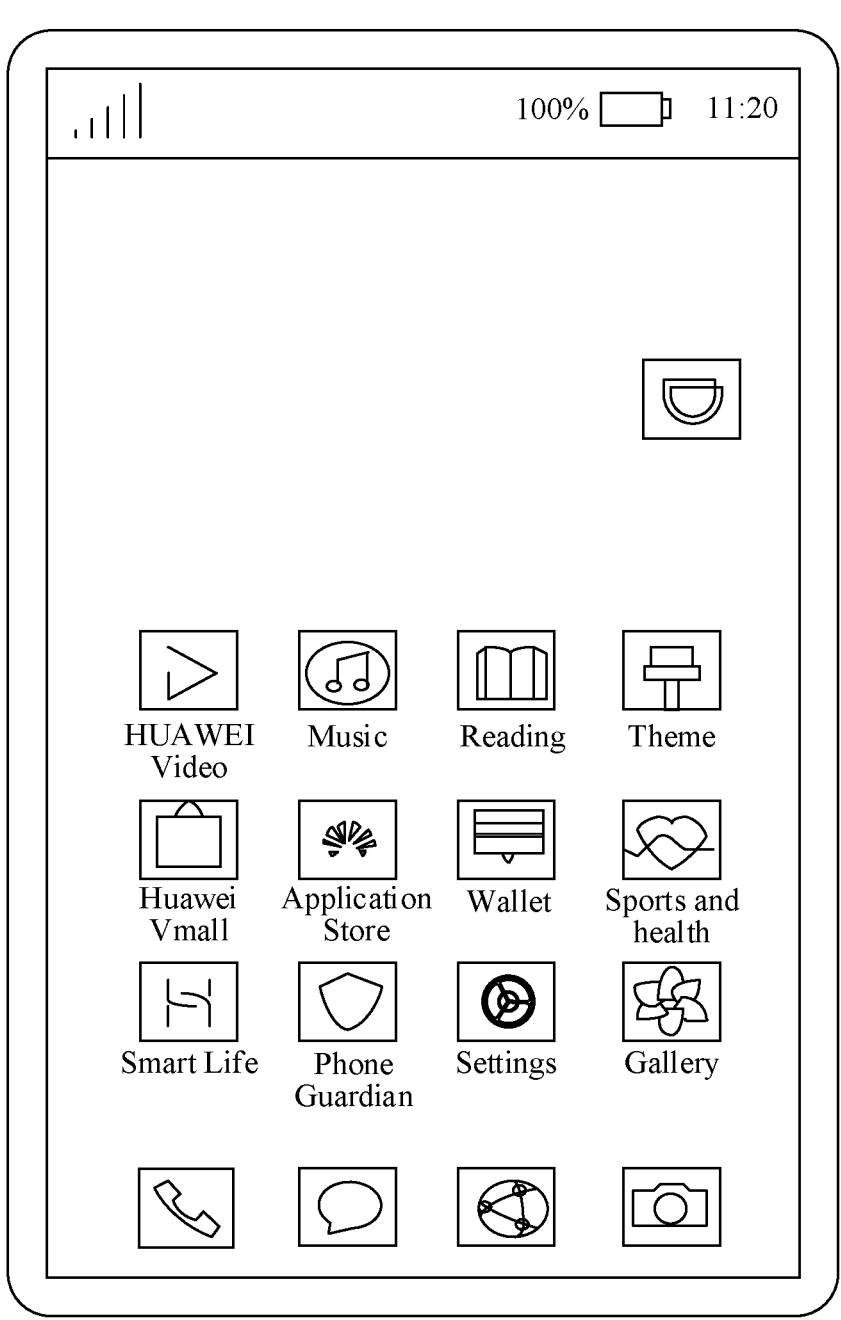

When the window of the taxi hailing software is moved to the right edge of the screen, the user may drag the window of the taxi hailing software to move upward in the first mode switching hotspot without releasing the window, to move the window of the taxi hailing software to a first position. In this case, the taxi hailing software switches to the foregoing window mode, as shown in FIG. 19A. When a floating window is displayed on the desktop, the user may need to know only some simple information in the taxi hailing software, and in this case, the mobile phone may display only some simple information in the taxi hailing software. For example, the user may continue dragging the floating window to move upward in the first mode switching hotspot without releasing the floating window, to move the floating window to a second position. In this case, the taxi hailing software switches from the window mode to the foregoing card mode, as shown in FIG. 19B. When the floating card is displayed on the screen, the user may want to better view a to-be-opened calendar, and expect that content in an interface of the to-be-opened calendar is not blocked. In this case, the floating card needs to be hidden. For example, the user may continue dragging the floating card to move upward in the first mode switching hotspot without releasing the floating card, to move the floating card to a third position. In this case, the taxi hailing software switches from the card mode to the foregoing floating ball mode, as shown in FIG. 19C.

Optionally, the first position, the second position, and the third position may be preset positions. Optionally, the first position, the second position, and the third position may alternatively be positions determined based on a dragging speed. For example, a higher dragging speed indicates shorter distances from the window to the first position, the second position, and the third position, a lower dragging speed indicates longer distances from the window to the first position, the second position, and the third position. Optionally, the first position, the second position, and the third position may alternatively be positions determined based on a dragging force. For example, a larger dragging force indicates shorter distances from the window to the first position, the second position, and the third position, a smaller dragging force indicates longer distances from the window to the first position, the second position, and the third position.

After the taxi hailing software switches to the floating ball mode, the user may want to view the information in the taxi hailing software again. In this case, the information in the taxi hailing software needs to be displayed. For example, the user may continue dragging the floating ball to move downward in the first mode switching hotspot without releasing the floating ball, to move the floating ball to a fourth position. In this case, the taxi hailing software switches to the foregoing card mode. When a floating card is displayed on the desktop, the user may need to know only detailed information in the taxi hailing software, and in this case, the mobile phone may display only detailed information in the taxi hailing software. For example, the user may continue dragging the floating card to continuously move downward in the first mode switching hotspot, to move the floating card to a fifth position. In this case, the taxi hailing software switches from the card mode to the foregoing window mode. When the floating window is displayed on the desktop, the user may drag the floating ball to continuously move downward in the first mode switching hotspot without releasing the floating ball, so that the floating card moves to the sixth position. In this case, the taxi hailing software switches from the foregoing window mode to the foregoing full-screen mode. Apparently, after switching to the full-screen mode, the user may want to view the calendar again, and may continue to switch the display mode of the taxi hailing software.

Optionally, the floating window may include a title bar. The title bar may include buttons such as "Maximize/Restore". The user may click the "Maximize/Restore" button on the title bar of the floating window to display the user interface of the taxi hailing software in full screen, so that the display mode enters the full-screen mode.

Optionally, the fourth position, the fifth position, and the sixth position may be preset positions. Optionally, the fourth position, the fifth position, and the sixth position may alternatively be positions determined based on a dragging speed. For example, a higher dragging speed indicates shorter distances from the floating ball to the fourth position, the fifth position, and the sixth position, and a lower dragging speed indicates longer distances from the floating ball to the fourth position, the fifth position, and the sixth position. Optionally, the fourth position, the fifth position, and the sixth position may alternatively be positions determined based on a dragging force. For example, a larger dragging force indicates shorter distances from the floating ball to the fourth position, the fifth position, and the sixth position, and a smaller dragging force indicates longer distances from the floating ball to the fourth position, the fifth position, and the sixth position. Optionally, the fourth position, the fifth position, and the sixth position may be respectively the same as the first position, the second position, and the third position. Optionally, the fourth position, the fifth position, and the sixth position may be respectively different from the first position, the second position, and the third position.

Figure 19D:
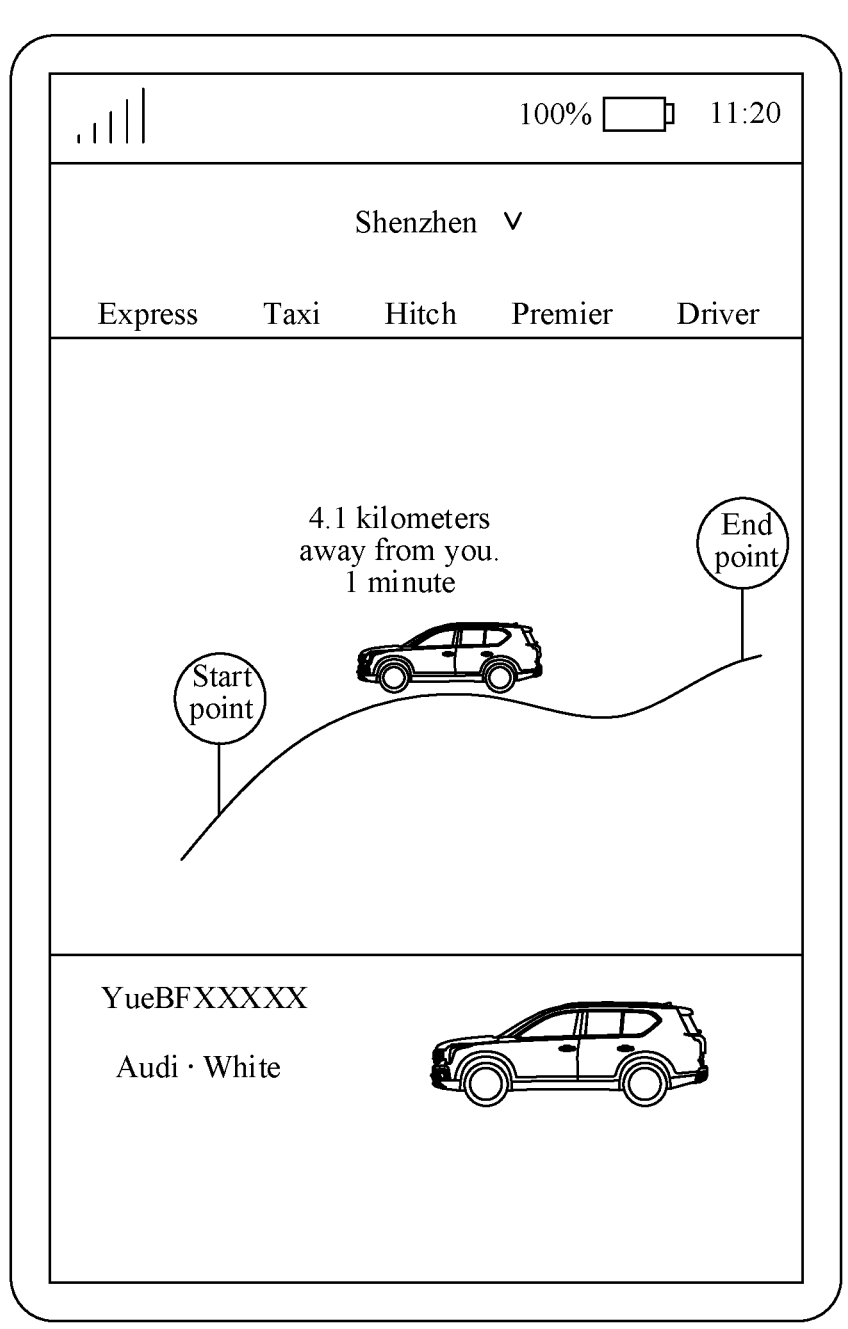

Optionally, when the window of the taxi hailing software is moved to the right edge of the screen, the user may drag the window of the taxi hailing software to move downward in the first mode switching hotspot without releasing the window, to move the window of the taxi hailing software to a seventh position. In this case, the taxi hailing software switches to the foregoing full-screen mode, as shown in FIG. 19D.

Optionally, when the window of the taxi hailing software is dragged to move upward in the first mode switching hotspot, the taxi hailing software may directly switch to either of the card mode and the floating ball mode. Optionally, when the floating ball is dragged to move downward in the first mode switching hotspot, the taxi hailing software may directly switch to either of the window mode and the full-screen mode. Optionally, when the floating card is dragged downward in the first mode switching hotspot, the taxi hailing software may directly switch to the full-screen mode.

Optionally, as described in Embodiment 1, if the size of the window of the taxi hailing software is gradually increased or decreased to the preset size, the mode is switched.

Optionally, when the window of the taxi hailing software is dragged to move upward in the first mode switching hotspot, the size of the window of the taxi hailing software may be gradually increased, so that the window may be switched to the full-screen mode. When the window of the taxi hailing software is continuously moved downward in the first mode switching hotspot, a size of information in the taxi hailing software may be gradually decreased, so that the window may be switched to any one of the window mode, the card mode, and the floating ball mode.

Optionally, after the taxi hailing software switches the display mode, for example, after the display mode is switched to the foregoing window mode, the user may release the floating window, and a position of the floating window on the screen after the release is the same as a position of the floating window on the screen when the user releases the floating window. In this case, when the user expects that the interface of the taxi hailing software does not block viewing of the calendar, the user may continue dragging the floating window to move upward in the first mode switching hotspot, so that the taxi hailing software switches from the window mode to the card mode or the floating ball mode.

Optionally, after the taxi hailing software switches the display mode, for example, after the display mode is switched to the foregoing window mode, the user may release the floating window, and a position of the floating window on the screen after the release is different from a position of the floating window on the screen when the user releases the floating window In this case, when the user expects that the interface of the taxi hailing software does not block viewing of the calendar, the user may continue to perform the selection operation in FIG. 18B, the drag operation in FIG. 18C, and the operation of dragging the floating window to move upward in the first mode switching hotspot, so that the taxi hailing software switches from the window mode to the card mode or the floating ball mode.

It may be understood that, in the foregoing dragging process, if the taxi hailing software has switched from the card mode to the foregoing floating ball mode, even if the floating ball is continuously dragged to move upward in the first mode switching hotspot, the display mode of the taxi hailing software does not change, that is, the floating ball mode remains, or if the taxi hailing software has switched to the foregoing full-screen mode, even if the full-screen window is continuously dragged to move downward in the first mode switching hotspot, the display mode of the taxi hailing software does not change, that is, the full-screen mode remains. Alternatively, in another possible design, to facilitate user operations, it may be set that if the taxi hailing software has switched from the card mode to the floating ball mode, even if the floating ball is continuously dragged to move upward in the first mode switching hotspot by a distance, the display mode of the taxi hailing software remains. However, if the user still continuously drags the floating ball after a preset distance is exceeded, the display mode may be switched from the floating ball mode to any one of the card mode, the window mode, or the full-screen mode.

The following describes a display method in Embodiment 3 of this disclosure by using an example in which a user enters a multi-task interface. For example, in the process of entering the multi-task interface in Embodiment 2, the user enters the multi-task interface. On the multi-task interface, the user may want to activate a task thumbnail of specific application software, for example, a task thumbnail of taxi hailing software, and expect that information in the taxi hailing software does not block viewing of a calendar. In this case, the user needs to switch a display mode of the taxi hailing software.

Figure 20A:
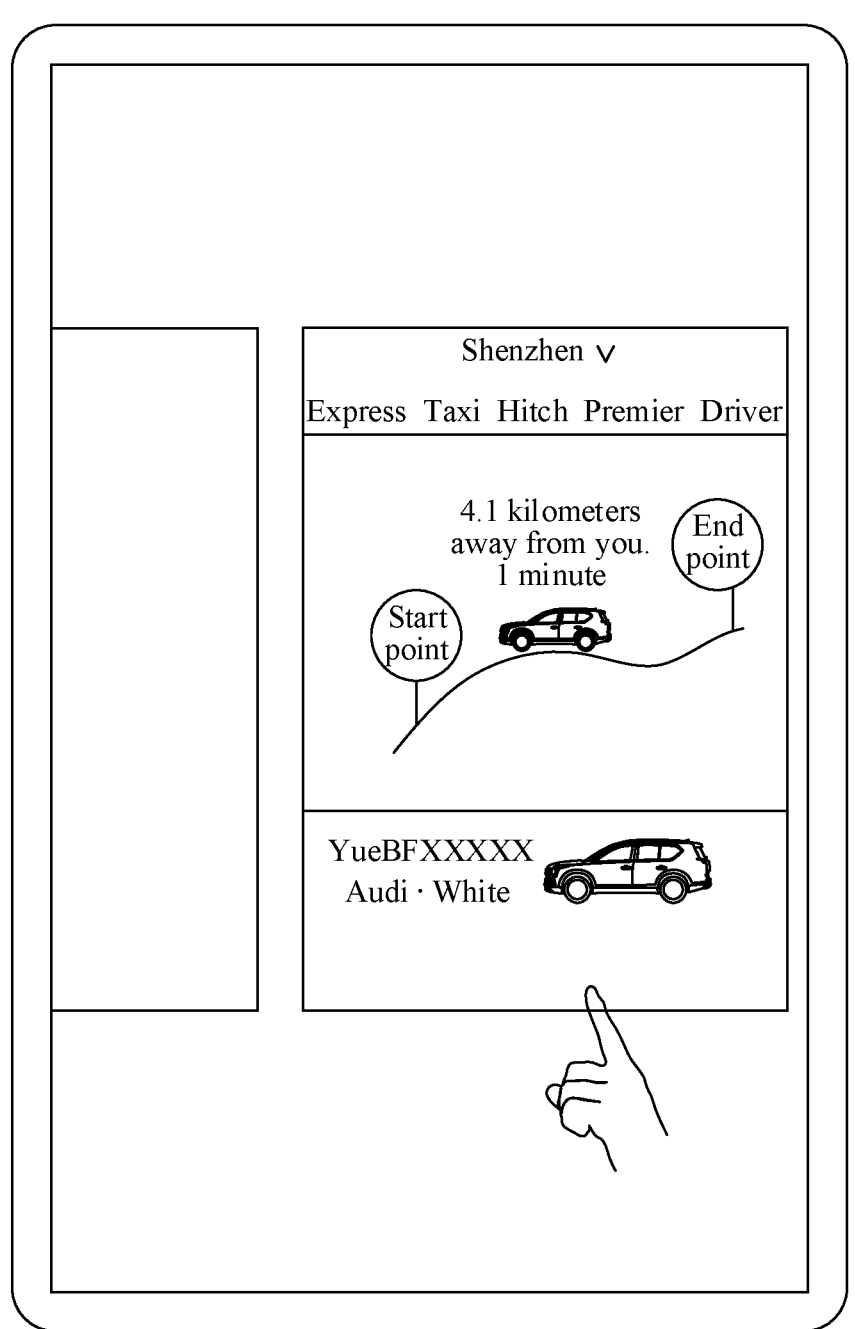
FIG. 20A, FIG. 20B, FIG. 20C, and FIG. 20D are schematic diagrams of some application interfaces according to an embodiment of this disclosure.
Figure 20B:
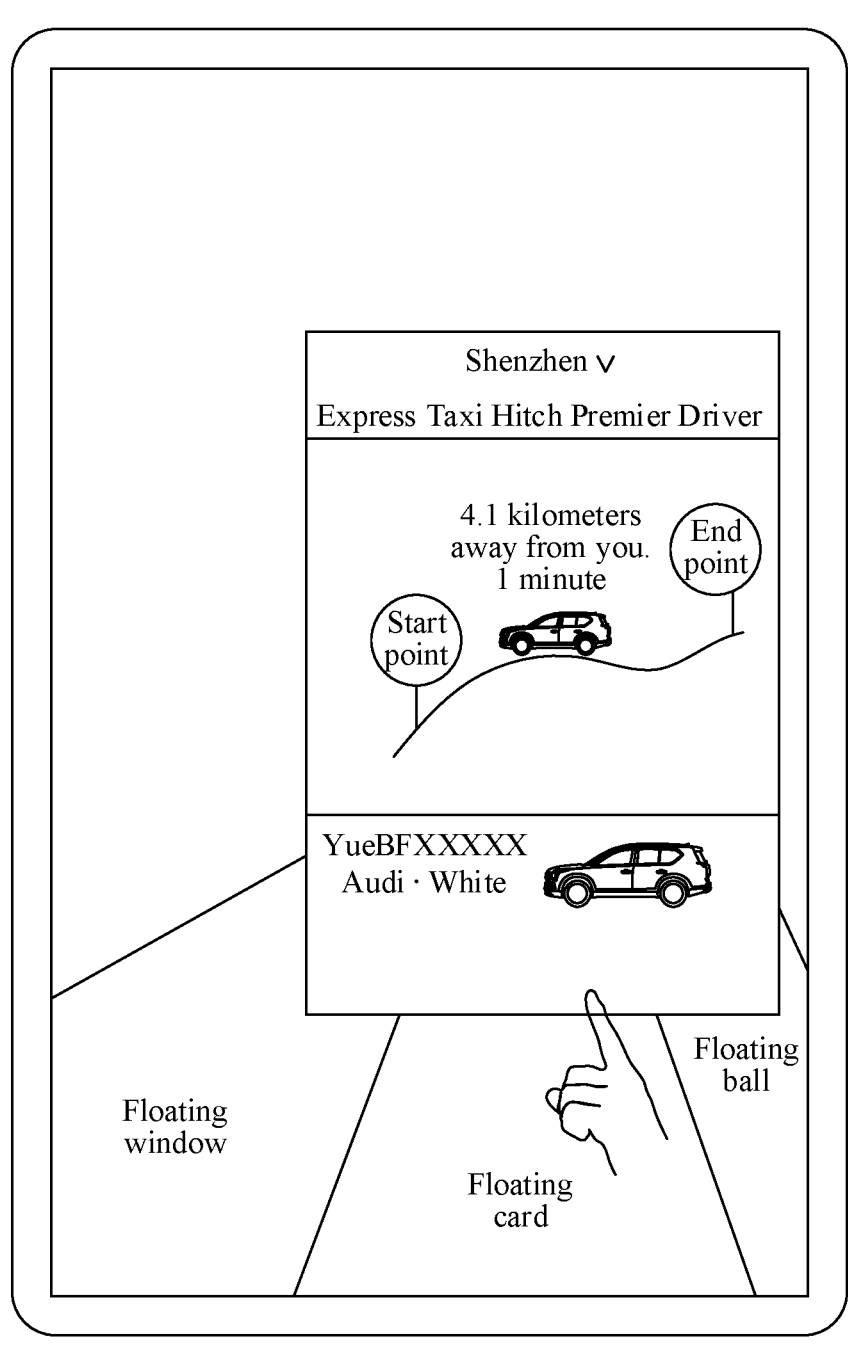
Figure 20C:
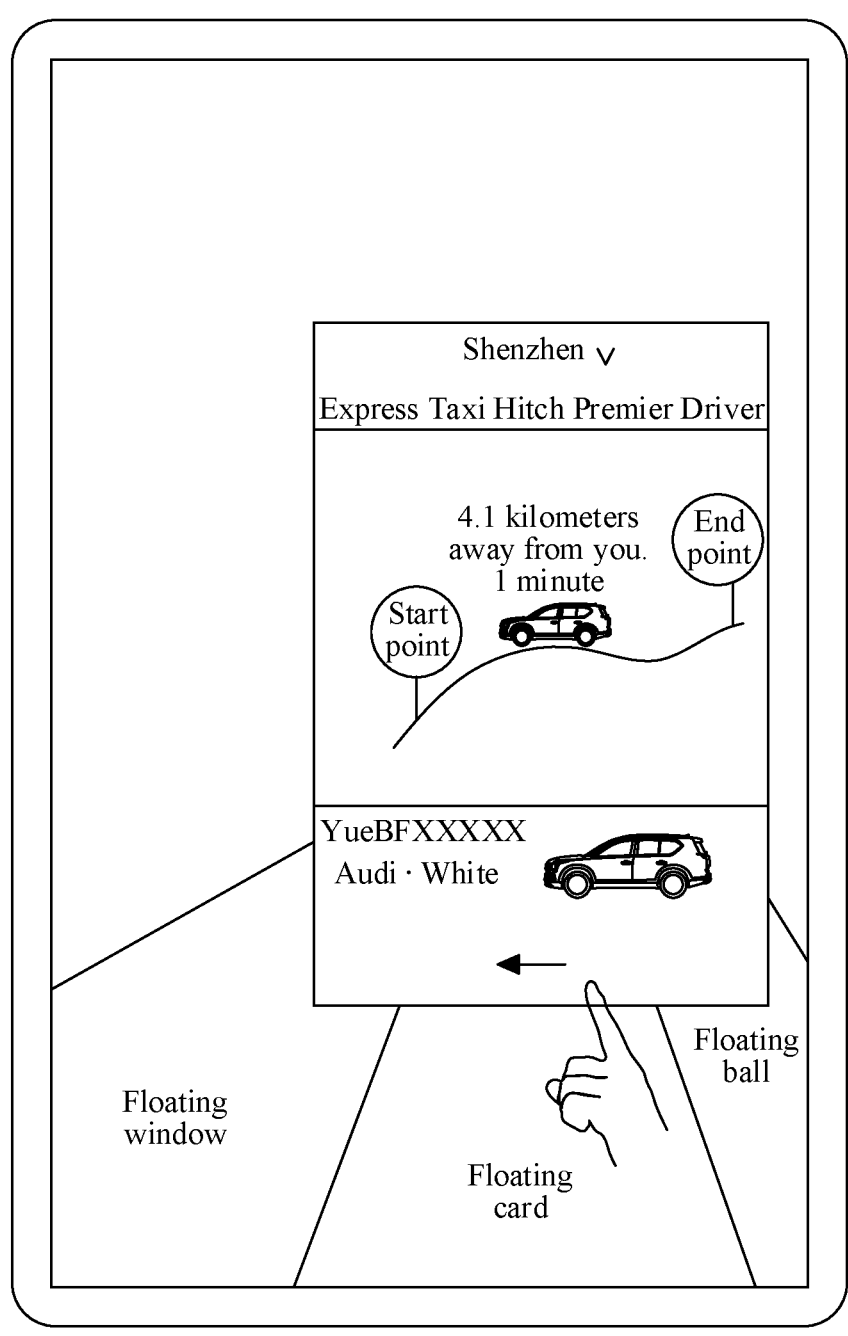
Figure 20D:
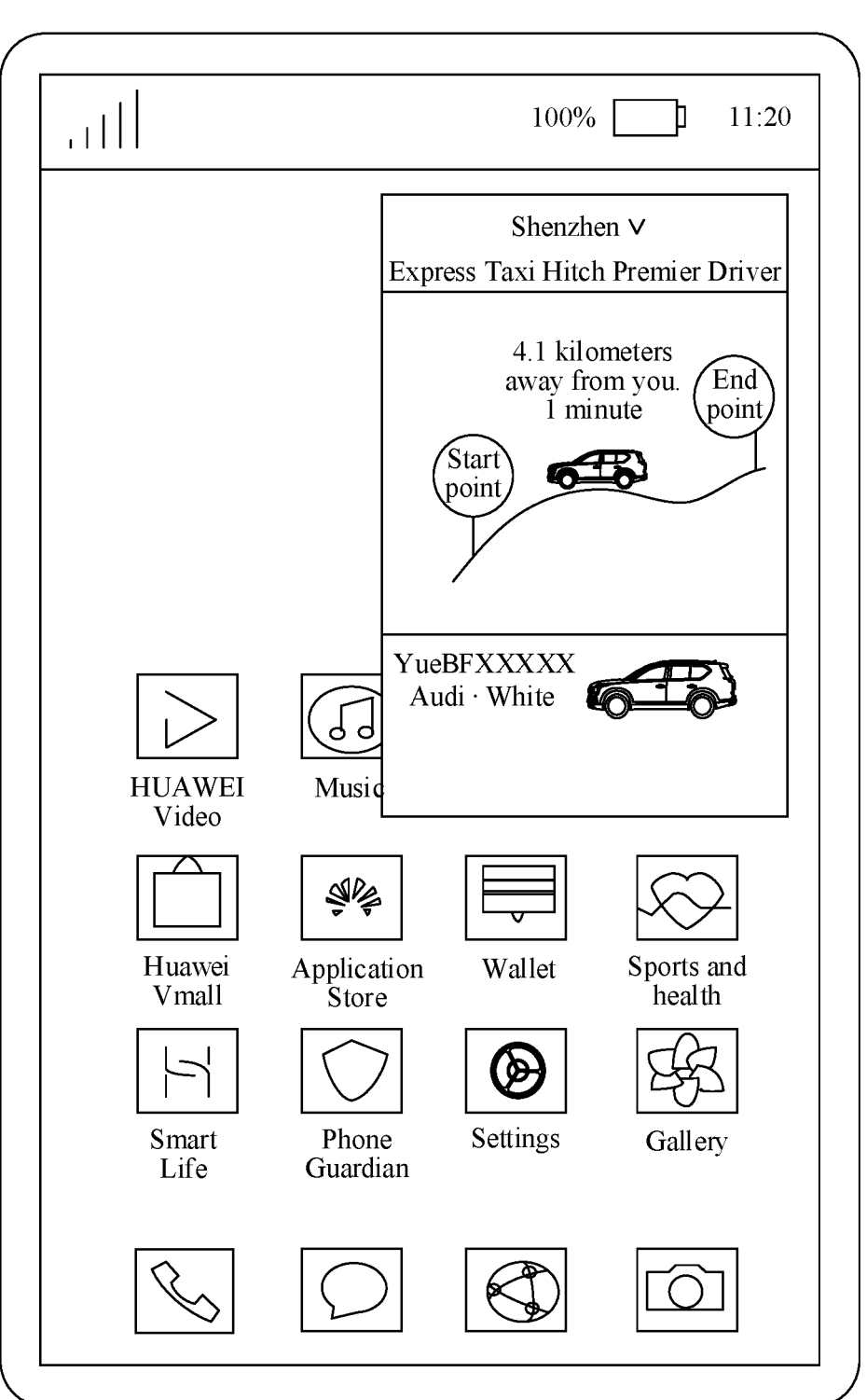

For example, as shown in FIG. 20A, the user touches and holds the task thumbnail of the taxi hailing software. In response to the touch and hold operation, the mobile phone may be triggered to enable at least one preset second mode switching hotspot on the desktop, as shown in FIG. 20B. The second mode switching hotspot may be located in a preset region of the desktop, for example, below a window of the taxi hailing software. The second mode switching hotspot may include at least one of a floating window hotspot, a floating card hotspot, and a floating ball hotspot. Optionally, the mobile phone displays at least one preset second mode switching hotspot on the desktop. Optionally, when displaying the second mode switching hotspot, the mobile phone may prompt the user of a type of the second mode switching hotspot. For example, the mobile phone may display, in the second mode switching hotspot, a corresponding graphic sign (for example, a prompt bar or an icon), a corresponding text, or the like to prompt the user of the type of the second mode switching hotspot. In response to the touch and hold operation, the mobile phone displays a window of the taxi hailing software. The window displays a current user interface of the taxi hailing software. Optionally, a size of the window of the taxi hailing software is the same as a size of the task thumbnail. Optionally, a size of the window of the taxi hailing software is different from a size of the task thumbnail. Optionally, in FIG. 20B, a main desktop or a current display interface of the mobile phone is further displayed. Optionally, in FIG. 20B, a task thumbnail of another application is not displayed. The user may drag the window of the taxi hailing software to any second mode switching hotspot. For example, as shown in FIG. 20C, the user drags the window of the taxi hailing software to a floating window hotspot and releases the window. In response to the drag operation, the mobile phone performs the foregoing operation of switching to the window mode, and displays a floating window of the taxi hailing software, as shown in FIG. 20D. Optionally, a position of the floating window on the screen may be the same as a position of the floating window hotspot on the screen. Optionally, a position of the floating window on the screen may be different from a position of the floating window hotspot on the screen, for example, at any position or a fixed position on the screen.

Figure 21A:
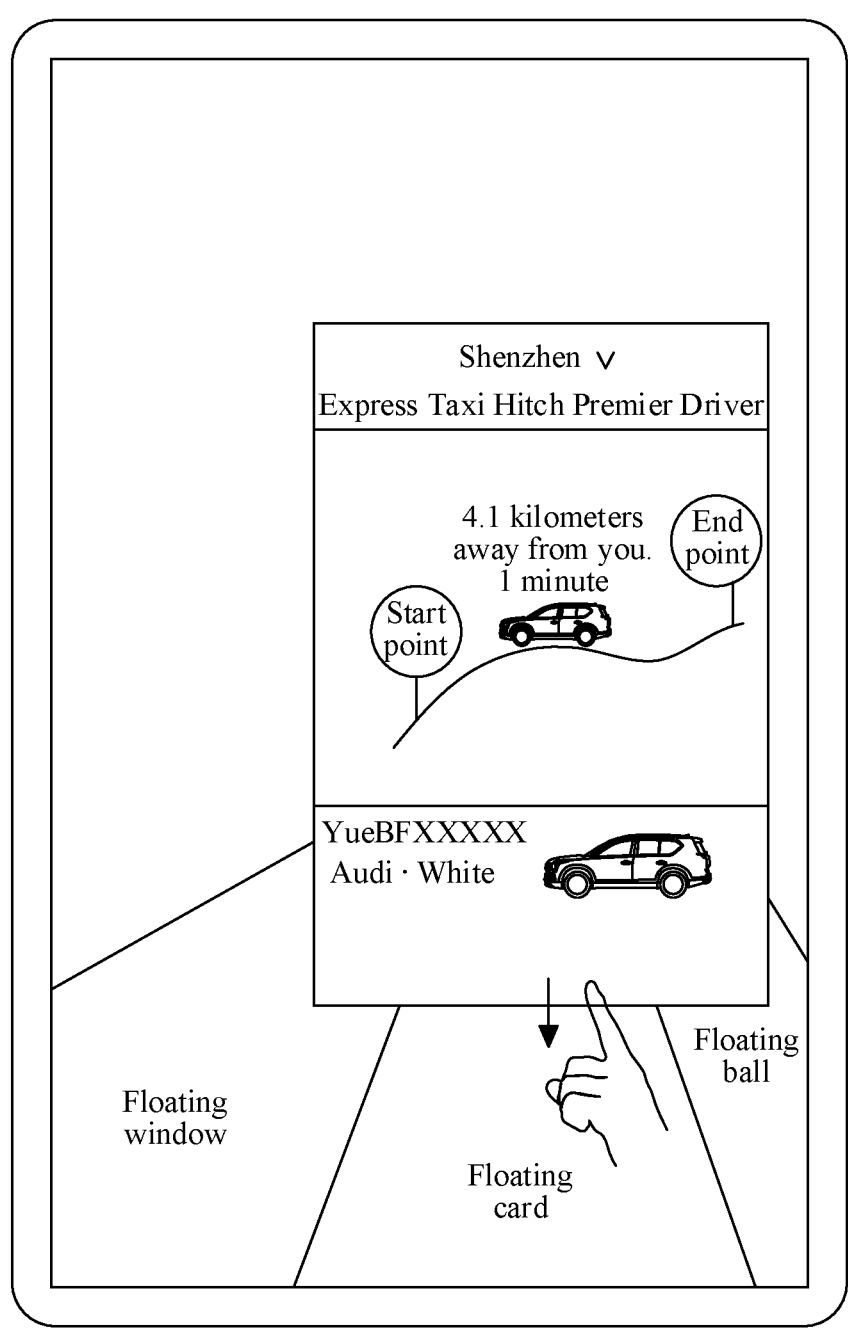
FIG. 21A, FIG. 21B, FIG. 21C, and FIG. 21D are schematic diagrams of some application interfaces according to an embodiment of this disclosure.
Figure 21B:
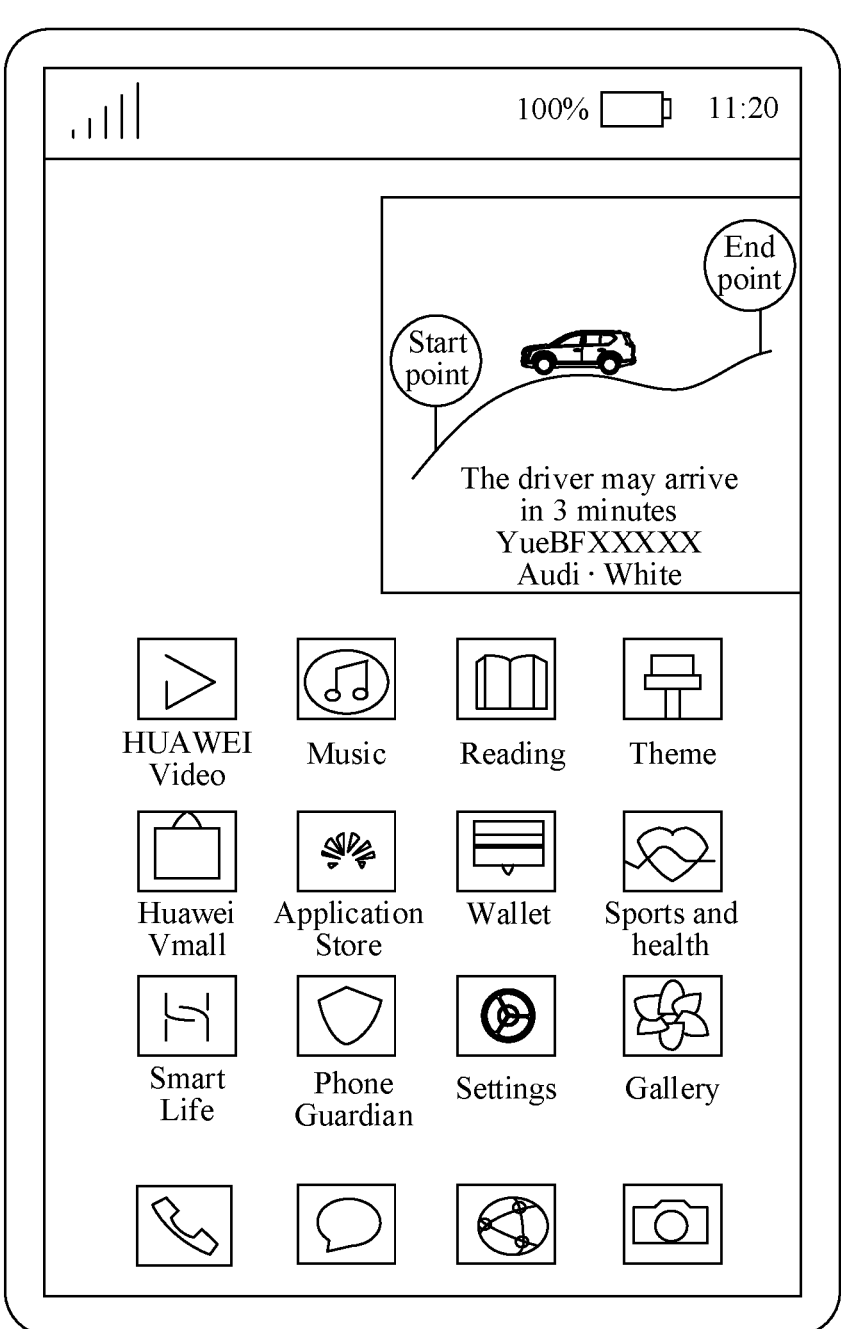

The user may not only drag the window of the taxi hailing software to the floating window hotspot and release the window, but also may drag the window of the taxi hailing software to a floating card hotspot and release the window, as shown in FIG. 21A. In response to the drag operation, the mobile phone performs the foregoing operation of switching to the card mode, and displays a floating card of the taxi hailing software as shown in FIG. 21B. Optionally, a position of the floating card on the screen may be the same as a position of the floating card hotspot on the screen. Optionally, a position of the floating card on the screen may be different from a position of the floating card hotspot on the screen, for example, at any position or a fixed position on the screen.

Figure 21C:
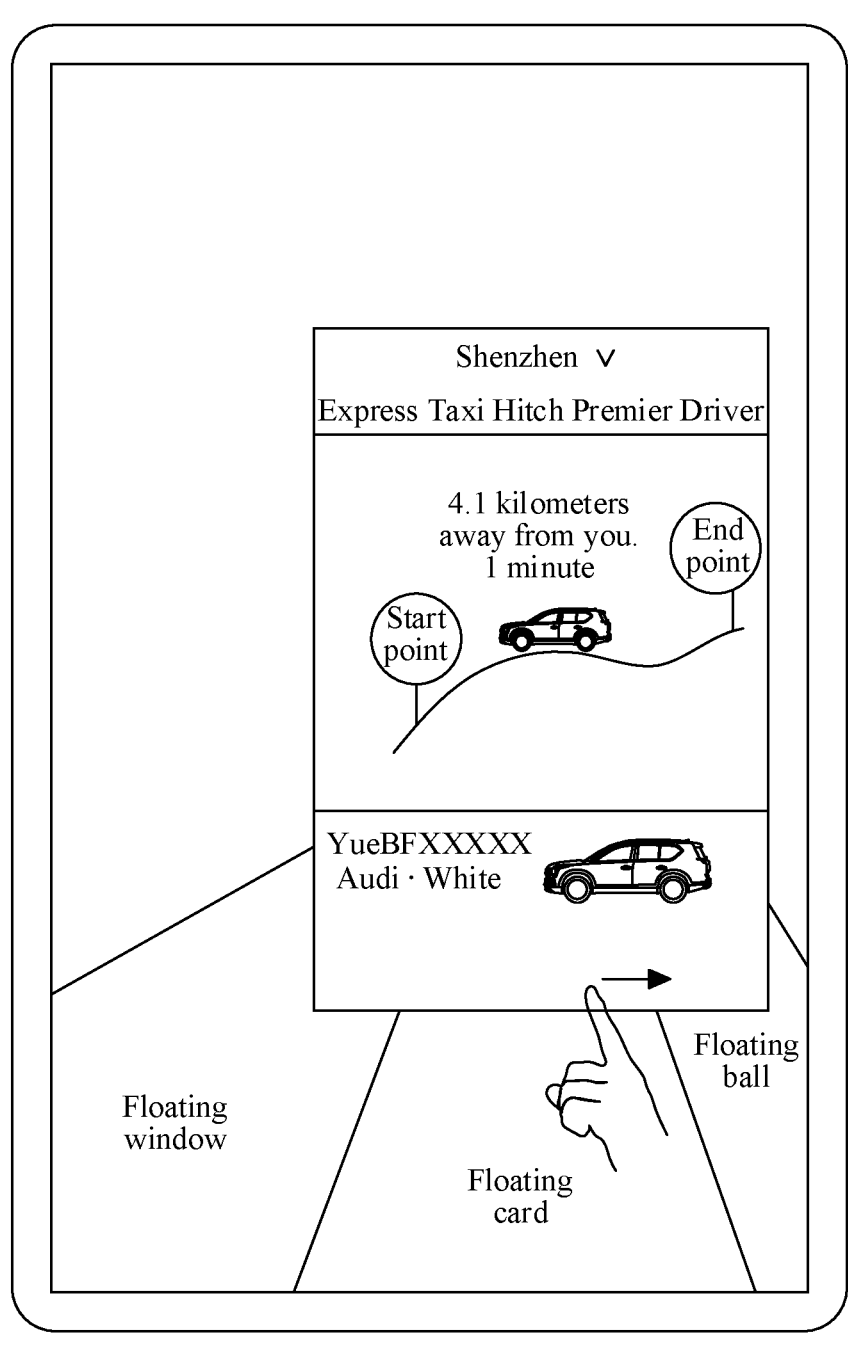
Figure 21D:
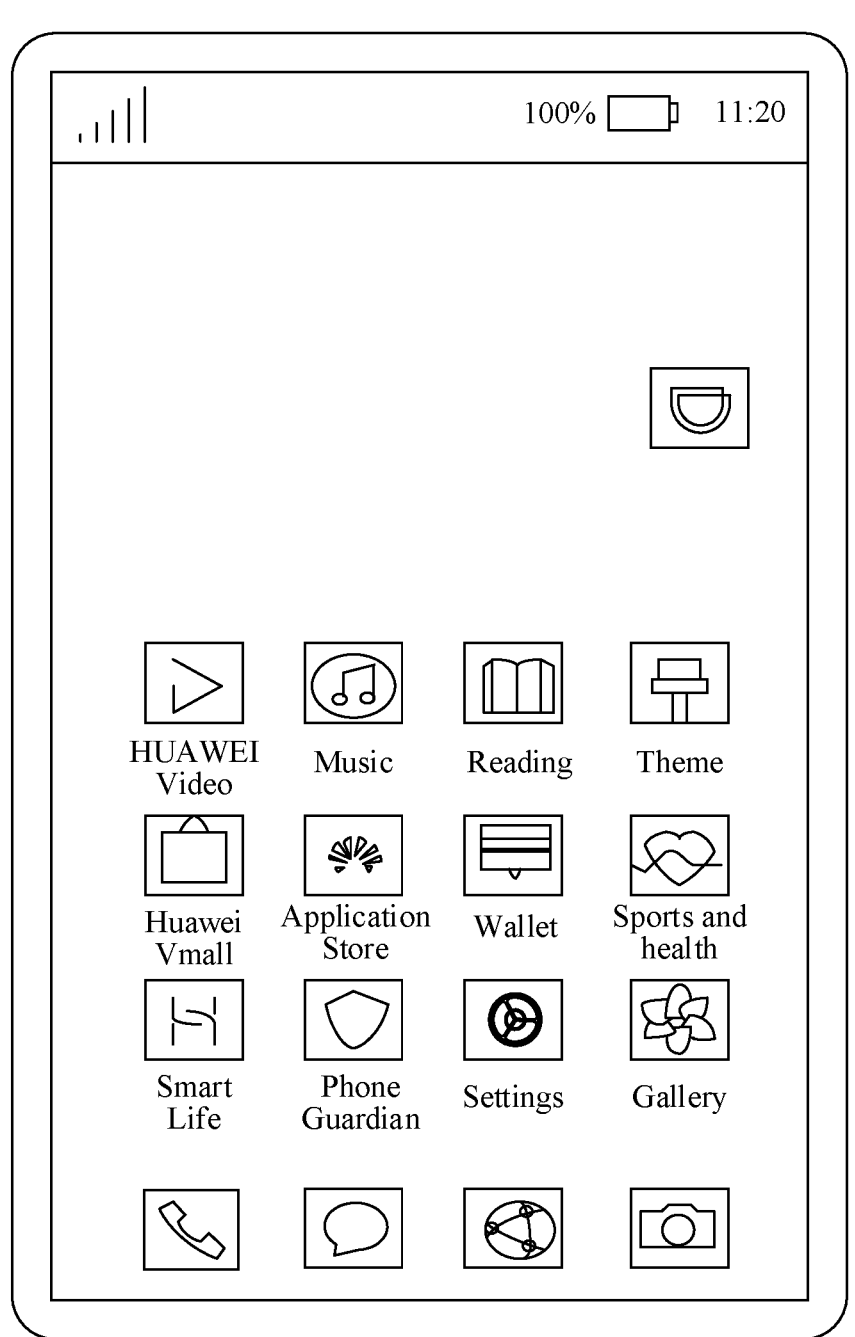

The user may not only drag the window of the taxi hailing software to the floating window hotspot or the floating card hotspot, but also may drag the window of the taxi hailing software to a floating ball hotspot and release the window, as shown in FIG. 21C. In response to the drag operation, the mobile phone performs the foregoing operation of switching to the floating ball mode, and displays a floating ball of the taxi hailing software, as shown in FIG. 21D. Optionally, a position of the floating ball on the screen may be the same as a position of the floating ball hotspot on the screen. Optionally, a position of the floating ball on the screen may be different from a position of the floating ball hotspot on the screen, for example, at any position or a fixed position on the screen.

Optionally, the second mode switching hotspot may further include a full-screen hotspot. Optionally, the user may further drag a window of the taxi hailing software to the full-screen hotspot, to switch the taxi hailing software to the full-screen mode.

Optionally, the user may drag a window of the taxi hailing software to a second mode switching hotspot without releasing the window, and may continue dragging information in the taxi hailing software to another second mode switching hotspot. In response to the drag operation, the window of the taxi hailing software switches to a display mode corresponding to the last second mode switching hotspot. For example, the user may drag the window of the taxi hailing software to the floating card hotspot without releasing the window, and the taxi hailing software switches from the window mode to the foregoing floating card mode. The user may continue dragging the floating card of the taxi hailing software to the floating window hotspot, and the taxi hailing software switches from the floating card mode to the floating window mode shown in FIG. 21B. For example, the user may drag the window of the taxi hailing software to a full-screen mode hotspot, and the taxi hailing software switches from the window to the full-screen mode. In the full-screen mode, the window of the taxi hailing software may exceed a preset size (for example, ¾) and exit the screen. The user may continue dragging the window of the taxi hailing software to the floating window hotspot, and the taxi hailing software switches from the full-screen mode to the floating window mode.

Optionally, the second mode switching hotspot may be located above the window of the taxi hailing software. Optionally, the second mode switching hotspot may be partially located above the window of the taxi hailing software, and partially located below the window of the taxi hailing software. Optionally, the second mode switching hotspot may be partially located left to the window of the taxi hailing software, and partially located right to the window of the taxi hailing software.

Figure 22A:
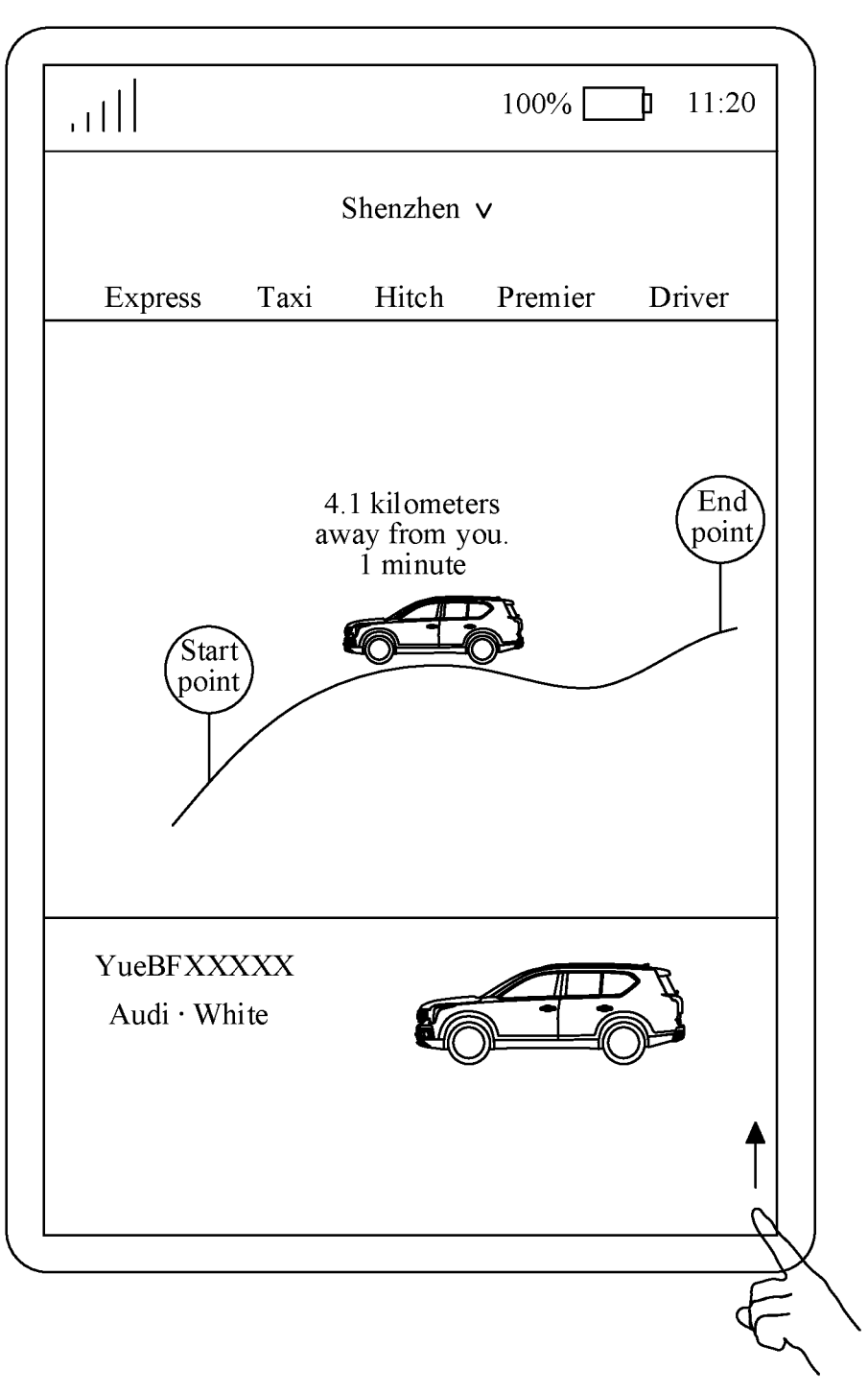
FIG. 22A, FIG. 22B, FIG. 22C, and FIG. 22D are schematic diagrams of some application interfaces according to an embodiment of this disclosure.

A display method in Embodiment 4 of this disclosure is described below by using an example in which a user is using taxi hailing software in full screen, as shown in FIG. 22A. In FIG. 22A, the using taxi hailing software in full screen means that a status bar is also displayed when a display window is displayed on a desktop. A user interface of the taxi hailing software is displayed in the display window. The display window occupies most of the desktop. The status bar may include signal strength, time, current remaining power, and the like. It should be understood that the status bar may display more or less information than that shown in the figure. For example, the status bar may further include a name of an operator (for example, China Mobile), a WI-FI icon, BLUETOOTH, an alarm clock, and the like. This is not limited in this disclosure. Optionally, a floating shortcut menu (for example, Assistive Touch of APPLE) and the like may be further displayed on the desktop. Optionally, the using taxi hailing software in full screen may further mean that the display window is maximized to fill up the entire desktop, and the entire desktop does not display other content. A user interface of the taxi hailing software is displayed in the display window. Optionally, the using taxi hailing software in full screen may alternatively occupy only a part of a display region of a screen. For example, when the screen is an anisotropic cutting screen (notch screen), a middle part of the anisotropic cutting screen displays the user interface of the taxi hailing software, and one side edge part or two side edge parts of the anisotropic cutting screen are off.

Figure 22B:
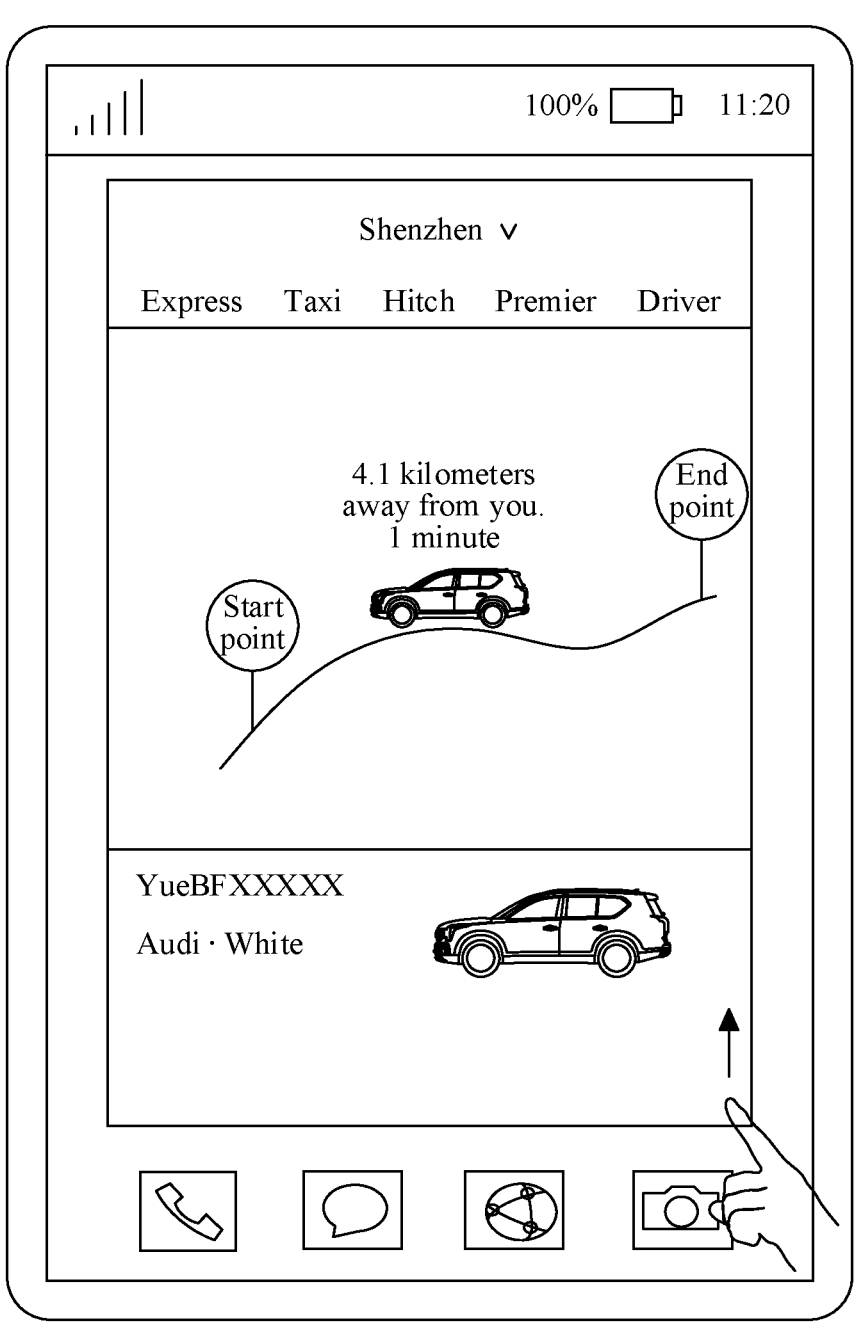
Figure 22C:
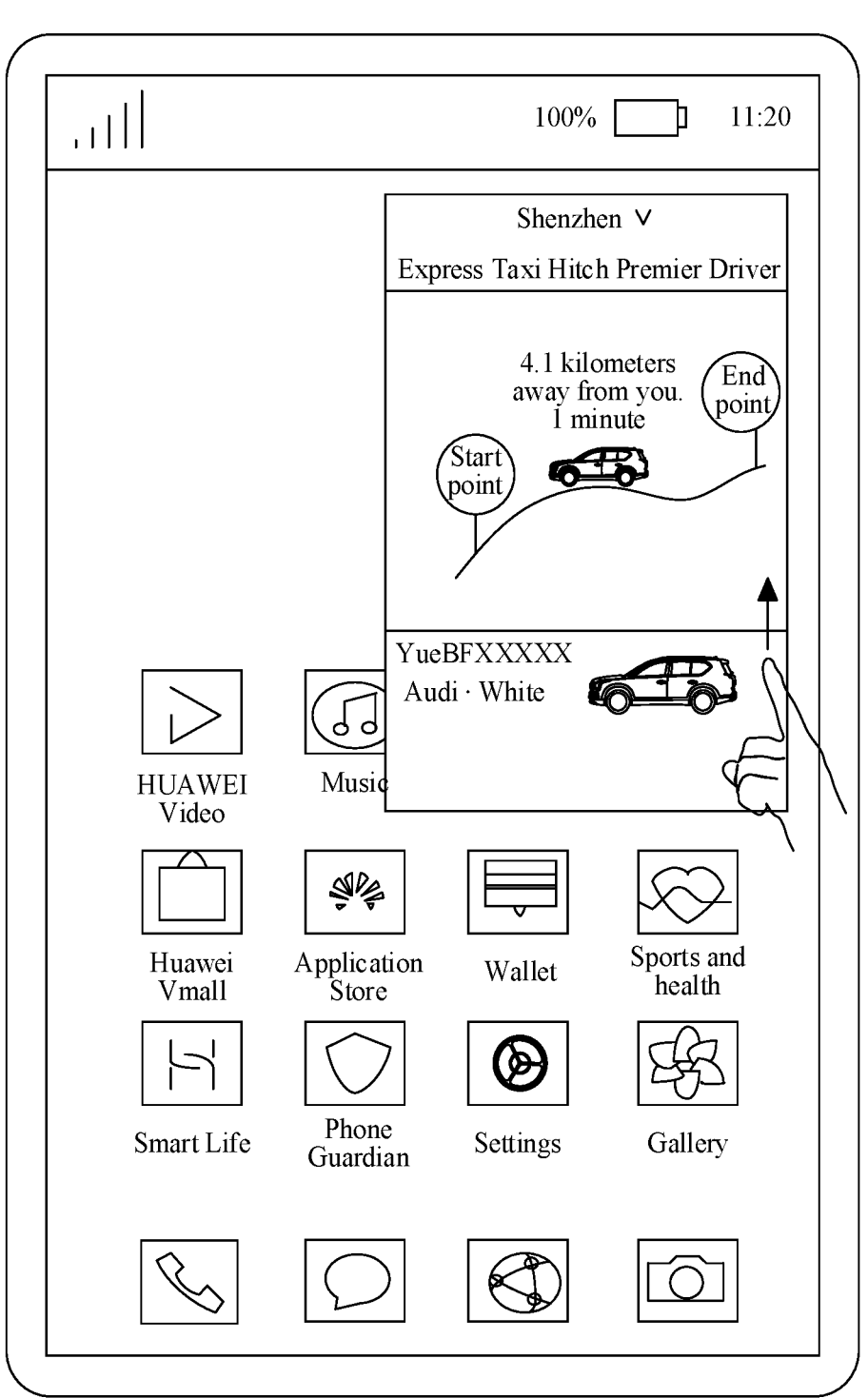

When using the taxi hailing software in full screen while wanting to view a calendar, the user may perform an operation on the display window, for example, push the display window upward from a lower right corner of the display window, as shown in FIG. 22A. Optionally, the user may further push the display window upward from a lower left corner of the display window. Optionally, the user may further push the display window downward from an upper right corner of the display window, or push the display window downward from an upper left corner of the display window. In response to the push operation, the display window is scaled out from edges of the window to the center of the window, as shown in FIG. 22B. The display window may change with the push operation, that is, is animated with a hand, so that a size of the display window is less than a size of the screen, and is greater than the foregoing preset size, for example, a size of a 2×2 desktop grid. In this case, the finger is directly released, and the display window becomes a floating window, that is, it is switched to the floating mode, as shown in FIG. 22C. Optionally, a size of the floating window may be the same as a size of the display window when the finger leaves the screen. Optionally, a size of the floating window may be different from a size of the display window when the finger leaves the screen. For example, the size of the floating window is a default size of the system.

Figure 22D:
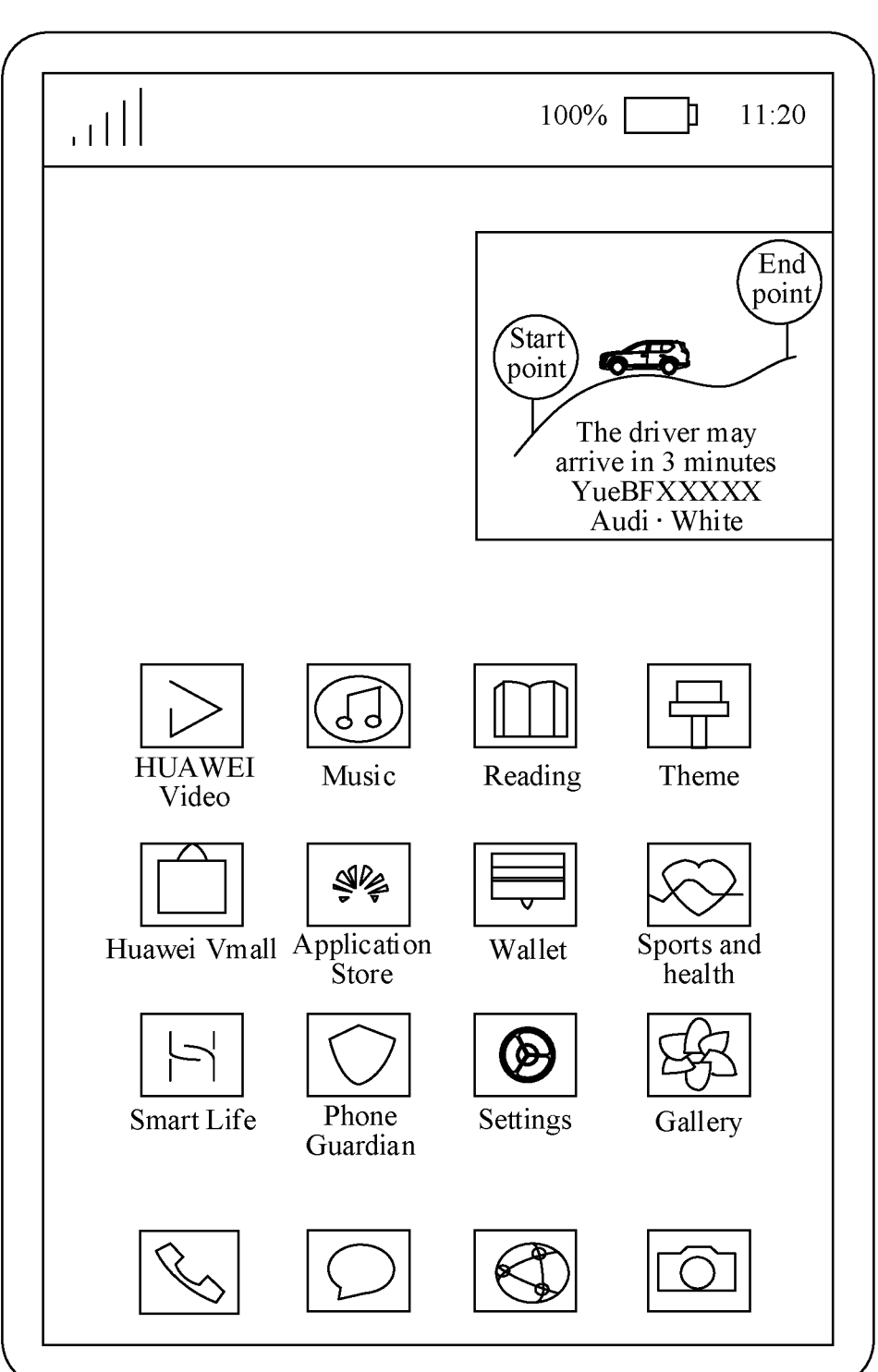

The user may further continue to perform an operation on the floating window, for example, push the floating window upward from a lower right corner of the floating window, as shown in FIG. 22C. In response to the push operation, the floating window is scaled out from edges of the window to the center of the window. The floating window may change with the push operation, that is, is animated with a hand, so that a size of the floating window is less than the foregoing preset size, for example, a size of a 2×2 desktop grid. In this case, the user directly releases the finger, and the floating window becomes the floating card. As shown in FIG. 22D, the taxi hailing software switches from the window mode to the card mode.

Optionally, the user may start to view a calendar by tapping an icon of a calendar application on the home screen, and information in the taxi hailing software does not block viewing of the calendar. It may be understood that, when the taxi hailing software switches from the full-screen mode to the window mode, the user may further tap the icon of the calendar application on the home screen to start to view the calendar, and continue to perform the foregoing switching of the display mode of the taxi hailing software.

Optionally, the user may want to better view the calendar, and expects that content in an interface of the calendar is not blocked. In this case, the floating card needs to be hidden. For example, the user may further continue to perform an operation on the floating card in FIG. 22A, for example, push the floating card upward from a lower right corner of the floating card. In response to the push operation, the floating card continues to scale out. In this case, the user directly releases the finger, the floating card is hidden, a floating ball is displayed, and the taxi hailing software switches from the card mode to the floating ball mode.

Optionally, in a pushing-upward process, if the finger of the user does not leave the screen, and the finger returns to an initial position before the pushing, the taxi hailing software remains in the original mode. For example, in the full-screen mode, in a pushing-upward process, if the finger of the user does not leave the screen, the finger pushes downward, and the finger returns to an initial position before the pushing, for example, a position shown in FIG. 22A, the taxi hailing software remains in the full-screen mode.

Optionally, in a pushing-upward process, if the finger of the user does not leave the screen, and a size of a range within which the finger moves in the pushing process falls within a range of a corresponding display mode, the taxi hailing software remains in the original mode. For example, in the window mode, in a pushing-upward process, if the finger of the user does not leave the screen, and the finger pushes downward to cause a size of the display window to be less than a size of the screen and greater than the foregoing preset size, the taxi hailing software remains in the window mode.

Optionally, in response to the operation on the display window shown in FIG. 22A, when a size of the display window is less than a size of the screen and is greater than the preset size, the finger is directly released, and the taxi hailing software may directly switch from the full-screen mode to either of the card mode and the floating ball mode. Optionally, in response to the operation on the floating window, when a size of the floating window is less than the preset size, the taxi hailing software may directly switch from the foregoing window mode to the floating ball mode.

Optionally, the user may further perform a pull-down operation. In response to the pull-down operation, the taxi hailing software switches the display mode. For example, the user may further perform a pull-down operation on the floating card. In response to the pull-down operation, the floating card is scaled in toward edges of the screen. The floating card may change with the pull-down operation, that is, is animated with a hand, so that a size of the floating card is greater than the foregoing preset size, for example, a size of a 2×2 desktop grid. In this case, the user directly releases the finger, the floating card becomes the foregoing floating window, and the taxi hailing software switches from the card mode to the window mode. It may be understood that, when a pull-down operation is performed, the taxi hailing software may not only switch from the card mode to the window mode, but also may switch from the card mode to the full-screen mode, from the window mode to the full-screen mode, or from the floating ball mode to any one of the full-screen mode, the window mode, and the card mode.

Figure 23A:
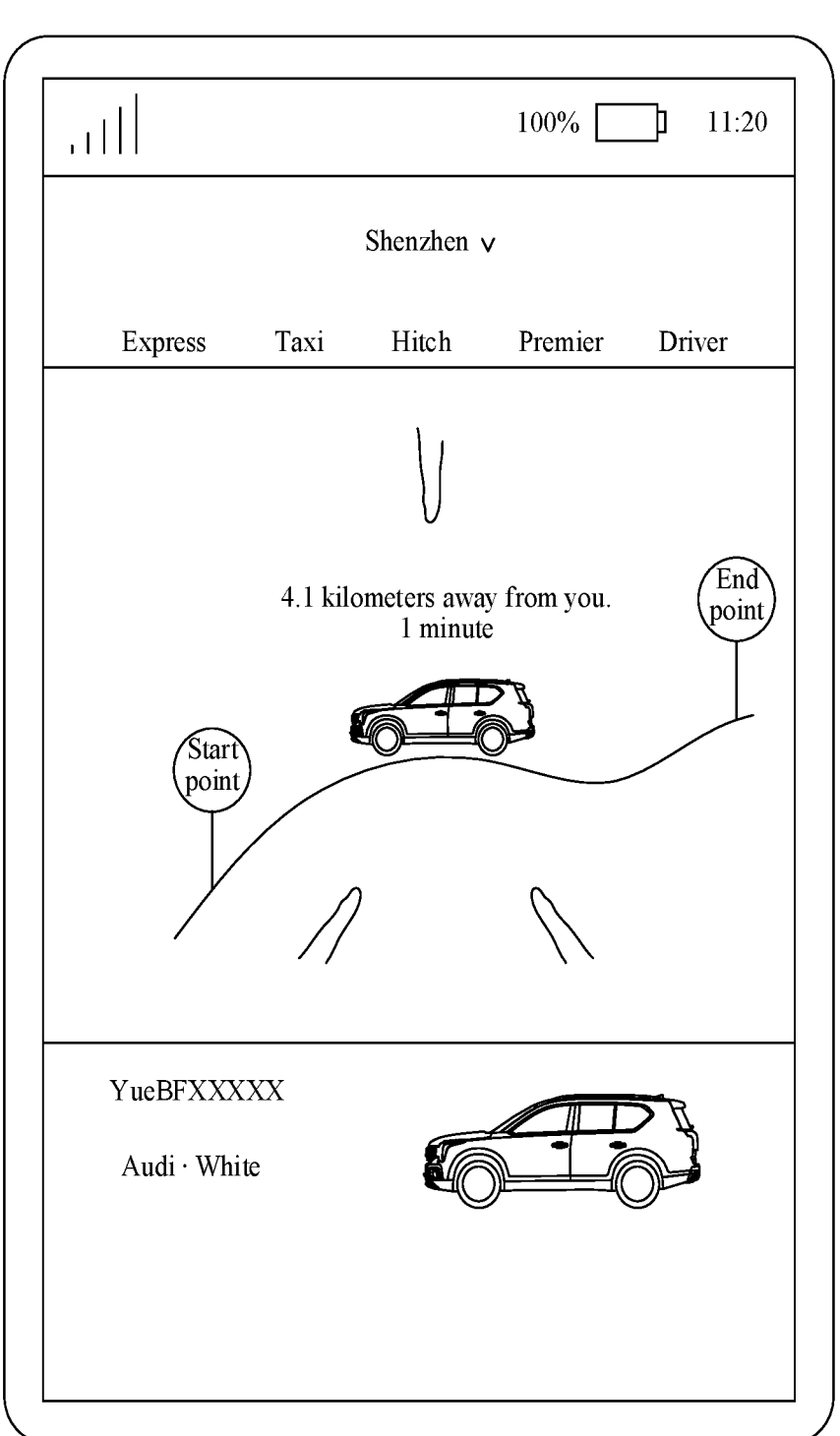
FIG. 23A, FIG. 23B, FIG. 23C, and FIG. 23D are schematic diagrams of some application interfaces according to an embodiment of this disclosure.

A display method in Embodiment 5 of this disclosure is described below by using an example in which a user is using taxi hailing software in full screen, as shown in FIG. 23A. In FIG. 23A, the using taxi hailing software in full screen means that a status bar is also displayed when a display window is displayed on a desktop. A user interface of the taxi hailing software is displayed in the display window. The display window occupies most of the desktop. The status bar may include signal strength, time, current remaining power, and the like. It should be understood that the status bar may display more or less information than that shown in the figure. For example, the status bar may further include a name of an operator (for example, China Mobile), a WI-FI icon, BLUETOOTH, an alarm clock, and the like. This is not limited in this disclosure. Optionally, a floating shortcut menu (for example, Assistive Touch of APPLE) and the like may be further displayed on the desktop. Optionally, the using taxi hailing software in full screen may further mean that the display window is maximized to fill up the entire desktop, and the entire desktop does not display other content. A user interface of the taxi hailing software is displayed in the display window. Optionally, the using taxi hailing software in full screen may alternatively occupy only a part of a display region of a screen. For example, when the screen is an anisotropic cutting screen (notch screen), a middle part of the anisotropic cutting screen displays the user interface of the taxi hailing software, and one side edge part or two side edge parts of the anisotropic cutting screen are off.

Figure 23B:
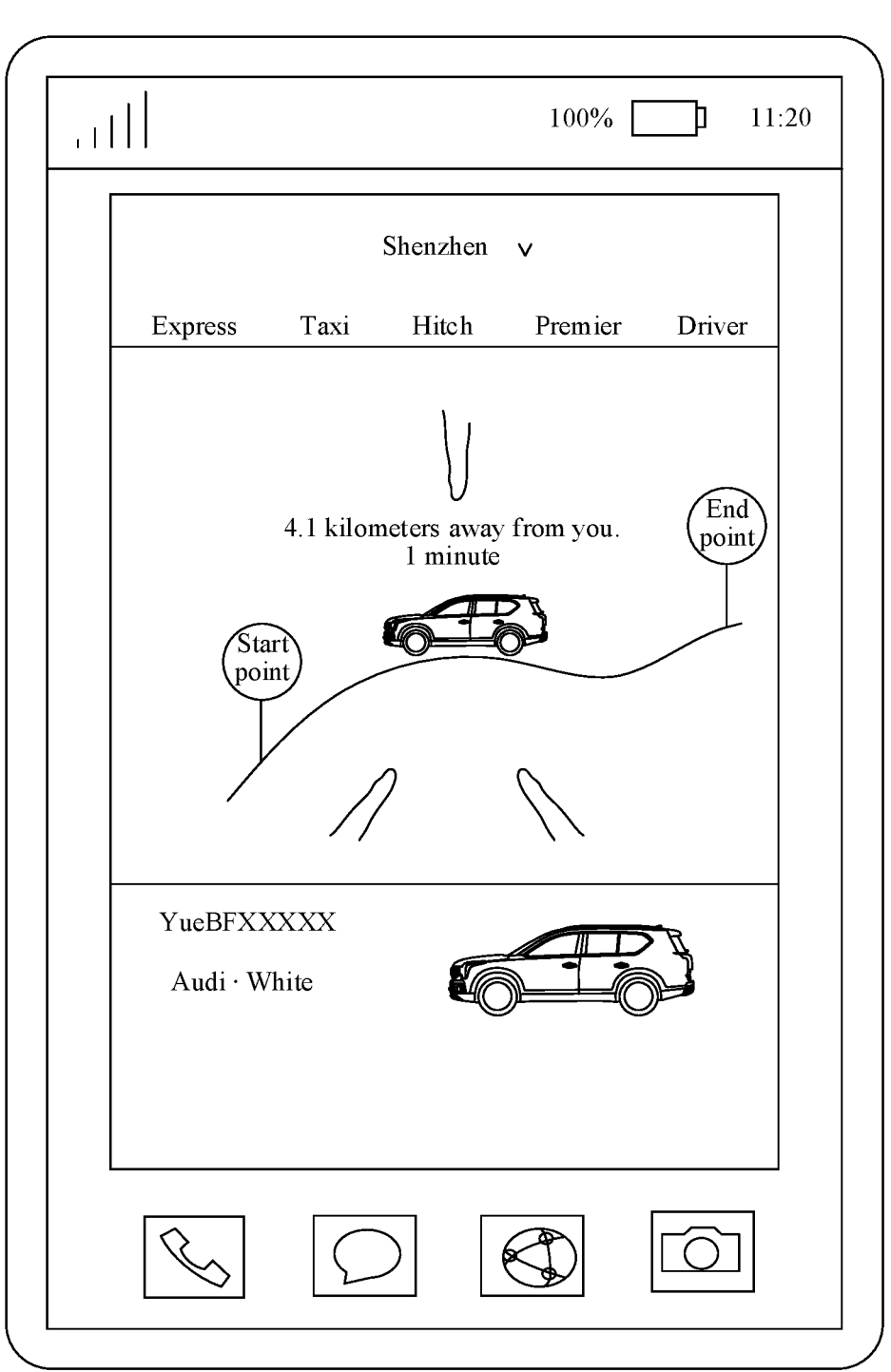
Figure 23C:
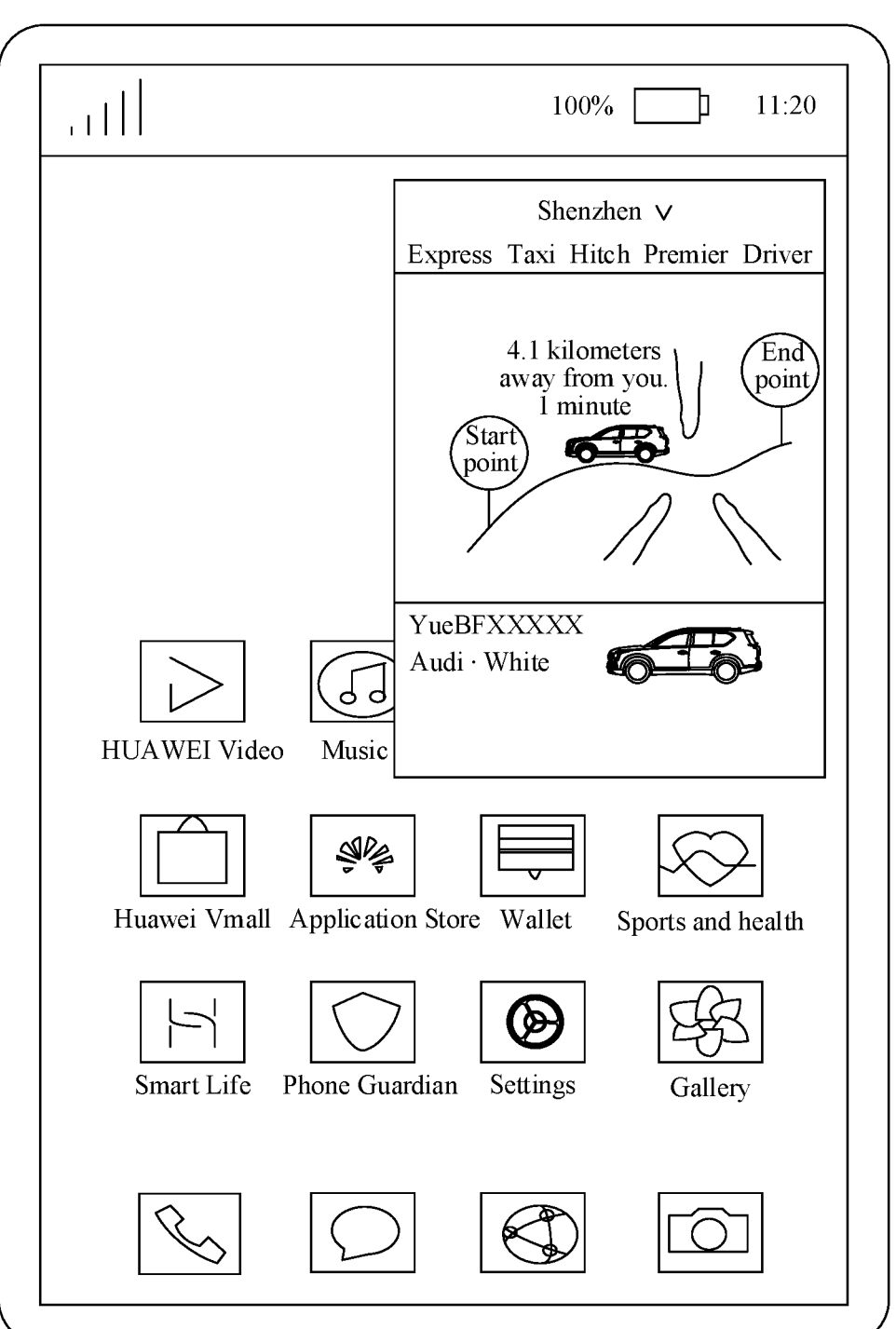

When using the taxi hailing software in full screen while wanting to view a calendar, the user may perform an operation on the display window, for example, perform a multi-finger pinch operation on the display window with a plurality of fingers, as shown in FIG. 23A. The plurality of fingers may be fingers that touch the screen, or may be fingers that perform an air operation. Optionally, the plurality of fingers are three or more fingers. Optionally, the plurality of fingers are two or more fingers. The plurality of fingers may be a plurality of fingers of a same hand, or may be a plurality of fingers of different hands. In response to the pinch operation, the display window is scaled out from edges of the window to the center of the window, as shown in FIG. 23B. The display window may change with the pinch operation, that is, is animated with a hand, so that a size of the display window is less than a size of the screen, and is greater than the foregoing preset size, for example, a size of a 2×2 desktop grid. In this case, the finger is directly released, and the display window becomes a floating window, that is, it is switched to the floating mode, as shown in FIG. 23C. Optionally, a size of the floating window may be the same as a size of the display window when the finger leaves the screen. Optionally, a size of the floating window may be different from a size of the display window when the finger leaves the screen. For example, the size of the floating window is a default size of the system.

Figure 23D:
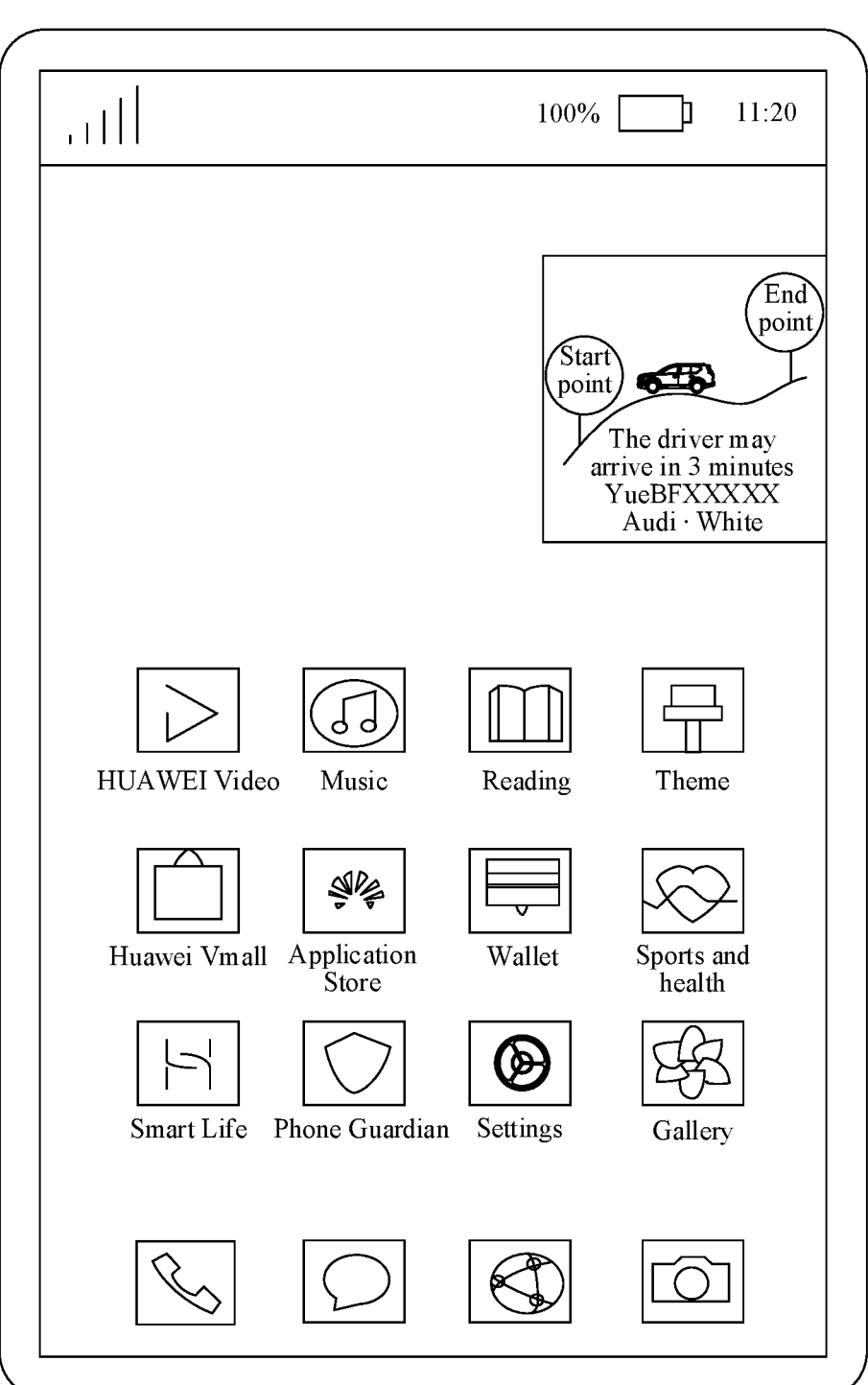

The user may further continue to perform an operation on the floating window, for example, perform a multi-finger pinch operation on the floating window, as shown in FIG. 23C. In response to the pinch operation, the floating window is scaled out from edges of the window to the center of the window. The floating window may change with the pinch operation, that is, is animated with a hand, so that a size of the floating window is less than the foregoing preset size, for example, a size of a 2×2 desktop grid. In this case, the user directly releases the finger, and the floating window becomes the floating card. As shown in FIG. 23D, the taxi hailing software switches from the window mode to the card mode.

Optionally, the user may start to view a calendar by tapping an icon of a calendar application on the home screen, and information in the taxi hailing software does not block viewing of the calendar. It may be understood that, when the taxi hailing software switches from the full-screen mode to the window mode, the user may further tap the icon of the calendar application on the home screen to start to view the calendar, and continue to perform the foregoing switching of the display mode of the taxi hailing software.

Optionally, the user may want to better view the calendar, and expects that content in an interface of the calendar is not blocked. In this case, the floating card needs to be hidden. For example, the user may further continue to perform an operation on the floating card, for example, perform a multi-finger pinch operation on the floating card with a plurality of fingers. In response to the pinch operation, the floating card continues to scale out. In this case, the user directly releases the fingers, the floating card is hidden, a floating ball is displayed, and the taxi hailing software switches from the card mode to the floating ball mode.

Optionally, in a pinching process, if the fingers of the user do not leave the screen, and the fingers return to initial positions before the pushing, the taxi hailing software remains in the original mode. For example, in the full-screen mode, in a process of performing a multi-finger pinch operation with a plurality of fingers, if the fingers of the user do not leave the screen, the fingers spread to cause the finger to return initial positions before the pushing, for example, positions shown in FIG. 23A, the taxi hailing software remains in the full-screen mode.

Optionally, in a pinching process, if the fingers of the user do not leave the screen, and a size of a range in which the fingers move in a pinching and spreading process falls within a range of a corresponding display mode, the taxi hailing software remains in the original mode. For example, in the window mode, in a pinching process, if the fingers of the user do not leave the screen, and the fingers spread to cause a size of the display window to be less than a size of the screen and greater than the foregoing preset size, the taxi hailing software remains in the window mode.

Optionally, in response to the operation on the display window shown in FIG. 23A, when a size of the display window is less than a size of the screen and is greater than the preset size, the finger is directly released, and the taxi hailing software may directly switch from the full-screen mode to either of the card mode and the floating ball mode. Optionally, in response to the operation on the floating window, when a size of the floating window is less than the preset size, the taxi hailing software may directly switch from the foregoing window mode to the floating ball mode.

Optionally, the user may further perform a multi-finger spread operation with a plurality of fingers. In response to the spread operation, the taxi hailing software switches the display mode. For example, the user may further perform a multi-finger spread operation on the floating card with a plurality of fingers. In response to the spread operation, the floating card is scaled in toward edges of the screen. The floating card may change with the spread operation, that is, is animated with a hand, so that a size of the floating card is greater than the foregoing preset size, for example, a size of a 2×2 desktop grid. In this case, the user directly releases the fingers, the floating card becomes the foregoing floating window, and the taxi hailing software switches from the card mode to the window mode. It may be understood that, when a multi-finger spread operation is performed, the taxi hailing software may not only switch from the card mode to the window mode, but also may switch from the card mode to the full-screen mode, from the window mode to the full-screen mode, or from the floating ball mode to any one of the full-screen mode, the window mode, and the card mode.

Figure 24A:
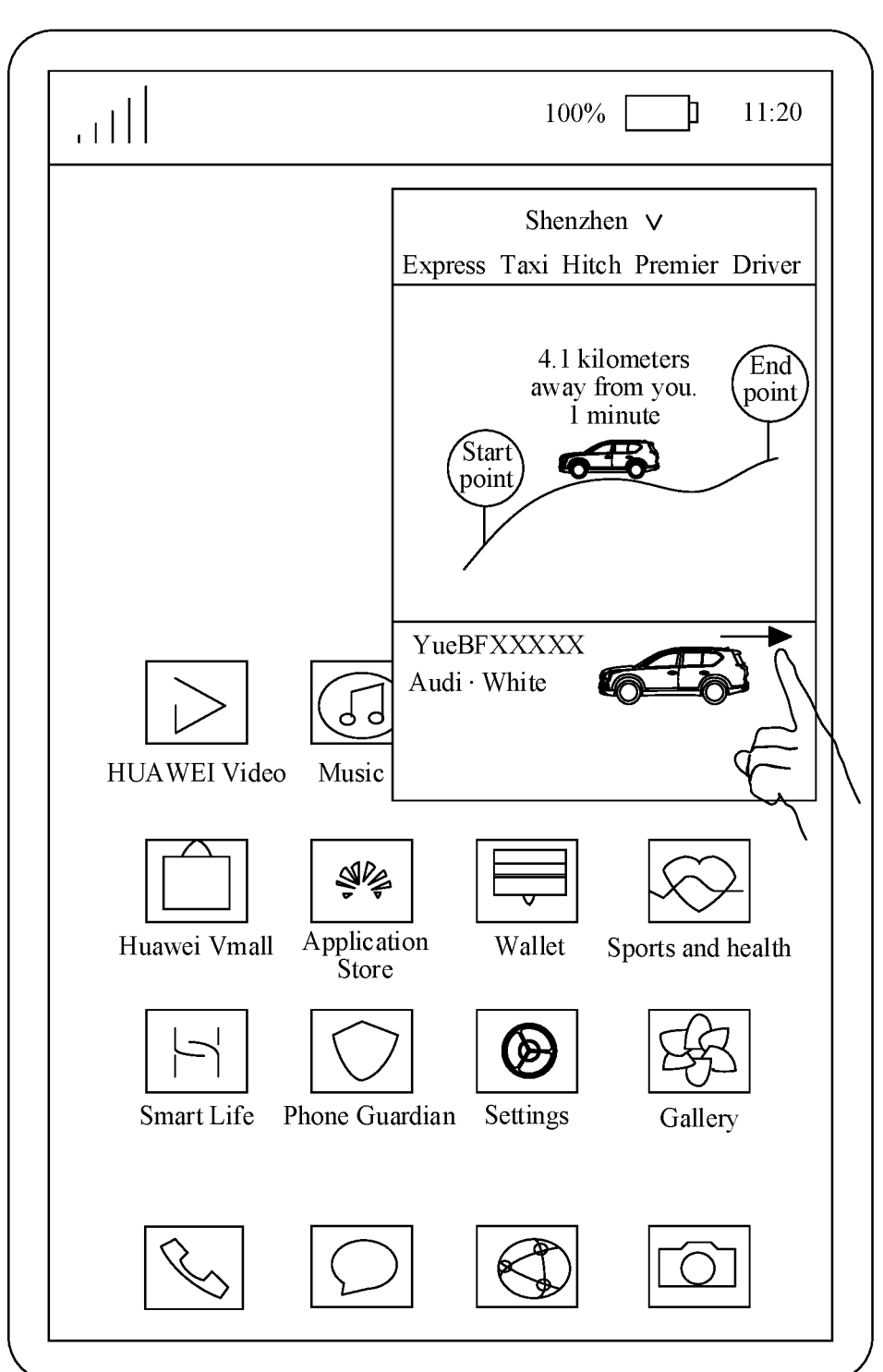
FIG. 24A, FIG. 24B, FIG. 24C, and FIG. 24D are schematic diagrams of some application interfaces according to an embodiment of this disclosure.
Figure 24B:
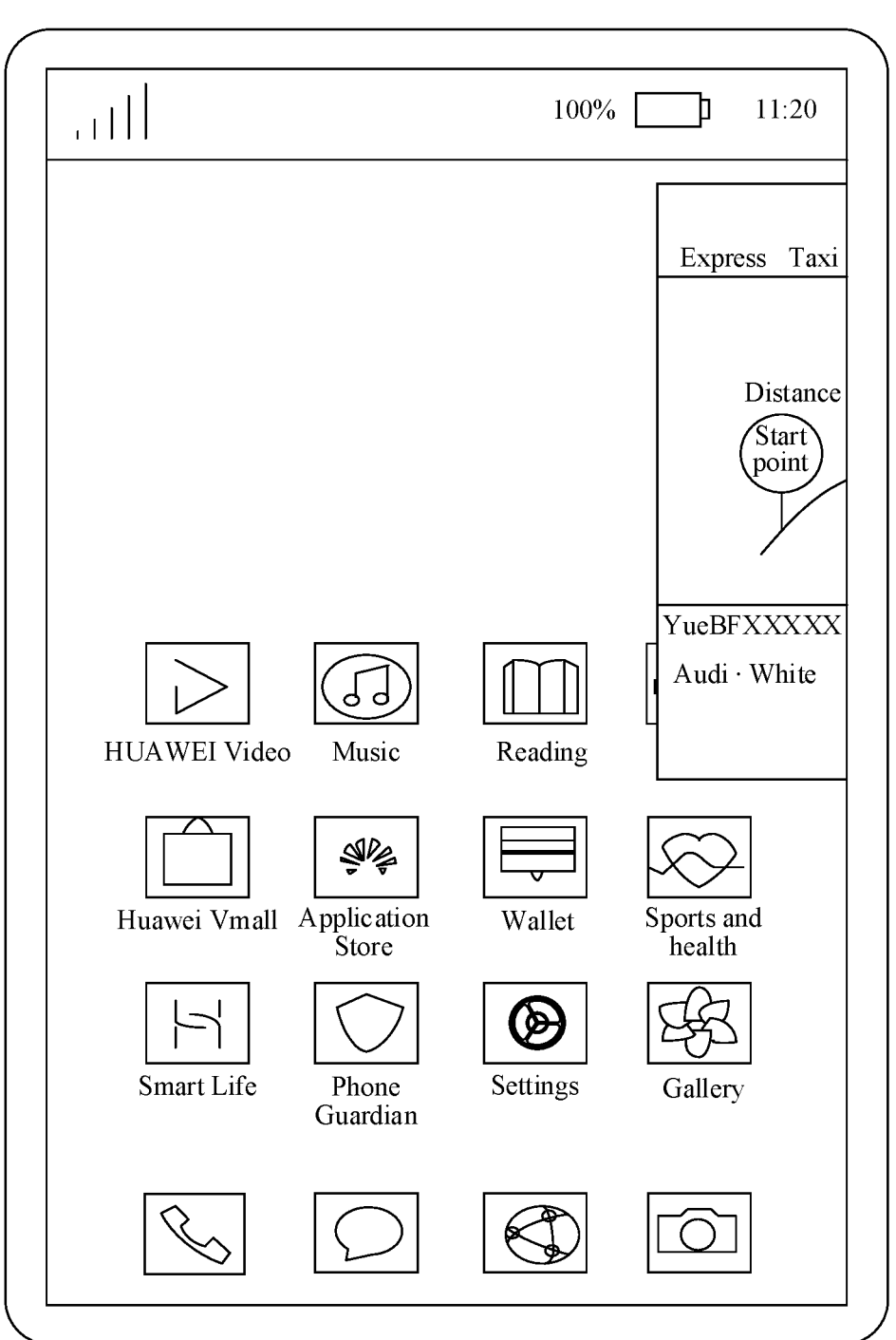
Figure 24C:
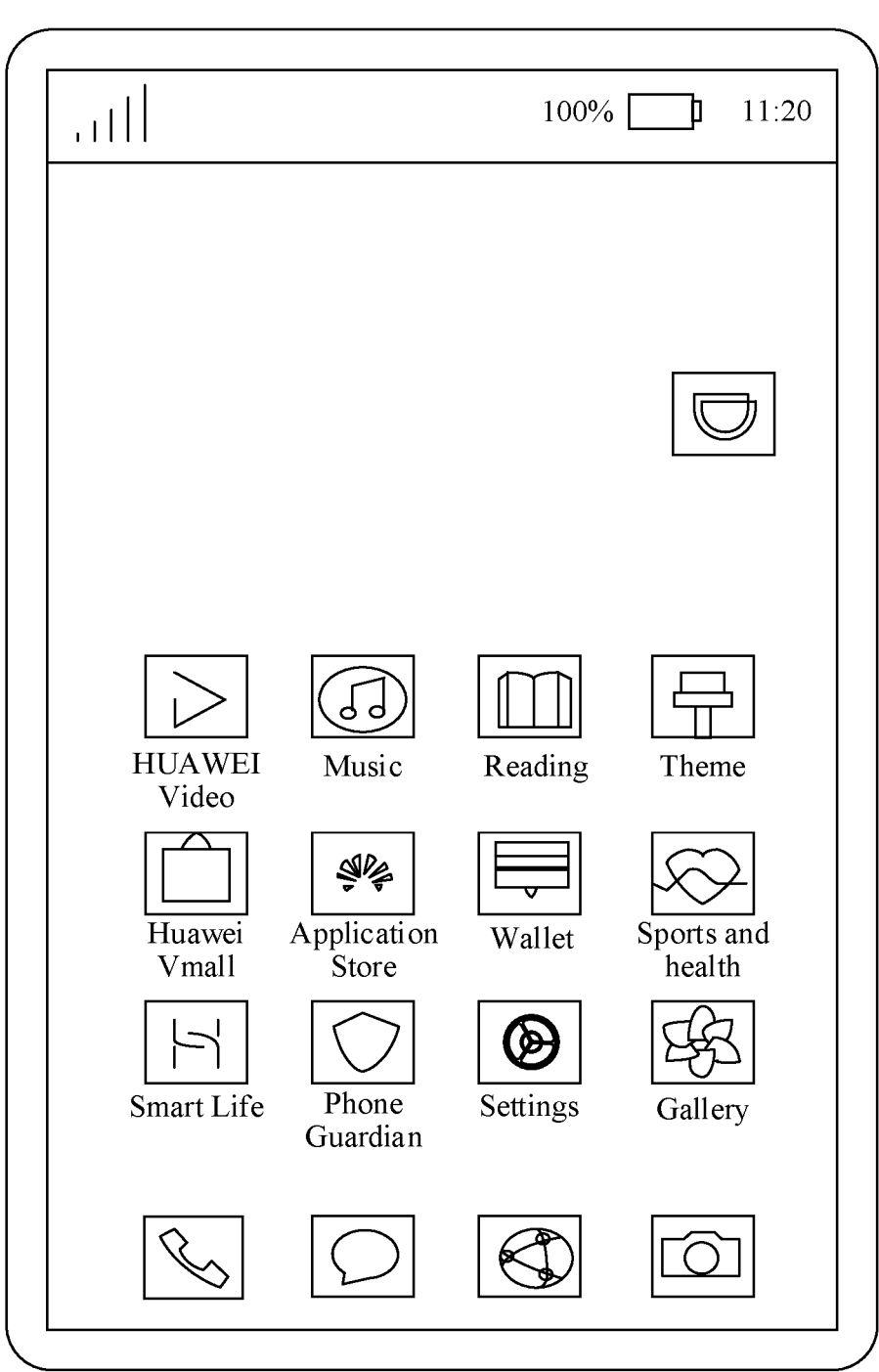

A display method in Embodiment 6 of this disclosure is described below by using an example in which a user is using taxi hailing software in a window mode, as shown in FIG. 24A. In FIG. 24A, the using taxi hailing software in a window mode means that a floating window is displayed on a desktop, and a user interface of the taxi hailing software is displayed in the floating window. A size of the floating window on the screen is smaller than a size of a display window on the screen. After viewing information in the taxi hailing software, the user may expect the information in the taxi hailing software does not block a to-be-viewed calendar. In this case, the floating window of the taxi hailing software needs to be hidden. For example, as shown in FIG. 24A, the user may drag the floating window to move along a preset direction, for example, move to a left edge of the screen or move to a right edge of the screen. In response to the drag operation, when the floating window moves to an edge of the screen, the floating window is displayed in a gradually exiting manner until the floating window is dragged to exit the screen by a size exceeding a preset size (for example, ½), as shown in FIG. 24B. In this case, the mobile phone may hide the floating window of the taxi hailing software, and display a floating ball of the taxi hailing software. As shown in FIG. 24C, the taxi hailing software switches from a window mode to a floating ball mode. An icon of the taxi hailing software, a name of the taxi hailing software, or an icon and a name of the taxi hailing software are displayed in a floating ball of the taxi hailing software. In this case, the user may start to view a calendar by tapping an icon of a calendar application on a home screen, and information in the taxi hailing software does not block viewing of the calendar.

Figure 24D:
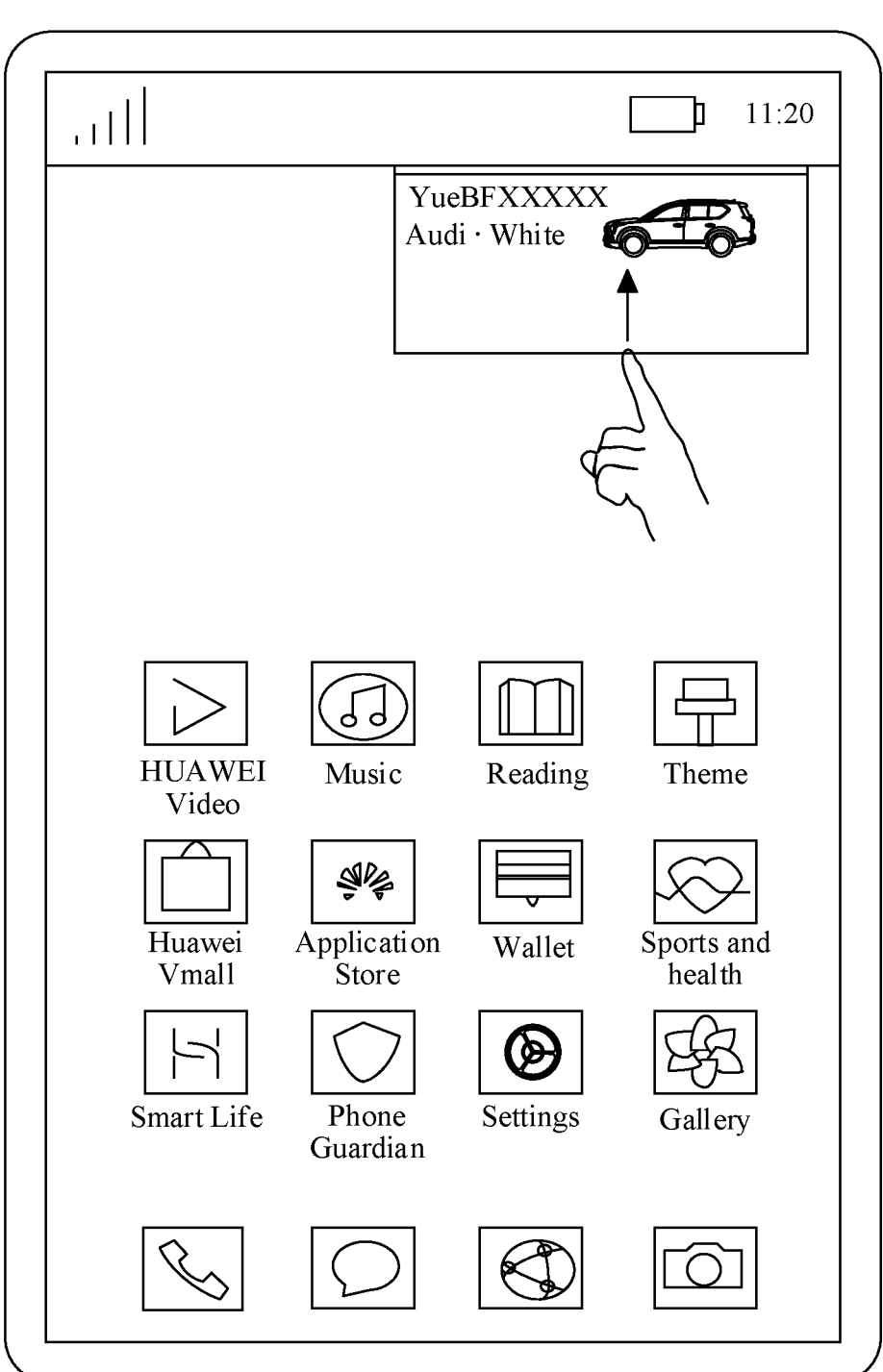

Optionally, as shown in FIG. 24A, the taxi hailing software is in a window mode. After viewing information in the taxi hailing software, the user may expect the information in the taxi hailing software does not block a to-be-viewed calendar. In this case, the floating window of the taxi hailing software needs to be hidden. The hiding the floating window of the taxi hailing software means that the floating window of the taxi hailing software is completely hidden from a current interface and disappears instead of switching the floating window of the taxi hailing software to another mode. For example, as shown in FIG. 24A, the user may flick the floating window to move along a preset direction, for example, move quickly toward an upper edge of the screen. Optionally, the floating window is flicked to move quickly toward a lower edge of the screen. In response to the flick operation, when the floating window moves to an edge of the screen, the floating window is displayed in a gradually exiting manner until the floating window is flicked to exit the screen by a size exceeding a preset size (for example, ½), as shown in FIG. 24D. In this case, the mobile phone may hide the floating window of the taxi hailing software. In this case, the user may start to view a calendar by tapping an icon of a calendar application on a home screen, and information in the taxi hailing software does not block viewing of the calendar.

Optionally, the floating window of the taxi hailing software may include a title bar. The title bar may include buttons such as "Minimize" and "Delete". The user may click a "Minimize" button on the title bar of the floating window to hide the floating window of the taxi hailing software. In addition, a floating ball of the taxi hailing software is displayed, and the taxi hailing software switches from the window mode to a floating ball mode. The user may alternatively click a "Delete" button on the title bar of the floating window to hide the floating window of the taxi hailing software.

Figure 25A:
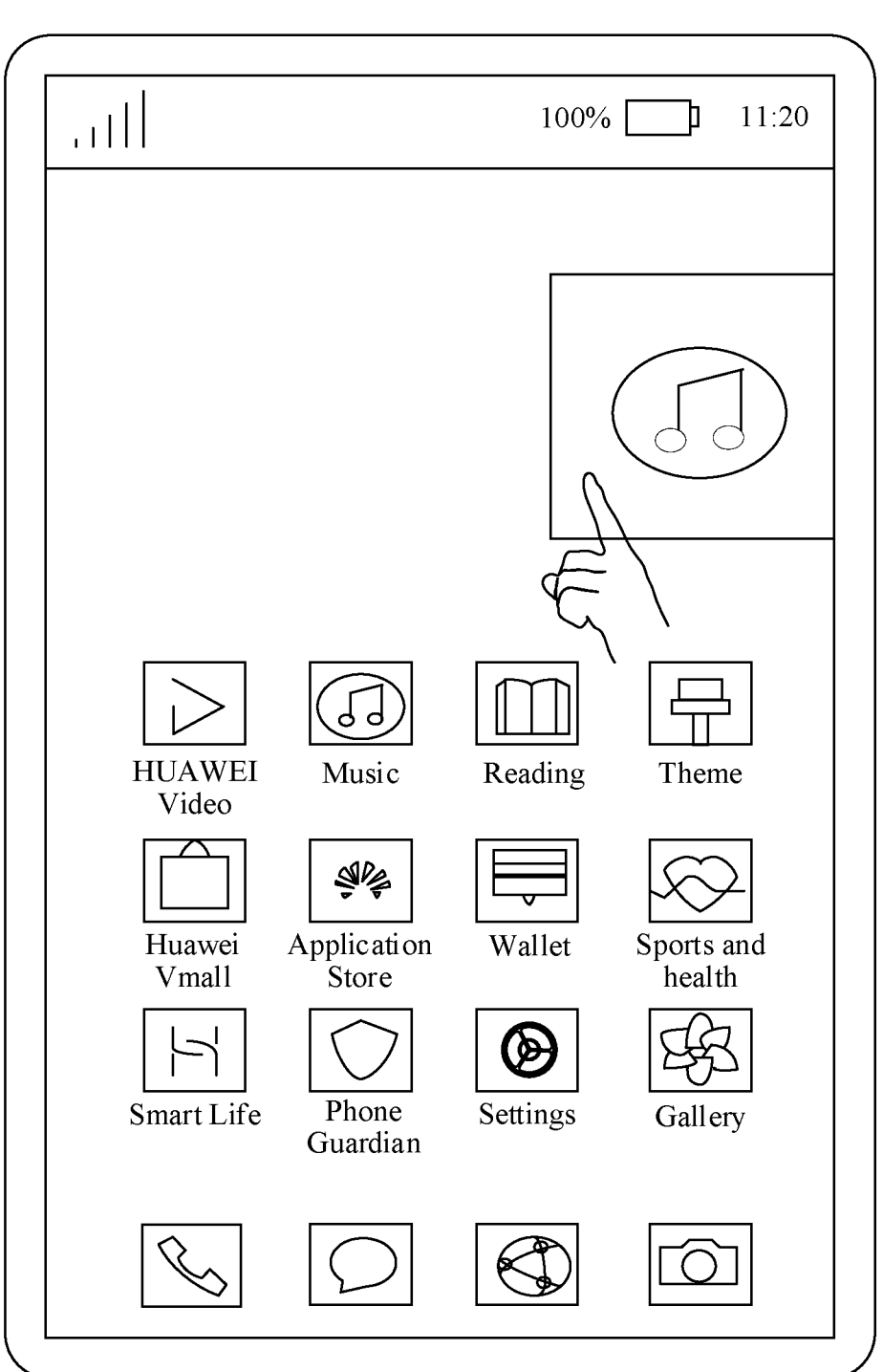
FIG. 25A and FIG. 25B are schematic diagrams of some application interfaces according to an embodiment of this disclosure.
Figure 25B:
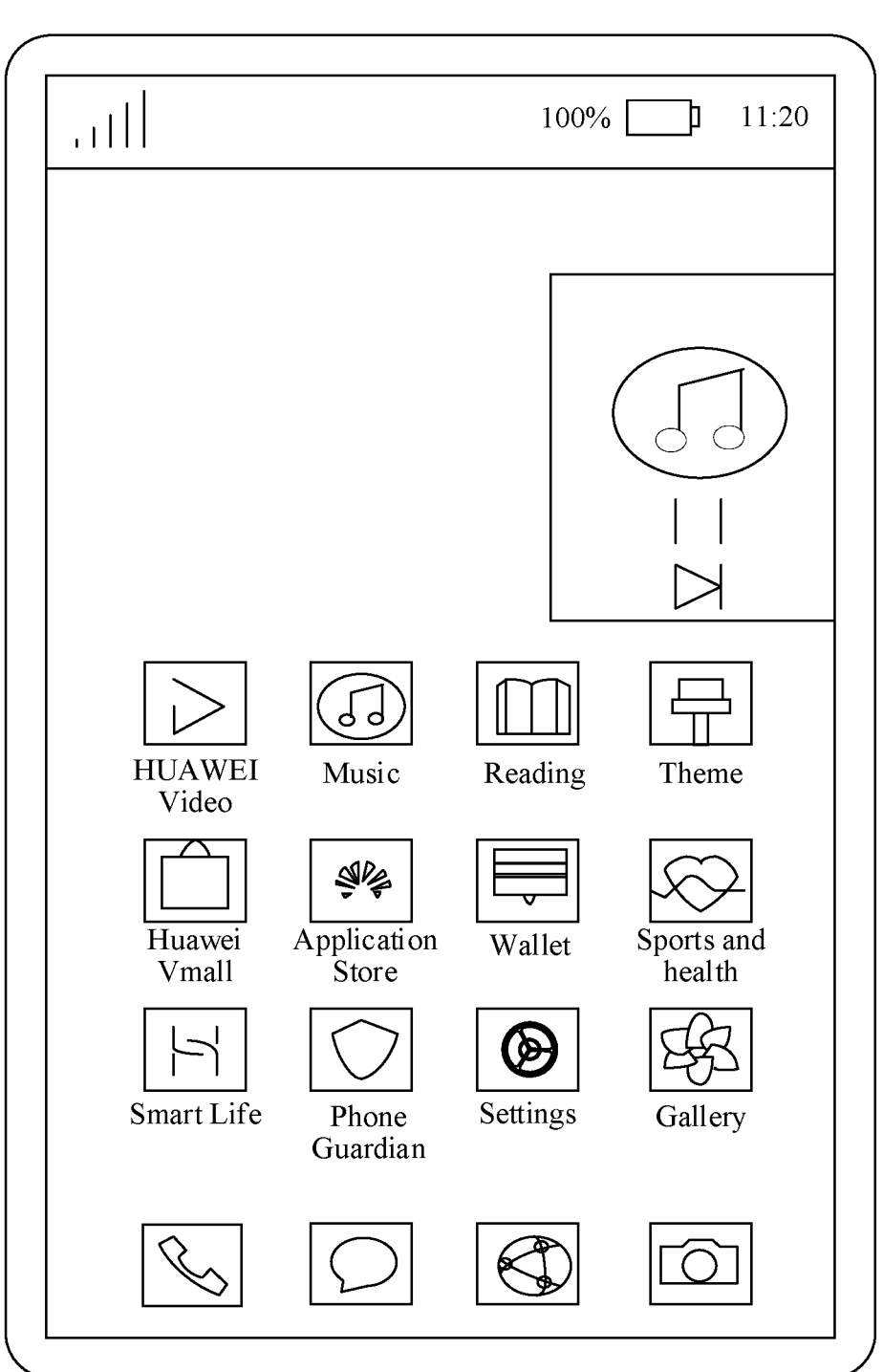

In Embodiment 7 of this disclosure, another specific application scenario is used as an example to describe a display method in this disclosure. In a specific application scenario, a user is using music software in a card mode, as shown in FIG. 25A. In FIG. 25A, the using music software in a card mode means that a floating card is displayed on a desktop, and key information in a user interface of the music software, for example, a music identifier, is displayed in the floating card. When viewing the information in the music software, the user may consider that the information in the music software in the floating card is very simple, and expect that more information in the music software can be provided without switching a display mode or occupying a large area of the desktop. In this case, the music software may be switched between different sizes of the floating card. For example, the user may touch and hold the floating card, as shown in FIG. 25A. In response to the touch and hold operation, the mobile phone scales in the floating card from a first size to a second size, and displays, in the floating card of the second size, key information corresponding to a size of the floating card of the second size, that is, simultaneously displays a music identifier and a music control button, as shown in FIG. 25B. The music control button may include a music pause button and a music start button. A larger size of the floating card indicates a larger data volume of key information displayed in the floating card, that is, more detailed key information displayed in the floating card. Optionally, the operation for scaling in the floating card may also be spreading a plurality of fingers, or the like.

Optionally, a correspondence between a size of the floating card and to-be-displayed key information is preset in the mobile phone. For example, when the size of the floating card is a first size, the to-be-displayed key information is a music identifier, or when the size of the floating card is a second size, the to-be-displayed key information is a music identifier and a music control button.

Optionally, a correspondence between a size of the floating card, to-be-displayed key information, and a layout format is preset in the mobile phone. For example, when the size of the floating card is a first size, the to-be-displayed key information is a music identifier, or when the size of the floating card is a second size, the to-be-displayed key information is a music identifier and a music control button, and the layout format is that the music identifier and the music control button are arranged in one column.

Optionally, the size of the floating card may alternatively be three or more sizes. For example, the size of the floating card may be a first size, a second size, and a third size. The size of the floating card may be directly enlarged from the first size to the third size, or may be directly enlarged from the second size to the third size. For different sizes of the floating card, to-be-displayed key information is also different.

Optionally, the mobile phone displays a floating menu in response to a touch and hold operation. The floating menu provides sizes for the user to select, for example, provides a first size, a second size, and a third size for the user to select. In response to a selection operation performed by the user, the mobile phone switches a size of the floating card. For different sizes of the floating card, to-be-displayed key information is also different.

Optionally, the user may drag an edge of the floating card to scale in or scale out the floating card. For example, the user may drag an edge of the floating card to slide outward, and in response to the drag operation, the floating card is scaled in toward edges of the screen, so that a size of the floating card is enlarged to a preset value or is enlarged to a preset value. The mobile phone switches the size of the floating card, for example, from the first size to the second size. The user may drag an edge of the floating card to slide inward, and in response to the drag operation, the floating card is scaled out toward the center of the screen, so that a size of the floating card is reduced to a preset value or is reduced to a preset value. The mobile phone switches the size of the floating card, for example, from the second size to the first size. For different sizes of the floating card, to-be-displayed key information is also different.

Optionally, a floating button may be displayed on the floating card. The floating button is operated by the user to adjust the size of the floating card. For example, the user may select a floating button, and in response to the selection operation, the mobile phone switches the size of the floating card, for example, from the first size to the second size. The user may further consecutively select the floating button, and in response to the consecutive selection operation, the mobile phone consecutively switches the size of the floating card, for example, from the second size to the first size.

In this disclosure, a size of the floating card is adjustable, and content displayed in the floating card changes with the size of the floating card. Therefore, more detailed content in a user interface of an application can be provided for the user, and more functions can be provided for the user. In addition, different function combinations are provided for the user based on different sizes of the floating card.

Figure 26A:
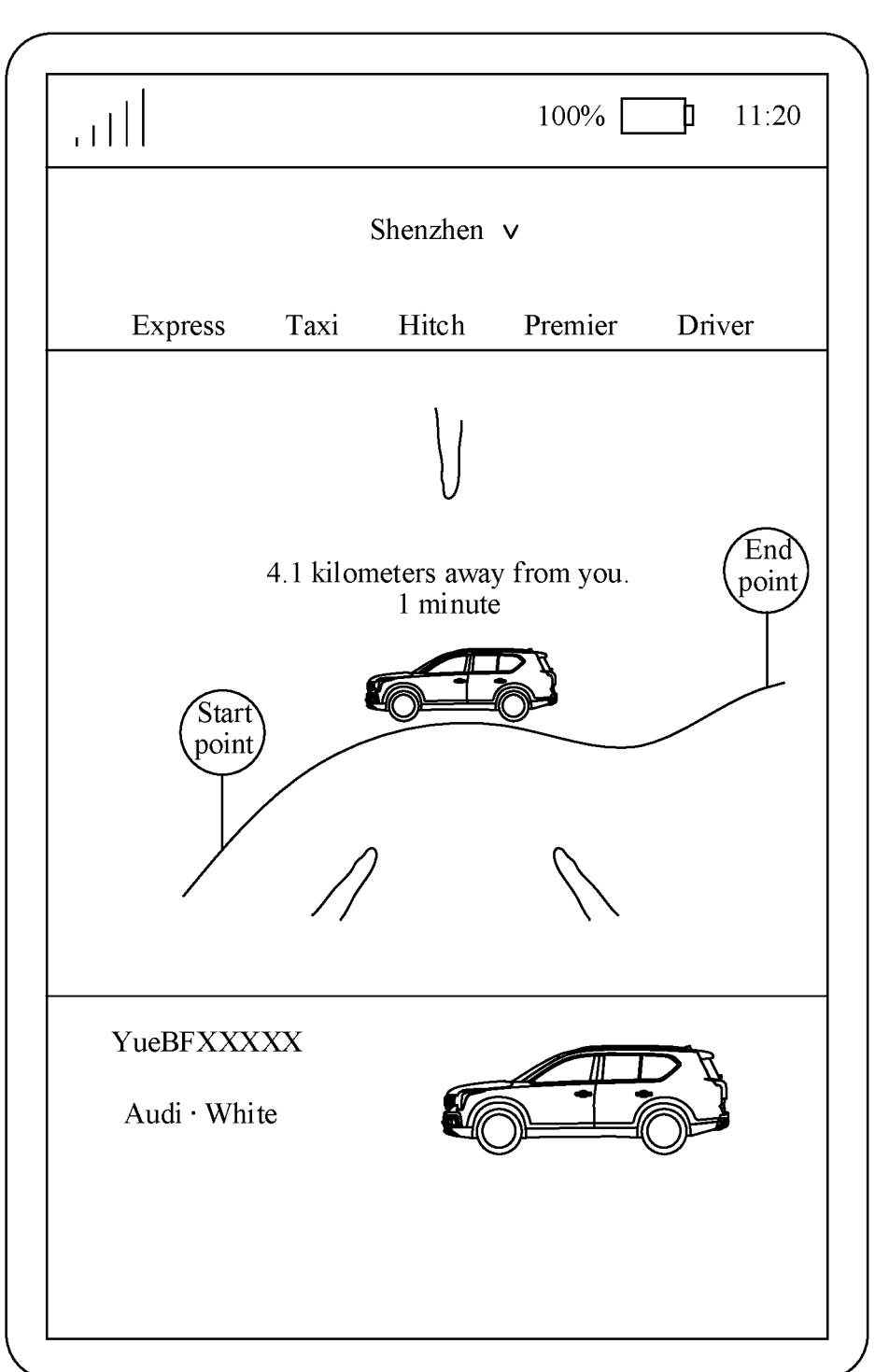
FIG. 26A, FIG. 26B, FIG. 26C, and FIG. 26D are schematic diagrams of some application interfaces according to an embodiment of this disclosure.
Figure 26B:
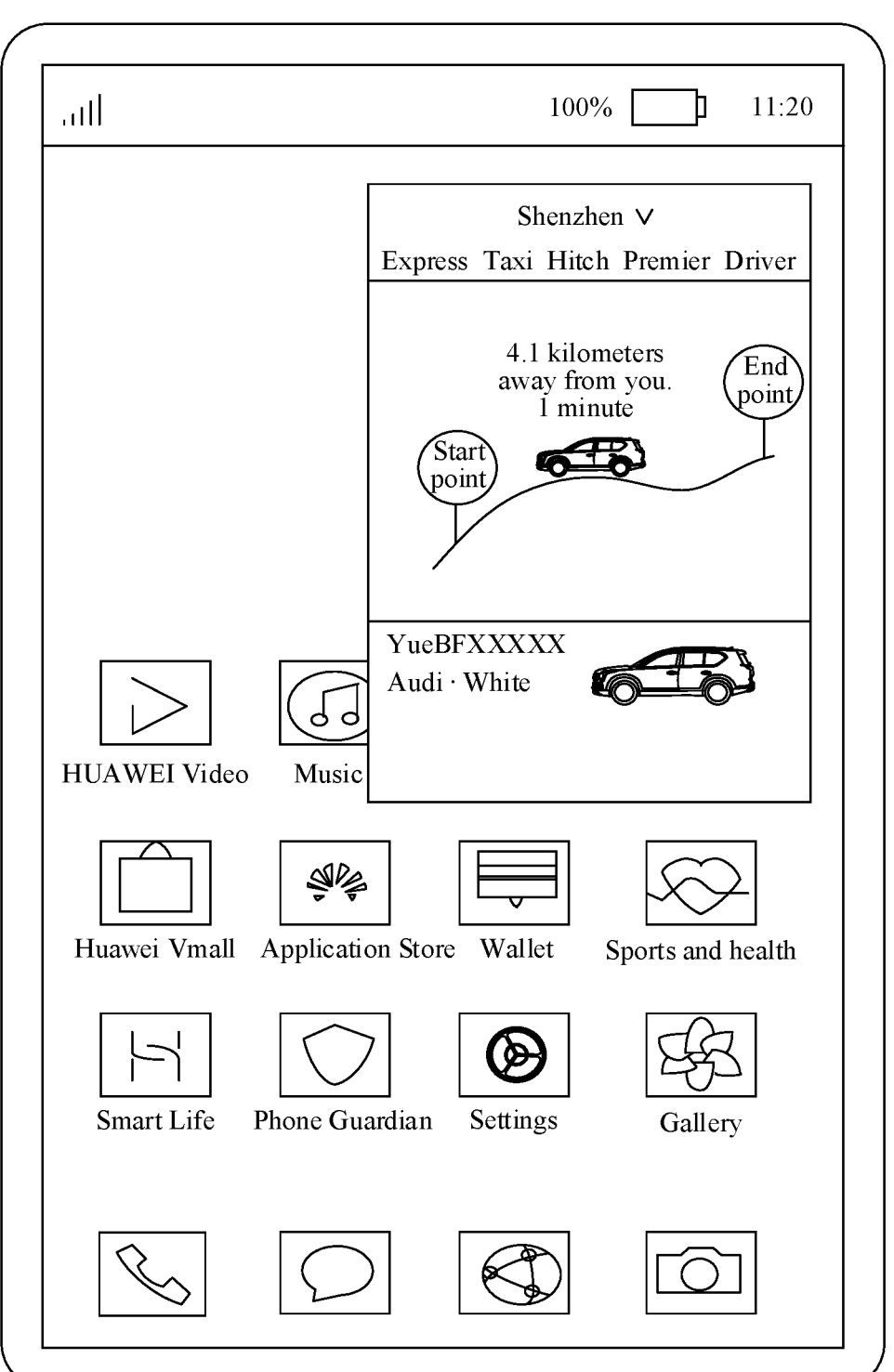

In Embodiment 8 of this disclosure, another specific application scenario is used as an example to describe a display method in this disclosure. In a specific application scenario, a user is using taxi hailing software in full screen as described above, as shown in FIG. 26A. After viewing information in the taxi hailing software on the mobile phone, the user wants to watch television (TV) at the same time, and expects that the information in the taxi hailing software does not block watching TV. In this case, the mobile phone may first switch the taxi hailing software to a window mode, and mirror a floating window of the taxi hailing software to a television. For example, the mobile phone is connected to the television in a wireless communication manner (for example, WI-FI or BLUETOOTH) or a wired communication manner (for example, an AGI connection cable, a High-Definition Multimedia Interface (HDMI) connection cable, or a Digital Visual Interface (DVI) connection cable). As shown in FIG. 23A and FIG. 23B, the user may perform a multi-finger pinch operation on the display window with a plurality of fingers. In response to the pinch operation, the display window is scaled out from edges of the window to the center of the window until a size of the display window is less than a size of the screen and is greater than a preset size. In this case, the user directly releases the fingers, and the display window becomes a floating window, that is, switches to a floating mode, as shown in FIG. 26B.

Figure 26C:
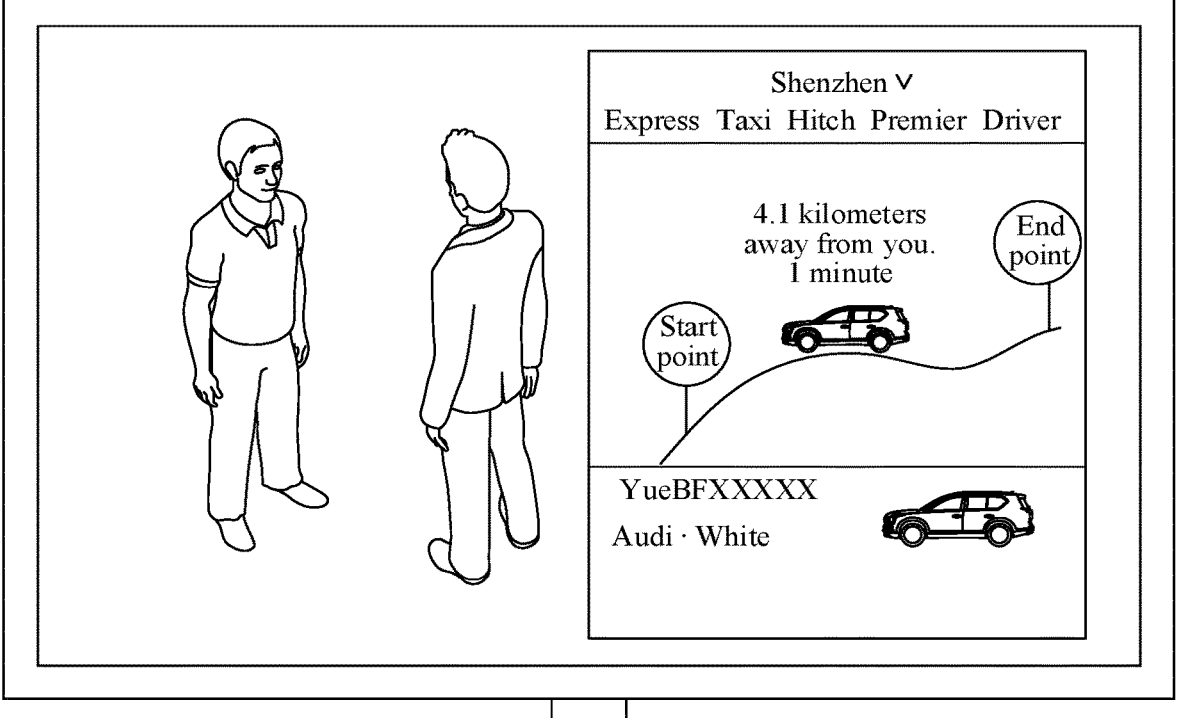
Figure 26D:
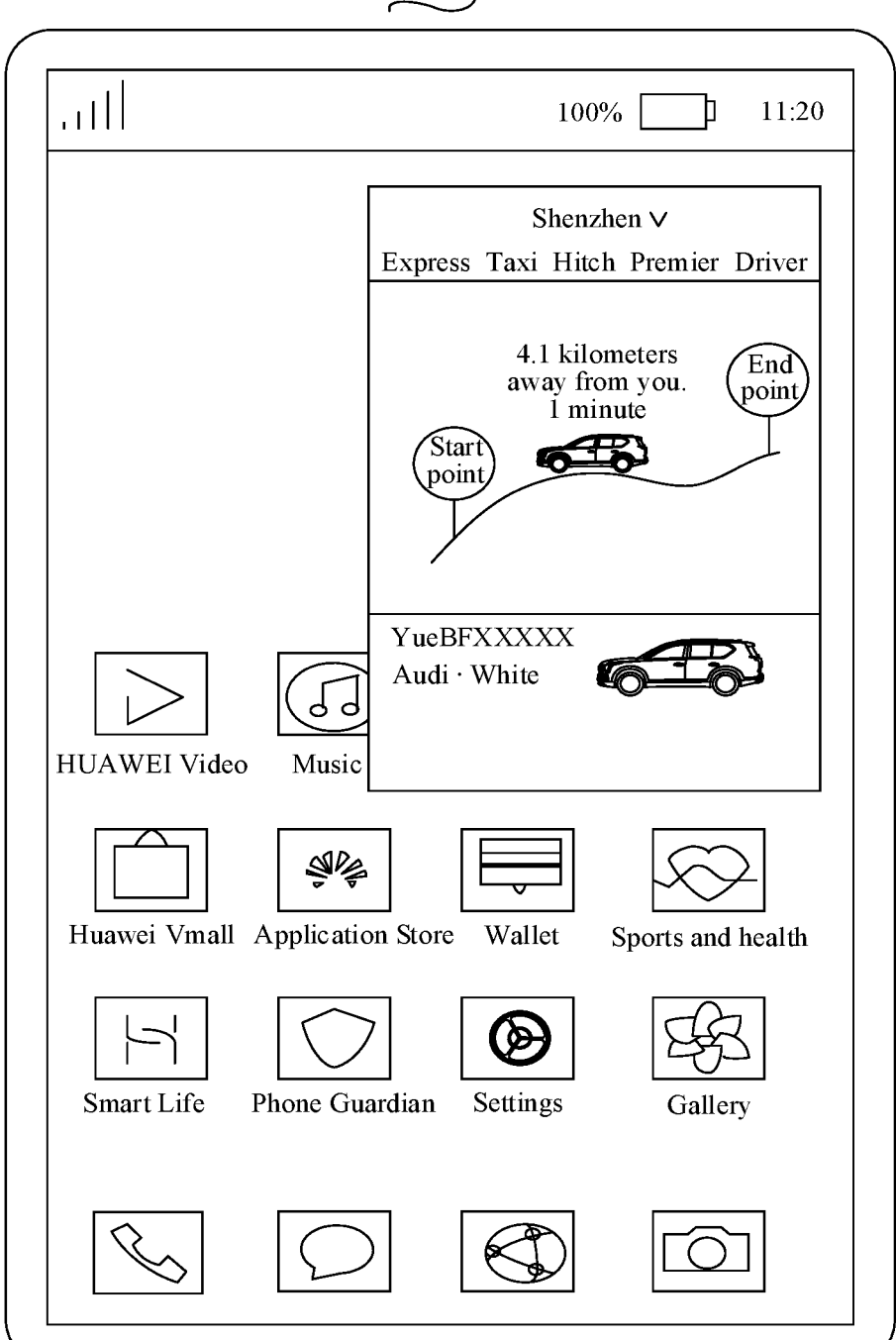

In this case, the user can enable a screen mirroring function to mirror the floating window to the television. For example, the user may perform an input operation on the top of the screen of the mobile phone, for example, slide down from the top of the screen. In response to the input operation, the mobile phone may display a shortcut function control including a screen mirroring control and the like. To enable the screen mirroring function, the user may tap the screen mirroring control. In response to the tap operation, the mobile phone may display a wireless screen mirroring selection window for the user to select a screen mirroring device. In response to the operation of selecting a screen mirroring device by the user, the mobile phone establishes a connection with the television. To mirror a floating window to the television, the user may select the floating window of the taxi hailing software displayed on the screen of the mobile phone. In response to the selection operation, the mobile phone mirrors the floating window of the taxi hailing software displayed on the screen to the television, as shown in FIG. 26C and FIG. 26D. In this case, a size of the floating window of the taxi hailing software is less than a size of the television screen, and the floating window of the taxi hailing software does not block watching TV. A user interface of the taxi hailing software in the floating window displayed on the television is the same as a user interface of the taxi hailing software in the floating window displayed on the mobile phone. Optionally, a proportion of the floating window displayed on the television may be the same as a proportion of the floating window displayed on the screen of the mobile phone. Optionally, a proportion of the floating window displayed on the television may be different from a proportion of the floating window displayed on the screen of the mobile phone. Optionally, a relative position of the floating window displayed on the television may be the same as a relative position of the floating window displayed on the screen of the mobile phone. Optionally, a relative position of the floating window displayed on the television may be different from a relative position of the floating window displayed on the screen of the mobile phone. Optionally, after the floating window is mirrored to the television, the user may further perform, on the mobile phone, the foregoing operations provided in embodiments of this disclosure, to control the taxi hailing software to switch between the floating window mode and various other possible display modes, and continue to perform screen mirroring to the television in a switched mode. Optionally, for a smart television electronic device, after the taxi hailing software is mirrored to the smart television through the mobile phone, the user may further directly perform operations provided in the foregoing embodiments on the smart television, to directly switch a display mode of the taxi hailing software by directly interacting with the smart television.

Optionally, the operation of switching to the floating mode is not limited to the multi-finger pinch operation in Embodiment 8, but may also be any operation in Embodiment 1 to Embodiment 7, provided that the display mode can be switched to the floating mode.

With reference to the foregoing accompanying drawings, a procedure of a display method provided in an embodiment of this disclosure is described, as shown in FIG. 27. Although the following accompanying drawings may show that a window floats only on a home screen, it may be understood that the floating window may also float on a user interface of a started application. Although FIG. 3B and the following accompanying drawings only show that a multi-task interface is entered in response to an operation when the home screen is displayed, it may be understood that a multi-task interface is also entered in response to the operation when the user interface of the started application is displayed. This is not limited in this disclosure. The method further includes the following steps.

S2701. Display an application on a screen in a first mode.

The screen may be a touchscreen. The displaying the application in the first mode may be displaying the application in a full-screen mode, for example, displaying taxi hailing software in the full-screen mode in Embodiment 1 shown in FIG. 4A, for example, displaying taxi hailing software in the full-screen mode in Embodiment 2 shown in FIG. 19D, for example, displaying taxi hailing software in the full-screen mode in Embodiment 3, for example, displaying taxi hailing software in the full-screen mode in Embodiment 4 shown in FIG. 22A, or for example, displaying taxi hailing software in the full-screen mode in Embodiment 5 shown in FIG. 23A.

The displaying the application in the first mode may be displaying the application in a window mode, for example, a floating window displaying taxi hailing software in Embodiment 1 shown in FIG. 4D, for example, a floating window displaying taxi hailing software in Embodiment 1 shown in FIG. 17A, for example, a floating window displaying taxi hailing software in Embodiment 2 shown in FIG. 19A, for example, a floating window displaying taxi hailing software in Embodiment 3 shown in FIG. 20D, for example, a floating window displaying taxi hailing software in Embodiment 4 shown in FIG. 22C, for example, a floating window displaying taxi hailing software in Embodiment 5 shown in FIG. 23C, or for example, a floating window displaying taxi hailing software in Embodiment 6 shown in FIG. 24A.

The displaying the application in the first mode may be displaying the application in a card mode, for example, a floating card displaying taxi hailing software in Embodiment 1 shown in FIG. 5C, for example, a floating card displaying taxi hailing software in Embodiment 1 shown in FIG. 16A, for example, a floating card displaying taxi hailing software in Embodiment 2 shown in FIG. 19B, for example, a floating card displaying taxi hailing software in Embodiment 3 shown in FIG. 21B, for example, a floating card displaying taxi hailing software in Embodiment 4 shown in FIG. 22D, or for example, a floating card displaying taxi hailing software in Embodiment 5 shown in FIG. 23D.

The displaying the application in the first mode may be displaying the application in a floating ball mode, for example, a floating ball displaying the taxi hailing software in Embodiment 1 shown in FIG. 15A, for example, a floating ball displaying the taxi hailing software in Embodiment 2 shown in FIG. 19C, for example, a floating ball displaying taxi hailing software in Embodiment 3 shown in FIG. 21D, or for example, a floating ball for displaying taxi hailing software in Embodiment 4.

S2702. Receive an operation performed on the screen, where the operation is any operation in a plurality of consecutive operations, the plurality of consecutive operations include any one or any combination of a same operation mode, a same operation object, and a same region for an operation object, and the same operation mode includes either or both of a same operation gesture and a same operation direction for an operation gesture.

The same operation gesture may be, for example, a slide shown in FIG. 4A, FIG. 5A, and FIG. 14A, for example, a tap shown in FIG. 15A and FIG. 16A, for example, a slide shown in FIG. 19A and FIG. 19B, for example, another slide in Embodiment 2, for example, a slide in Embodiment 3, for example, a push shown in FIG. 22A and FIG. 22C, for example, another push in Embodiment 4, for example, a multi-finger pinch shown in FIG. 23A and FIG. 23C, or for example, another multi-finger pinch in Embodiment 5.

The same operation object may be, for example, a window of an application shown in FIG. 5A and FIG. 14A, for example, a window of an application shown in FIG. 15A, FIG. 16A, and FIG. 17A, for example, a window of the application shown in FIG. 19A, FIG. 19B, and FIG. 19C, for example, a window of another application in Embodiment 2, for example, a window of an application in Embodiment 3, for example, a window of an application shown in FIG. 22A, FIG. 22C, and FIG. 22D, for example, a window of another application in Embodiment 4, for example, a window of an application shown in FIG. 23A, FIG. 23C, and FIG. 23D, or for example, a window of another application in Embodiment 5.

The same operation direction may be, for example, an upward direction shown in FIG. 4A and FIG. 5A, for example, an upward direction shown in FIG. 19A and FIG. 19B, for example, another upward direction in Embodiment 2, for example, a downward direction in Embodiment 2, for example, an upward direction shown in FIG. 22A and FIG. 22C, for example, another upward direction in Embodiment 4, for example, a downward direction in Embodiment 4, for example, an inward direction shown in FIG. 23A and FIG. 23C, for example, another inward direction in Embodiment 5, or for example, an outward direction in Embodiment 5.

The same position for an operation object may be, for example, a first mode switching hotspot shown in FIG. 19A and FIG. 19B, or for example, another first mode switching hotspot in Embodiment 2.

The plurality of consecutive operations may be operations performed during switching between a plurality of modes in the embodiments, for example, in Embodiment 1, operations performed during switching between any three modes of the full-screen mode, the window mode, the card mode, and the floating ball mode in descending order by size, for example, switching from the full-screen mode to the window mode and switching from the window mode to the floating ball mode, for example, in Embodiment 1, operations performed during switching between any three modes of the floating ball mode, the card mode, the window mode, and the full-screen mode in ascending order by size, for example, in Embodiment 2, operations performed during switching between any three modes of the full-screen mode, the window mode, the card mode, and the floating ball mode in descending order by size, for example, in Embodiment 2, operations performed during switching between any three modes of the floating ball mode, the card mode, the window mode, and the full-screen mode in ascending order by size, for example, in Embodiment 3, operations performed during switching between any three modes of the floating ball mode, the card mode, the window mode, and the full-screen mode, for example, in Embodiment 4, operations performed during switching between any three modes of the full-screen mode, the window mode, the card mode, and the floating ball mode in descending order by size, for example, in Embodiment 4, operations performed during switching between any three modes of the floating ball mode, the card mode, the window mode, and the full-screen mode in ascending order by size, for example, in Embodiment 5, operations performed during switching between any three modes of the full-screen mode, the window mode, the card mode, and the floating ball mode in descending order by size, or for example, in Embodiment 5, operations performed during switching between any three modes of the floating ball mode, the card mode, the window mode, and the full-screen mode in ascending order by size.

S2703. Switch, in response to the operation, display of the application from the first mode to a second mode, where the first mode and the second mode each are any one of a full-screen mode, a window mode, a card mode, and a floating ball mode, and the first mode is different from the second mode.

The response to the operation may include response to the operation that meets a preset condition, for example, as shown in FIG. 4A to FIG. 4C, in Embodiment 1, a slide operation starting from an edge of the screen in a first direction until the display window in full screen is less than a first preset size, where in this case, the application is switched from the full-screen mode to any one of the window mode, the card mode, and the floating ball mode, for example, switched to the window mode shown in FIG. 4D, for example, as shown in FIG. 5A and FIG. 5B, in Embodiment 1, a slide operation of sliding a window of a floating window in the first direction until the window is smaller than a second preset size, where in this case, the application is switched from the window mode to either of the card mode and the floating ball mode, for example, switched to the card mode shown in FIG. 5C, or for example, as shown in FIG. 14A and FIG. 14B, in Embodiment 1, sliding a window of a floating card to slide in a second direction until the window exits the screen by a preset size, where the second direction is different from the first direction, and in this case, the application is switched from the card mode to the floating ball mode, as shown in FIG. 14C.

The response to the operation may include response to the operation that meets a preset condition, for example, as shown in FIG. 15A, in Embodiment 1, an operation of tapping a window of a floating ball, where in this case, the application is switched from the floating ball mode to any one of the card mode, the window mode, and the full-screen mode, for example, switched to the card mode shown in FIG. 15B, for example, as shown in FIG. 16A, in Embodiment 2, an operation of tapping a window of a floating card, where in this case, the application is switched from the card mode to either of the window mode and the full-screen mode, for example, to the window mode shown in FIG. 16B, or for example, as shown in FIG. 17A and FIG. 17B, in Embodiment 2, an operation of sliding a window of a floating window to slide in a third direction until the window is larger than a third preset size, where in this case, the application is switched from the window mode to the full-screen mode, as shown in FIG. 17C.

Switching, in response to the operation, the display of the application from the first mode to a second mode may be, for example, in Embodiment 2, sliding a window in full screen in a first mode switching hotspot to slide in a fourth direction, where in this case, the application is switched from the full-screen mode to any one of the window mode, the card mode, and the floating ball mode, for example, as shown in FIG. 19A, in Embodiment 2, sliding a window of a floating window in the first mode switching hotspot to slide in the fourth direction, where in this case, the application is switched from the window mode to either of the card mode and the floating ball mode, for example, switched to the card mode shown in FIG. 19B, or for example, as shown in FIG. 19B, in Embodiment 2, sliding a window of a floating card in the first mode switching hotspot to slide in the fourth direction, where in this case, the application is switched from the card mode to the floating ball mode, as shown in FIG. 19C.

Switching, in response to the operation, the display of the application from the first mode to a second mode may be, for example, in Embodiment 2, sliding a window of a floating ball in a first mode switching hotspot to slide in a fifth direction, where in this case, the application is switched from the floating ball mode to any one of the card mode, the window mode, and the full-screen mode, for example, in Embodiment 2, sliding a window of a floating card in the first mode switching hotspot to slide in the fifth direction, where in this case, the application is switched from the card mode to either of the window mode and the full-screen mode, or for example, in Embodiment 2, sliding a window of a floating window slides in the first mode switching hotspot to slide in the fifth direction, where in this case, the application is switched from the window mode to the full-screen mode, as shown in FIG. 19D. The fifth direction is different from the fourth direction.

In Embodiment 2, as shown in FIG. 18B to FIG. 18D, the method further includes receiving an operation of selecting a task thumbnail of an application on a multi-task interface, triggering, in response to the selection operation, enabling of the preset first mode switching hotspot on the screen, and displaying the window of the application, where the window of the application displays the user interface of the application, and receiving an operation of sliding the window of the application to the first mode switching hotspot.

In Embodiment 2, after the receiving an operation of sliding the user interface of the application to the first mode switching hotspot, the method further includes receiving an operation of sliding the window of the application in a preset direction in the first mode switching hotspot.

In response to the operation, switching the application from the first mode to the second mode may be, for example, sliding a window to a full-screen hotspot in Embodiment 3. In this case, the application is switched to the full-screen mode, where the window is a window of a floating window, a window of a floating card, or a window of a floating ball. For example, in Embodiment 3, the window is slid to a floating window hotspot. The window is a full-screen window, a window of a floating card, or a window of a floating ball. In this case, the application is switched to the window mode shown in FIG. 20D. For example, in Embodiment 3, the window is slid to a floating card hotspot. The window is a full-screen window, a window of a floating window, or a window of a floating ball. In this case, the application is switched to the card mode shown in FIG. 21B. For example, in Embodiment 3, the window is slid to a floating ball hotspot. The window is a full-screen window, a window of a floating window, or a window of a floating card. In this case, the application is switched to the floating ball mode shown in FIG. 21D.

In Embodiment 3, as shown in FIG. 20A and FIG. 20B, the method further includes receiving an operation of touching and holding a task thumbnail of an application on a multi-task interface, triggering, in response to the touch and hold operation, enabling of the preset second mode switching hotspot on the screen, and displaying the window of the application, where the window of the application displays the user interface of the application. The second mode switching hotspot includes at least one of a full-screen hotspot, a floating window hotspot, a floating card hotspot, and a floating ball hotspot, and receives an operation of sliding the window of the application to any one of the full-screen hotspot, the floating window hotspot, the floating card hotspot, and the floating ball hotspot.

The response to the operation may include response to the operation that meets a preset condition, for example, as shown in FIG. 22A and FIG. 22B, in Embodiment 4, an operation of pushing a full-screen window in a preset direction starting from a corner of the full-screen window until the full-screen window is less than a fourth preset size and greater than a fifth preset size, where in this case, the application is switched from the full-screen mode to any one of the window mode, the card mode, and the floating ball mode, for example, switched to the card mode shown in FIG. 22C, for example, as shown in FIG. 22C, in Embodiment 4, an operation of pushing a window of a floating window in the preset direction starting from a corner of the window of the floating window until the window of the floating window is smaller than the fifth preset size, where in this case, the application is switched from the window mode to either of the card mode and the floating ball mode, for example, switched to the card mode shown in FIG. 22D, or for example, in Embodiment 4, an operation of pushing a window of a floating card in the preset direction starting from a corner of the window of the floating card, where in this case, the application is switched from the card mode to the floating ball mode.

The response to the operation may include response to the operation that meets a preset condition, for example, in Embodiment 4, an operation of pushing a window of a floating ball in another preset direction starting from a corner of the window of the floating ball until the window of the floating ball is smaller than a fifth preset size, where in this case, the application is switched from the floating ball mode to any one of the card mode, the window mode, and the full-screen mode, for example, in Embodiment 4, an operation of pushing a window of a floating card in the other preset direction starting from a corner of the window of the floating card until the window of the floating card is smaller than a fourth preset size and larger than the fifth preset size, where in this case, the application is switched from the card mode to either of the window mode and the full-screen mode, or for example, in Embodiment 4, an operation of pushing a window of a floating window in the other preset direction starting from a corner of the window of the floating window, where in this case, the application is switched from the window mode to the full-screen mode. The other preset direction is opposite to a direction of the preset direction.

The response to the operation may include response to the operation that meets a preset condition, for example, as shown in FIG. 23A and FIG. 23B, in Embodiment 5, an operation of performing a multi-finger pinch on a full-screen window until the full-screen window is less than a fourth preset size and greater than a fifth preset size, where in this case, the application is switched from the full-screen mode to any one of the window mode, the card mode, and the floating ball mode, for example, switched to the window mode shown in FIG. 23C, for example, as shown in FIG. 23C, in Embodiment 5, an operation of performing a multi-finger pinch on a window of a floating window until the window of the floating window is smaller than the fifth preset size, where in this case, the application is switched from the window mode to either of the card mode and the floating ball mode, for example, switched to the card mode shown in FIG. 23D, or for example, in Embodiment 5, an operation of performing a multi-finger pinch operation on a window of a floating card, where in this case, the application is switched from the card mode to the floating ball mode.

The response to the operation may include response to the operation that meets a preset condition, for example, in Embodiment 5, an operation of performing a multi-finger spread on a window of a floating ball until the window of the floating ball is smaller than the fifth preset size, where in this case, the application is switched from the floating ball mode to any one of the card mode, the window mode, and the full-screen mode, for example, in Embodiment 5, an operation of performing a multi-finger spread on a window of a floating card until the window of the floating card is smaller than the fourth preset size and larger than the fifth preset size, where in this case, the application is switched from the card mode to either of the window mode and the full-screen mode, or for example, in Embodiment 5, an operation of performing a multi-finger spread on a window of a floating window until the window of the floating window is larger than the fourth preset size, where in this case, the application is switched from the window mode to the full-screen mode.

In this embodiment, as shown in FIG. 25A and FIG. 25B, the method further includes receiving an operation performed on a window of the floating card, where a size of the window of the floating card is a sixth preset size, and displaying first key information in the window of the floating card of the sixth preset size, and switching, in response to the operation, the size of the window of the floating card from the sixth preset size to a seventh preset size, where the sixth preset size and the seventh preset size each are any one of a plurality of sizes, and the sixth preset size is different from the seventh preset size, and displaying second key information in the window of the floating card of the seventh preset size, where the second key information is different from the first key information. The first key information corresponds to the window of the floating card of the sixth preset size, and the second key information corresponds to the window of the floating card of the seventh preset size. A larger size of the floating card indicates a larger data volume of key information displayed in the floating card.

In this embodiment, as shown in FIG. 26B and FIG. 26C and FIG. 26D, the method further includes mirroring, when the application is displayed on the screen in the window mode, the floating window displayed on the screen to a screen of another device. Optionally, a size of the screen of the other device is greater than a size of the screen of the electronic device. Optionally, a size of the screen of the other device is less than or equal to a size of the screen of the electronic device.

In this embodiment, as shown in FIG. 24A, FIG. 24B, and FIG. 24C, the method further includes receiving an operation of sliding a window of a floating window in a preset direction until the window of the floating window exits the screen by a preset size, and switching, in response to the slide operation, the application from the window mode to the floating ball mode.

In this embodiment, as shown in FIG. 24D, the method further includes receiving an operation of flicking a window of a floating window in a preset direction until the window of the floating window exits the screen by a preset size, and hiding, in response to the flick operation, the floating window of the application.

As shown in FIG. 7A and FIG. 7B, FIG. 8A and FIG. 8B, FIG. 9A and FIG. 9B, FIG. 10A and FIG. 10B, FIG. 11A and FIG. 11B, FIG. 12A and FIG. 12B, and FIG. 13A and FIG. 13B, switching to a floating card mode includes extracting, according to application characteristics of different applications, key information from a user interface of an application displayed in a window, where the window is any one of the following windows a full-screen window or a floating window, and displaying a floating card, and displaying the key information in the floating card based on preset layouts of different key information, where the preset layouts of the floating card include an image-text layout, a list layout, a grid layout, an immersive layout, and a data information layout, as shown in FIG. 6A to FIG. 6E.

Figure 28:
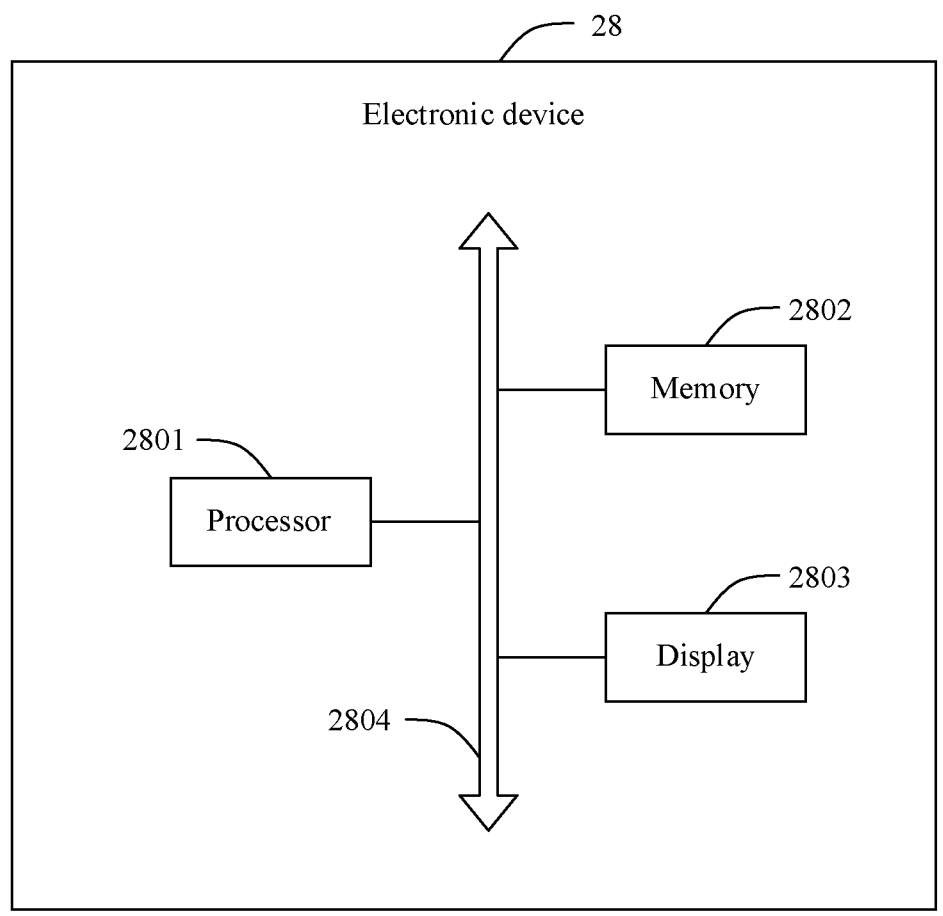
FIG. 28 is a schematic block diagram of an electronic device according to an embodiment of this disclosure.

FIG. 28 is a schematic block diagram of an electronic device according to an embodiment of this disclosure. The electronic device 28 may include a processor 2801, a memory 2802, and a display 2803. The memory 2802 is configured to store computer-executable instructions. When the electronic device 28 runs, the processor 2801 executes the computer-executable instructions stored in the memory 2802, to enable the electronic device 28 to perform the method shown in FIG. 27. The processor 2801 is configured to display an application on a screen in a first mode. The processor 2801 is configured to receive an operation performed on the screen, where the operation is any operation in a plurality of consecutive operations, the plurality of consecutive operations includes any one or any combination of a same operation mode, a same operation object, a same operation direction, and a same position for an operation object. The processor 2801 is configured to switch, in response to the operation, the application from the first mode to a second mode, where the first mode and the second mode each are any one of a full-screen mode, a window mode, a card mode, and a floating ball mode, and the first mode is different from the second mode.

In some embodiments, the electronic device 28 further includes a communication bus 2804. The processor 2801 may be connected to the memory 2802 by the communication bus 2804, to obtain computer-executable instructions stored in the memory 2802, and execute the computer-executable instructions.

Specific implementations of components/devices of the electronic device 28 in embodiments of this disclosure may be implemented with reference to the foregoing method embodiments shown in FIG. 27. Details are not described herein again.

In this way, when the application is displayed in the first mode, the display may be switched to the second mode in response to any operation in consecutive operations. The plurality of consecutive operations includes any one of or a combination of a plurality of a same operation, a same operation object, a same operation direction, and a same position for an operation object. Therefore, when performing consecutive operations, a user can smoothly switch between different operations without changing many postures. In addition, it is convenient for learning and memorization performed by the user, and the ease of use and practicability are both strong.

The method steps in embodiments of this disclosure may be implemented in a hardware manner, or may be implemented in a manner of executing software instructions by the processor. The software instructions may include corresponding software modules. The software modules may be stored in a RAM, a flash memory, a read-only memory (ROM), a programmable ROM (PROM), an erasable PROM (EPROM), an electrically EPROM (EEPROM), a register, a hard disk, a removable hard disk, a compact disc (CD) ROM (CD-ROM), or a storage medium in any other form known in the art. For example, a storage medium is coupled to a processor, so that the processor can read information from the storage medium and write information into the storage medium. Certainly, the storage medium may be a component of the processor. The processor and the storage medium may be arranged in an application-specific integrated circuit (ASIC).

All or some of the foregoing embodiments may be implemented via software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this disclosure are all or partially generated. The computer may be a general-purpose computer, a dedicated computer, a computer network, or other programmable apparatuses. The computer instructions may be stored in a computer-readable storage medium, or may be transmitted via the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive (SSD)), or the like.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In the several embodiments provided in this disclosure, it should be understood that the disclosed apparatus and method may be implemented in other manners. For example, the described apparatus embodiment is merely an example. For example, the module or division into the units is merely logical function division and may be other division during actual implementation. For example, a plurality of units or components may be combined or integrated into another apparatus, or some features may be ignored or not performed.

In addition, functional units in embodiments of this disclosure may be integrated into one processing unit, each of the units may exist alone physically, or two or more units are integrated into one unit. The integrated unit may be implemented in a form of hardware, or may be implemented in a form of a software functional unit.

Finally, it should be noted that the foregoing embodiments are merely intended for describing the technical solutions of this disclosure, but not intended to limit this disclosure. Although this disclosure is described in detail with reference to the example embodiments, a person of ordinary skill in the art should understand that the person can still make modifications or equivalent replacement to the technical solutions of this disclosure without departing from the spirit and scope of the technical solutions of this disclosure.

What is claimed is:

1. A method comprising:

displaying an application program in a full-screen mode on a screen;

obtaining a first gesture operation from a finger on the application program;

continuously zooming out a display window of the application program in response to the first gesture operation to obtain a zoomed-out display window;

floatingly displaying, in a window mode, the application program on the screen according to a first size of the display window when a second size of the zoomed-out display window does not meet a first preset condition, and when the first gesture operation is completed, wherein the display window of the first size is a floating window displayed in a floating manner;

obtaining a second gesture operation from the finger on the floating window;

changing, in response to the second gesture operation, the first size of the floating window to a third size of the display window;

extracting first content from a user interface of the application program;

floatingly displaying, in a card mode, the first content of the application program on the screen according to a fourth size of the display window when the second gesture operation is completed and when the third size does not meet the first preset condition, wherein the first content of the application program displayed in the fourth size is different from second content of the application program displayed in the first size, and wherein the display window of the fourth size is a floating card;

obtaining a third gesture operation from the finger on the floating card;

continuously zooming out the floating card in response to the third gesture operation to obtain a continuously zoomed-out display window; and displaying the application program in a floating ball mode when a fifth size of the continuously zoomed-out display window meets the first preset condition, wherein the display window of the fifth size is a floating ball.

2. The method of claim 1, wherein after displaying the application program in the floating ball mode, the method further comprises:

obtaining a touch operation on the application program; and displaying the application program in the floating manner on the screen in response to the touch operation.

3. The method of claim 2, wherein after displaying the application program, the method further comprises:

obtaining a first sliding operation on the application program; and continuously magnifying the display window in response to the first sliding operation to obtain a zoomed-in display window.

4. The method of claim 3, further comprising floatingly displaying the application program on the screen according to a seventh size of the display window when a sixth size of the zoomed-in display window does not meet a second preset condition, and when the first sliding operation is completed.

5. The method of claim 4, wherein after continuously magnifying the display window, the method further comprises:

acquiring a second sliding operation from the finger on the application program;

continuing to zoom in the display window in response to the second sliding operation to obtain an eighth size of the display window; and displaying the application program in the full-screen mode when the eighth size meets the second preset condition.

6. The method of claim 1, wherein each of the first gesture operation, the second gesture operation, and the third gesture operation comprises any one of sliding, multi-finger pinching, or multi-finger magnification.

7. The method of claim 6, wherein the first gesture operation and the second gesture operation are sliding operations performed on an edge of the display window.

8. An electronic device comprising:

a screen; and one or more processors coupled to the screen and configured to:

display an application program in a full-screen mode on the screen;

obtain a first gesture operation from a finger on the application program;

continuously zoom out a display window of the application program in response to the first gesture operation to obtain a zoomed-out display window;

floatingly display, in a window mode, the application program on the screen according to a first size of the display window when a second size of the zoomed-out display window does not meet a first preset condition, and when the first gesture operation is completed, wherein the display window of the first size is a floating window displayed in a floating manner;

obtain a second gesture operation from the finger on the floating window;

change, in response to the second gesture operation, the first size of the floating window to a third size of the display window;

extract first content from a user interface of the application program;

floatingly display, in a card mode, the first content of the application program on the screen according to a fourth size of the display window when the second gesture operation is completed and when the third size does not meet the first preset condition, wherein the first content of the application program displayed in the fourth size is different from second content of the application program displayed in the first size, wherein the display window of the fourth size is a floating card;

obtain a third gesture operation from the finger on the display window of the fourth size;

continuously zoom out the floating card in response to the third gesture operation to obtain a continuously zoomed-out display window; and display the application program in a floating ball mode when a fifth size of the continuously zoomed-out display window meets the first preset condition, wherein the display window of the fifth size is a floating ball.

9. The electronic device of claim 8, wherein the one or more processors are further configured to:

obtain a touch operation on the application program; and display the application program in the floating manner on the screen in response to the touch operation.

10. The electronic device of claim 9, wherein the one or more processors are further configured to:

obtain a first sliding operation from the finger on the application program; and continuously magnify the display window in response to the first sliding operation to obtain a zoomed-in display window.

11. The electronic device of claim 10, further comprising floatingly displaying the application program on the screen according to a seventh size of the display window when a sixth size of the zoomed-in display window does not meet a second preset condition, and when the first sliding operation is completed.

12. The electronic device of claim 11, wherein the one or more processors are further configured to:

acquire a second sliding operation from the finger on the application program;

continue to zoom in the display window in response to the second sliding operation to obtain an eighth size of the display window; and display the application program in the full-screen mode when the eighth size meets the second preset condition.

13. The electronic device of claim 8, wherein each of the first gesture operation, the second gesture operation, and the third gesture operation comprises any one of sliding, multi-finger pinching, or multi-finger magnification.

14. The electronic device of claim 13, wherein the first gesture operation and the second gesture operation are sliding operations performed on an edge of the display window.

15. A computer program product comprising computer-executable instructions that are stored on a non-transitory computer storage medium and that, when executed by a processor, cause an electronic device to:

display an application program in a full-screen mode on a screen;

obtain a first gesture operation from a finger on the application program;

continuously zoom out a display window of the application program in response to the first gesture operation to obtain a zoomed-out display window;

floatingly display, in a window mode, the application program on the screen according to a first size when a second size of the zoomed-out display window does not meet a first preset condition, and when the first gesture operation is completed, wherein the display window of the first size is a floating window displayed in a floating manner;

obtain a second gesture operation from the finger on the floating window;

change, in response to the second gesture operation, the first size of the floating window to a third size of the display window;

extract first content from a user interface of the application program;

floatingly display, in a card mode, the first content of the application program on the screen according to a fourth size of the display window when the second gesture operation is completed and when the third size does not meet the first preset condition, wherein the first content of the application program displayed in the fourth size is different from second content of the application program displayed in the first size, wherein the display window of the fourth size is a floating card;

obtain a third gesture operation from the finger on the floating card;

continuously zoom out the floating card in response to the third gesture operation to obtain a continuously zoomed-out display window; and display the application program in a floating ball mode when a fifth size of the continuously zoomed-out display window meets the first preset condition, wherein the display window of the fifth size is a floating ball.

16. The computer program product of claim 15, wherein the computer-executable instructions further cause the electronic device to:

obtain a touch operation on the application program; and display the application program in the floating manner on the screen in response to the touch operation.

17. The computer program product of claim 16, wherein the computer-executable instructions further cause the electronic device to:

obtain a first sliding operation on the application program; and continuously magnify the display window in response to the first sliding operation to obtain a zoomed-in display window.

18. The computer program product of claim 17, further comprising floatingly displaying the application program on the screen according to a seventh size of the display window when a sixth size of the zoomed-in display window does not meet a second preset condition, and when the first sliding operation is completed.

19. The computer program product of claim 18, wherein computer-executable instructions further cause the electronic device to:

acquire a second sliding operation from the finger on the application program;

continue to zoom in the display window in response to the second sliding operation; and display the application program in the full-screen mode when an eighth size meets the second preset condition.

20. The computer program product of claim 15, wherein each of the first gesture operation, the second gesture operation, and the third gesture operation comprises any one of sliding, multi-finger pinching, or multi-finger magnification.

* * * * *